(12) United States Patent
Yamazaki

(10) Patent No.: US 8,565,059 B2
(45) Date of Patent: Oct. 22, 2013

(54) OPTICAL PICKUP DEVICE AND OPTICAL DISC APPARATUS

(75) Inventor: Kazuyoshi Yamazaki, Yamato (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 13/489,549

(22) Filed: Jun. 6, 2012

(65) Prior Publication Data

US 2012/0314556 A1 Dec. 13, 2012

(30) Foreign Application Priority Data

Jun. 9, 2011 (JP) ................................ 2011-129639

(51) Int. Cl.
*G11B 7/00* (2006.01)
(52) U.S. Cl.
USPC ............. 369/112.04; 369/112.1; 369/112.01; 369/44.12; 369/44.41
(58) Field of Classification Search
None
See application file for complete search history.

(56) References Cited

U.S. PATENT DOCUMENTS

| | | | |
|---|---|---|---|
| 2008/0084797 A1 | 4/2008 | Sano et al. | |
| 2008/0101199 A1 | 5/2008 | Yamasaki et al. | |
| 2009/0268584 A1* | 10/2009 | Kamisada et al. | ....... 369/112.12 |
| 2010/0014410 A1 | 1/2010 | Nakao et al. | |
| 2012/0002532 A1 | 1/2012 | Yamazaki et al. | |

FOREIGN PATENT DOCUMENTS

| | | |
|---|---|---|
| JP | 2008-135151 | 6/2008 |
| JP | 2010-061751 | 3/2010 |
| JP | 2010-277664 | 12/2010 |
| JP | 2010-287309 | 12/2010 |

OTHER PUBLICATIONS

Japanese Office Action dated Jul. 9, 2013 for Application No. 2011-129639.

* cited by examiner

*Primary Examiner* — Muhammad N Edun
(74) *Attorney, Agent, or Firm* — Antonelli, Terry, Stout & Kraus, LLP

(57) ABSTRACT

An optical pickup device includes a laser diode for emitting a laser beam, an objective lens for collecting the light beam emitted from the laser diode and irradiating an optical disc with the collected light beam, a diffraction element for making the light beam reflected from the optical disc diverge, and a detector having a plurality of detection parts for receiving the diverging light beams caused by the diffraction element. The diffraction element has first, second, and third divided areas, wherein a 0th-order diffracted light from the first divided area, the second divided area, and the third divided area is detected by at least four divided detection parts; and at least two detection parts for detecting the light beam diffracted at the first divided area into first or higher diffraction order are aligned in a direction generally perpendicular to the track of the optical disc.

19 Claims, 38 Drawing Sheets

FIG.4
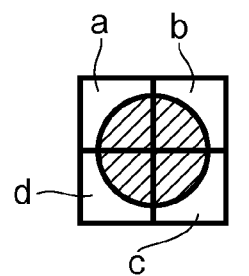
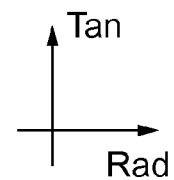
 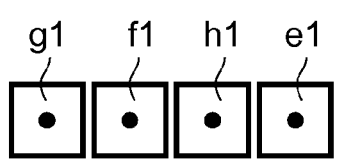 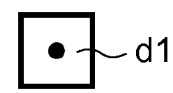
 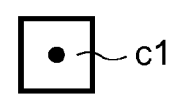

FIG.10
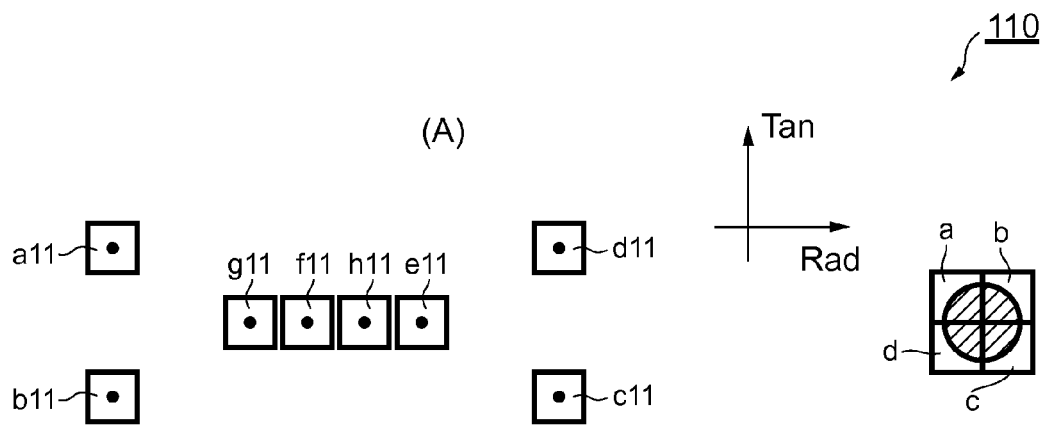
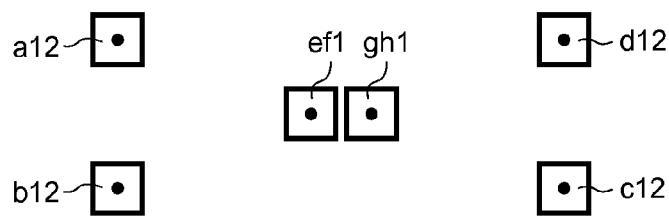

FIG.14
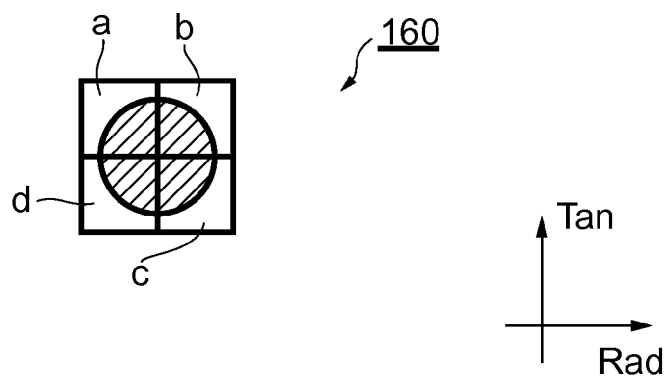
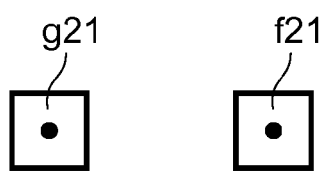
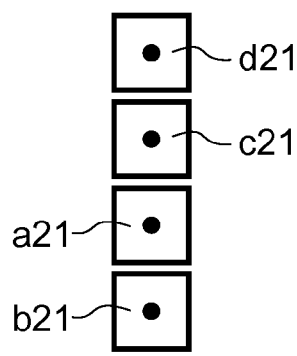

FIG.15
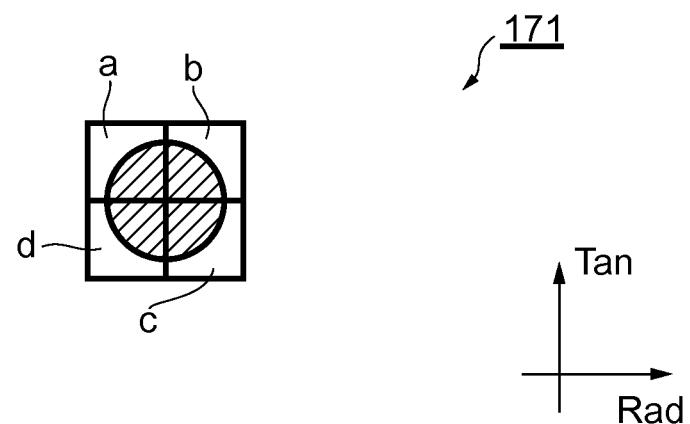
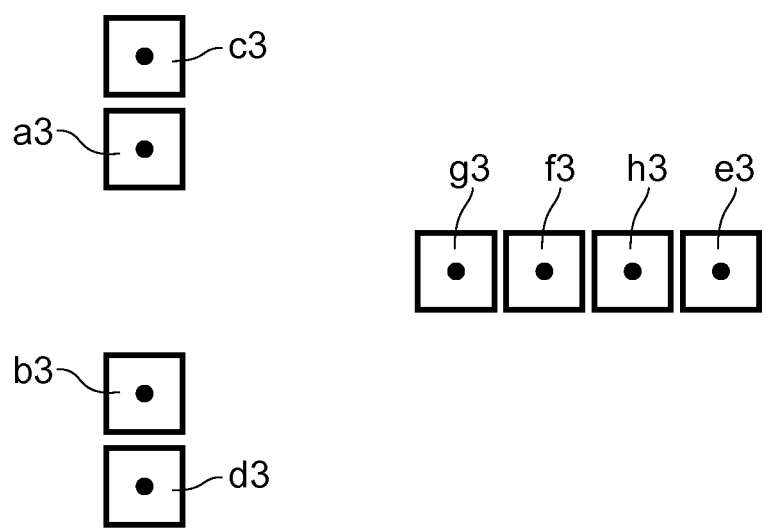

FIG.18
(A)
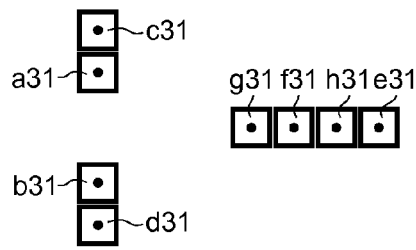
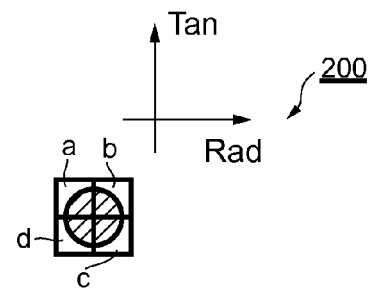
(B)
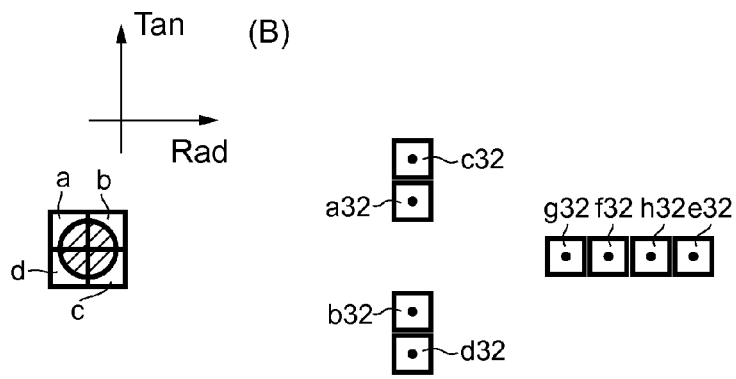
(C)
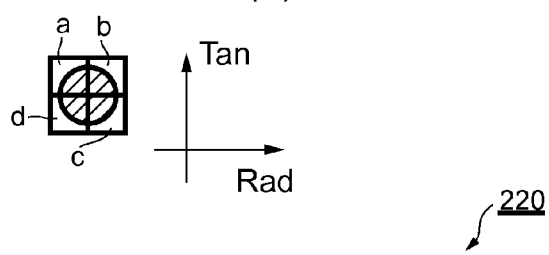
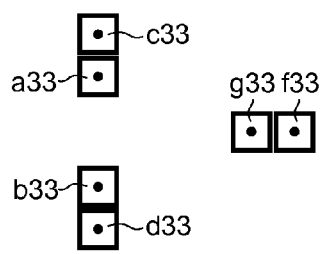

FIG.19
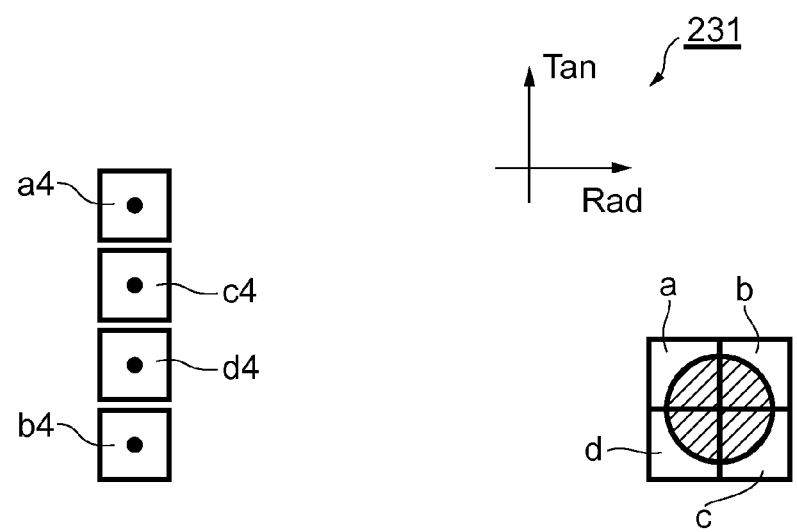
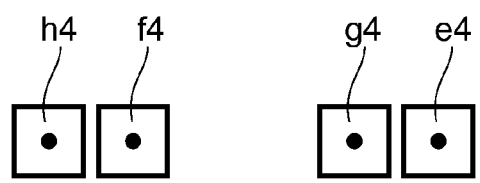

FIG.27
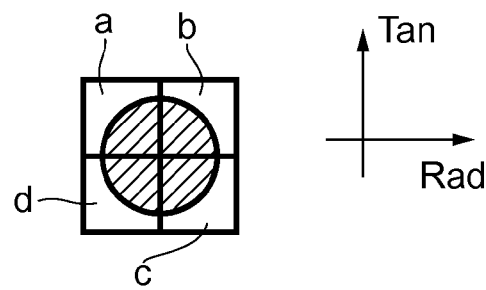
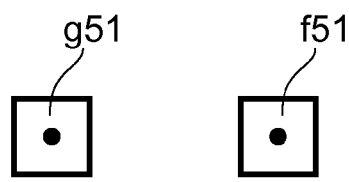
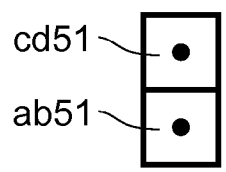
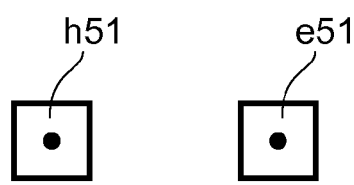

FIG.28
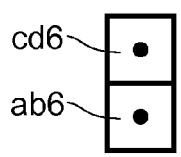
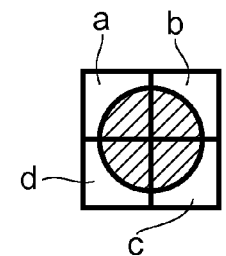
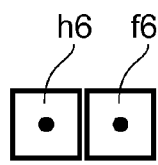
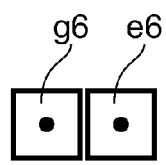

FIG.32
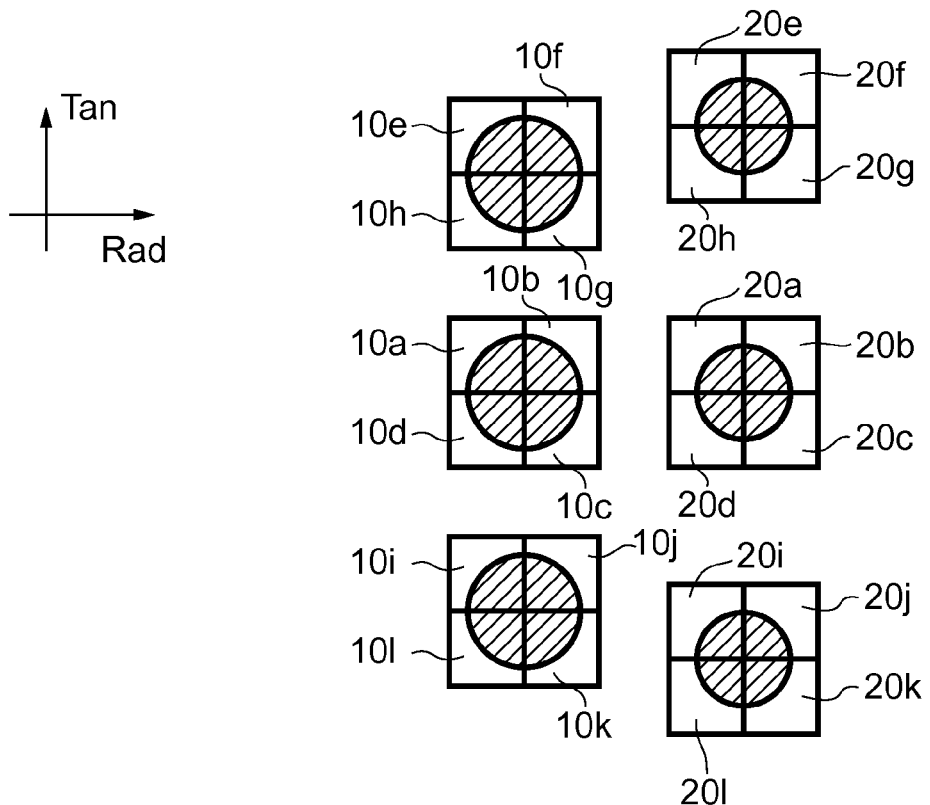
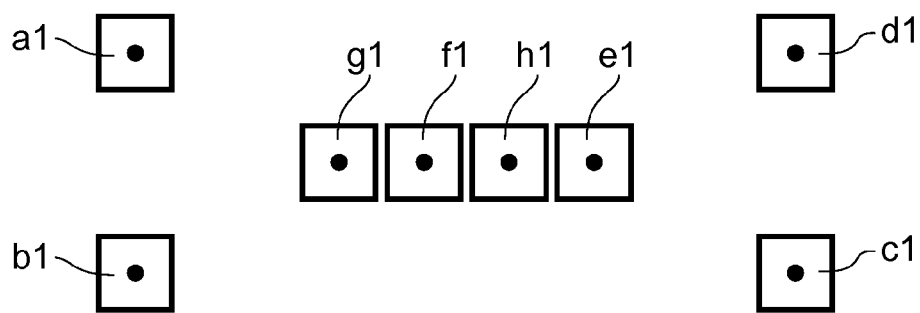

FIG.34
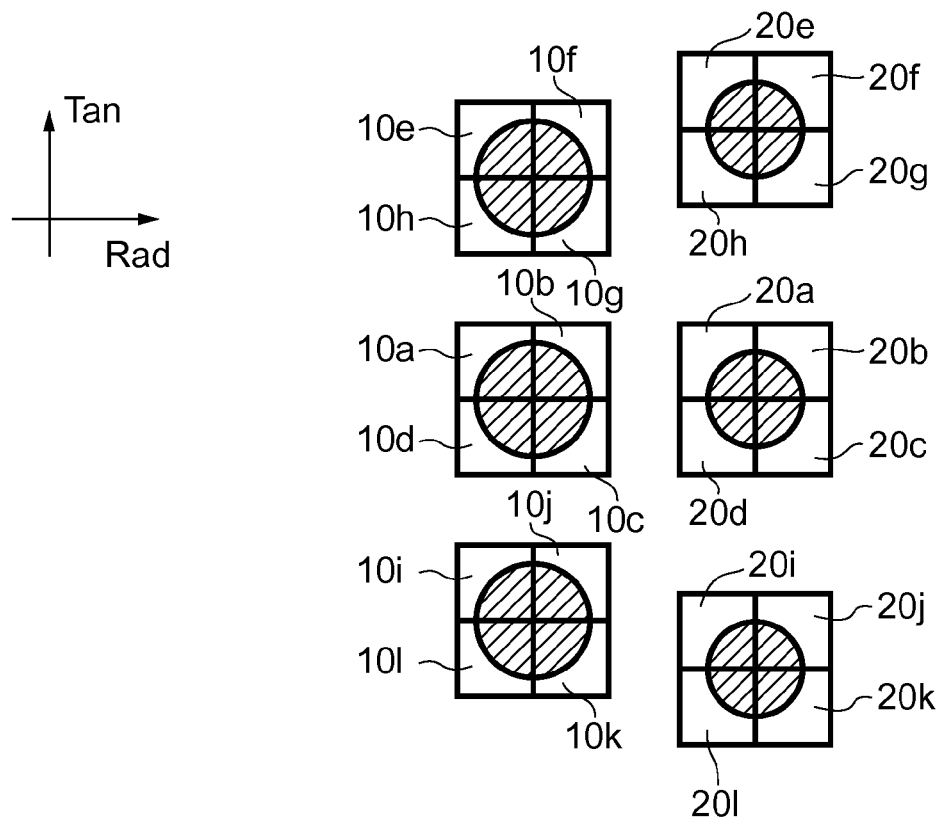
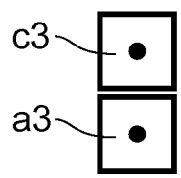
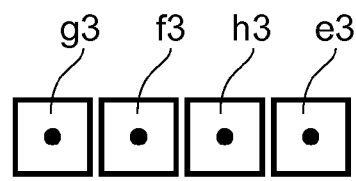
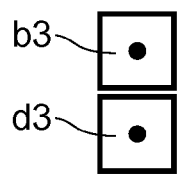

OPTICAL PICKUP DEVICE AND OPTICAL DISC APPARATUS

CROSS-REFERENCES TO RELATED APPLICATIONS

This application relates to and claims priority from Japanese Patent Application No. 2011-129639, filed on Jun. 9, 2011, the entire disclosure of which is incorporated herein by reference.

BACKGROUND

1. Field of the Invention

The present invention relates to an optical pickup device and an optical disc apparatus and is suited for use in, for example, an optical pickup device and optical disc apparatus that are compatible with multi layer optical discs.

2. Description of Related Art

Generally, an optical disc apparatus equipped an optical pickup device is used to read information from, and write information to, an optical disc. This optical pickup device performs, for example, focus adjustment by changing the position of an objective lens in a focus direction based on a focusing error signal detected by detection parts of a detector and also performs tracking adjustment by changing the position of the objective lens in an optical disc radial direction (hereinafter referred to as the radial direction) based on a tracking error signal in order to accurately emit a spot on a specified track in the optical disc. A conventional optical disc apparatus performs position control of the objective lens based on a servo signal by means of the focusing error signal and the tracking error signal.

Meanwhile, multi layer optical discs, each of which has a plurality of information recording layers, have been known in recent years along with the popularization of large-capacity optical discs. When reading information from, and writing information to, a multi layer optical disc composed of three or more information recording layers by using a conventional optical pickup device, there is a possibility that signal light reflected from an information recording layer and a stray light reflected from another information recording layer may enter the same detection part of a detector. In this case, the resulting problem is that the signal light and the stray light interfere with each other and, therefore, an accurate tracking error signal cannot be detected and stable tracking control can no longer be performed.

As a means for solving the above-described problem, for example, Japanese Patent Application Laid-Open (Kokai) Publication No. 2008-135151 discloses a method for detecting a stable tracking error signal while avoiding the stray light reflected from the other information recording layer(s), by locating a detection part for detecting the tracking error signal at a position away from the stray light, further locating some detection parts along a direction of an extension line of a tangent relative to the track of the optical disc (hereinafter referred to as the tangential direction), and locating the remaining detection parts in the optical disc radial direction (radial direction) perpendicular to the tangential direction of the track.

SUMMARY

However, if the method disclosed in Japanese Patent Application Laid-Open (Kokai) Publication No. 2008-135151 mentioned above is used, the required area of the detection parts of the detector for detecting the tracking error signal becomes large and the size of the detector thereby increases, which results in problems of a high manufacturing cost of the detector and an increase of the size of the optical pickup as a whole.

The present invention was devised in consideration of the above-described circumstances and aims at suggesting an optical pickup device, which can generate a stable servo signal when recording and reproducing information in an optical disc with a plurality of information recording layers and be downsized at low cost, and an optical disc apparatus equipped with such an optical pickup device.

In order to solve the above-described problems, an optical pickup device according to the present invention includes: a laser diode for emitting a laser beam; an objective lens for collecting the light beam emitted from the laser diode and irradiating an optical disc with the collected light beam; a diffraction element for making the light beam reflected from the optical disc diverge; and a detector having a plurality of detection parts for receiving the diverging light beams caused by the diffraction element; wherein the diffraction element has first, second, and third divided areas; wherein the third divided area is an area including a center of the diffraction element; wherein the first divided area is an area located along a straight line passing through an approximate center of the diffraction element and extending in a direction generally parallel to a track of the optical disc; wherein the second divided area is an area located along a straight line passing through the approximate center of the diffraction element and extending in a direction generally perpendicular to the track of the optical disc; wherein the first divided area or the second divided area is divided into at least four parts so that the diffracted light from the first divided area or the second divided area enters at least four detection parts; wherein a 0th-order diffracted light from the first divided area, the second divided area, and the third divided area is detected by at least four divided detection parts; and wherein at least two detection parts for detecting the light beam diffracted at the first divided area into first or higher diffraction order are aligned in a direction generally perpendicular to the track of the optical disc.

Furthermore, an optical pickup device according to the present invention includes: a laser diode for emitting a laser beam; an objective lens for collecting the light beam emitted from the laser diode and irradiating an optical disc with the collected light beam; a diffraction element for making the light beam reflected from the optical disc diverge; and a detector having a plurality of detection parts for receiving the diverging light beams caused by the diffraction element; wherein the diffraction element has first, second, and third divided areas; wherein the third divided area is an area including a center of the diffraction element; wherein the first divided area is an area located along a straight line passing through an approximate center of the diffraction element and extending in a direction generally parallel to a track of the optical disc; wherein the second divided area is an area located along a straight line passing through the approximate center of the diffraction element and extending in a direction generally perpendicular to the track of the optical disc; wherein the first divided area or the second divided area is divided into at least four parts so that the diffracted light from the first divided area or the second divided area enters at least four detection parts; wherein a 0th-order diffracted light from the first divided area, the second divided area, and the third divided area is detected by at least four divided detection parts; and wherein at least two detection parts for detecting the light beam diffracted at the second divided area into first or higher diffraction order are aligned in a direction generally parallel to the track of the optical disc.

Furthermore, an optical pickup device according to the present invention includes: a laser diode for emitting a laser beam; an objective lens for collecting the light beam emitted from the laser diode and irradiating an optical disc with the collected light beam; a diffraction element for making the light beam reflected from the optical disc diverge; and a detector having a plurality of detection parts for receiving the diverging light beams caused by the diffraction element; wherein the diffraction element has first, second, and third divided areas; wherein regarding disc-diffracted light which is diffracted by a track of the optical disc, 0th-order disc-diffracted light enters the first divided area and 0th-order disc-diffracted light and ±1st-order disc-diffracted light enter the second divided area; wherein the first divided area or the second divided area is divided into at least four parts so that the diffracted light from the first divided area or the second divided area enters at least four detection parts; wherein a 0th-order diffracted light from the first divided area, the second divided area, and the third divided area is detected by at least four divided detection parts; and wherein at least two detection parts for detecting the light beam diffracted at the first divided area into first or higher diffraction order are aligned in a direction generally perpendicular to the track of the optical disc.

Furthermore, an optical pickup device according to the present invention includes: a laser diode for emitting a laser beam; an objective lens for collecting the light beam emitted from the laser diode and irradiating an optical disc with the collected light beam; a diffraction element for making the light beam reflected from the optical disc diverge; and a detector having a plurality of detection parts for receiving the diverging light beams caused by the diffraction element; wherein the diffraction element has first, second, and third divided areas; wherein regarding disc-diffracted light which is diffracted by a track of the optical disc, 0th-order disc-diffracted light enters the first divided area and 0th-order disc-diffracted light and ±1st-order disc-diffracted light enter the second divided area; wherein the first divided area or the second divided area is divided into at least four parts so that the diffracted light from the first divided area or the second divided area enters at least four detection parts; wherein a 0th-order diffracted light from the first divided area, the second divided area, and the third divided area is detected by at least four divided detection parts; and wherein at least two detection parts for detecting the light beam diffracted at the second divided area into first or higher diffraction order are aligned in a direction generally parallel to the track of the optical disc.

Furthermore, an optical pickup device according to the present invention includes: a laser diode for emitting a laser beam; an objective lens for collecting the light beam emitted from the laser diode and irradiating an optical disc with the collected light beam; a diffraction element for making the light beam reflected from the optical disc diverge; and a detector having a plurality of detection parts for receiving the diverging light beams caused by the diffraction element; wherein the diffraction element has first, second, and third divided areas; wherein the third divided area is a specified area including an approximate center of the diffraction element; wherein the first divided area is a specified area including four corners of the diffraction element; wherein the second divided area is an area excluding the first divided area and the third divided area; wherein the first divided area or the second divided area is divided into at least four parts so that the diffracted light from the first divided area or the second divided area enters at least four detection parts; wherein a 0th-order diffracted light from the first divided area, the second divided area, and the third divided area is detected by at least four divided detection parts; and wherein at least two detection parts for detecting the light beam diffracted at the first divided area into first or higher diffraction order are aligned in a direction generally perpendicular to the track of the optical disc.

Furthermore, an optical pickup device according to the present invention includes: a laser diode for emitting a laser beam; an objective lens for collecting the light beam emitted from the laser diode and irradiating an optical disc with the collected light beam; a diffraction element for making the light beam reflected from the optical disc diverge; and a detector having a plurality of detection parts for receiving the diverging light beams caused by the diffraction element; wherein the diffraction element has first, second, and third divided areas; wherein the third divided area is a specified area including an approximate center of the diffraction element; wherein the first divided area is a specified area including four corners of the diffraction element; wherein the second divided area is an area excluding the first divided area and the third divided area; wherein the first divided area or the second divided area is divided into at least four parts so that the diffracted light from the first divided area or the second divided area enters at least four detection parts; wherein a 0th-order diffracted light from the first divided area, the second divided area, and the third divided area is detected by at least four divided detection parts; and wherein at least two detection parts for detecting the light beam diffracted at the second divided area into first or higher diffraction order are aligned in a direction generally parallel to the track of the optical disc.

Furthermore, according to the present invention, an optical disc apparatus is equipped with the optical pickup device stated in claim 1, a laser lighting circuit for driving the laser diode in the optical pickup device, a servo signal generating circuit for generating a focusing error signal and a tracking error signal by using a signal detected by the detector in the optical pickup device, and an information signal reproducing circuit for reproducing an information signal recorded in the optical disc.

An optical pickup device, which can generate a stable servo signal when recording and reproducing information in an optical disc with a plurality of information recording layers and be downsized at low cost, and an optical disc apparatus equipped with such an optical pickup device can be realized according to the present invention.

BRIEF DESCRIPTION OF THE DRAWINGS

FIG. 4 is a plane view showing an example of an arrangement pattern of detection parts of a detector.

FIG. 10(A) shows a variation of an arrangement pattern of the detection parts of the detector according to the first embodiment; and FIG. 10(B) shows a variation of an arrangement pattern of the detection parts of the detector according to the first embodiment.

FIG. 14 shows a variation of an arrangement pattern of the detection parts of the detector according to the second embodiment.

FIG. 15 is a plan view showing an example of an arrangement pattern of detection parts of a detector according to a third embodiment.

FIG. 18(A) shows a variation of an arrangement pattern of the detection parts of the detector according to the third embodiment; FIG. 18(B) shows a variation of an arrangement pattern of the detection parts of the detector according to the third embodiment; and FIG. 18(C) shows a variation of an arrangement pattern of the detection parts of the detector according to the third embodiment.

FIG. 19 is a plan view showing an example of an arrangement pattern of detection parts of a detector according to a fourth embodiment.

FIG. 27 shows a variation of an arrangement pattern of the detection parts of the detector according to the fifth embodiment.

FIG. 28 is a plan view showing an example of an arrangement pattern of detection parts of a detector according to a sixth embodiment.

FIG. 32 is a plan view showing an example of an arrangement pattern of detection parts of a detector according to the seventh embodiment.

FIG. 34 is a plan view showing an example of an arrangement pattern of detection parts of a detector according to a ninth embodiment.

DETAILED DESCRIPTION OF PREFERRED EMBODIMENTS

Figure 1:
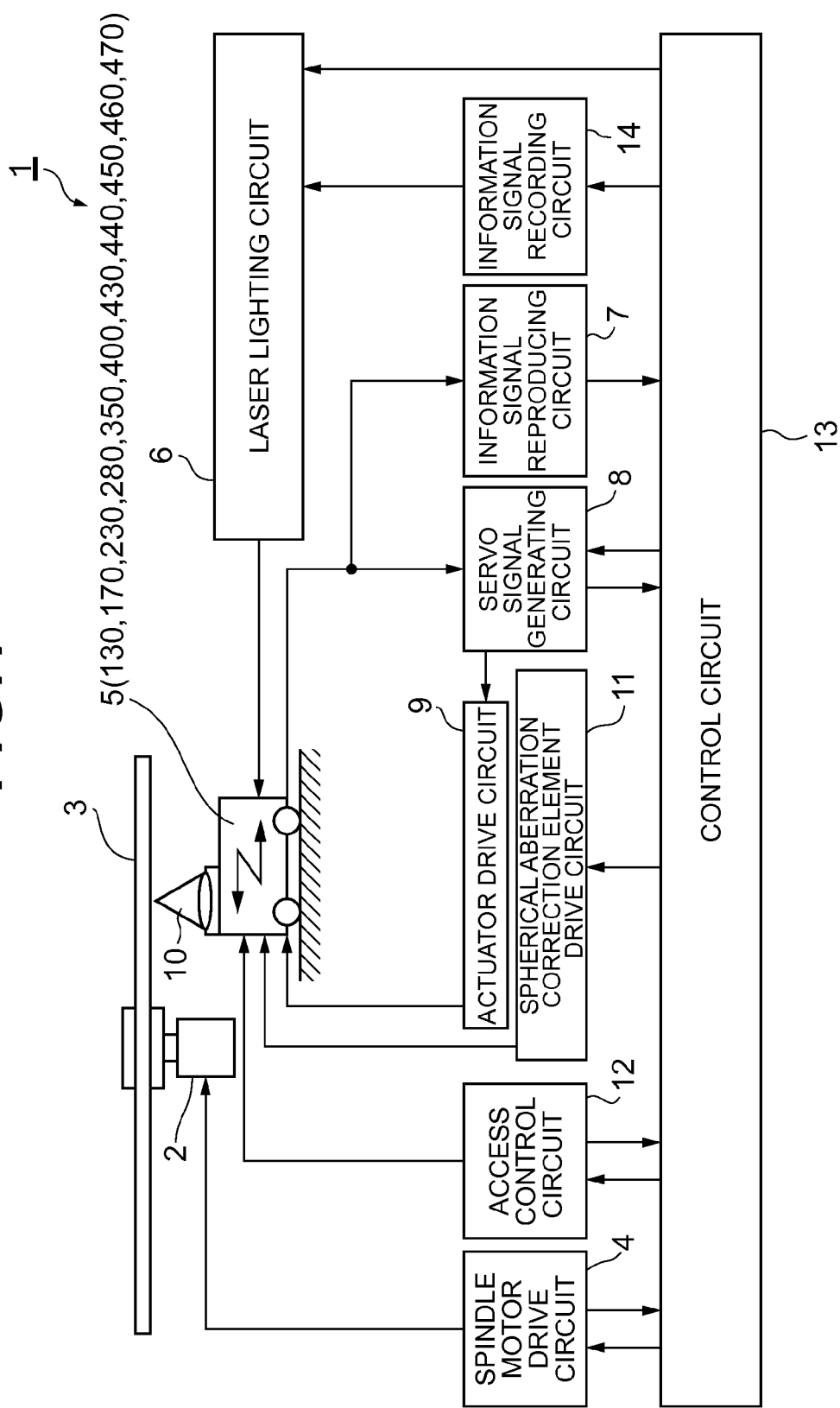
FIG. 1 is a block diagram showing a configuration example for an optical disc apparatus according to a first embodiment.

An embodiment of the present invention will be explained in detail with reference to the attached drawings.
(1) First Embodiment
(1-1) Configuration of Optical Disc Apparatus According to this Embodiment
Referring to FIG. 1, the reference numeral 1 represents an optical disc apparatus according to this embodiment as a whole. This optical disc apparatus 1 is configured by including a spindle motor 2, a spindle motor drive circuit 4, an optical pickup 5, a laser lighting circuit 6, an information signal reproducing circuit 7, a servo signal reproducing circuit 8, an actuator drive circuit 9, an objective lens 10, a spherical aberration correction element drive circuit 11, an access control circuit 12, a control circuit 13, and an information signal recording circuit 14.

The optical disc 3 is a disc-shaped information recording body and its center is fixed to a rotation axis of the spindle motor 2. This spindle motor 2 rotatively drives the rotation axis by electric power supplied by the spindle motor drive circuit 4.

Moreover, the optical pickup 5 is an optical component for optically recording and reproducing information in the optical disc 3. As a specified laser drive current is supplied from the laser lighting circuit 6 to a laser diode (described later) which is incorporated into the optical pickup 5, the laser diode emits a laser beam with specified quantity of light at the time of reproduction. Incidentally, the laser lighting circuit 6 can be also incorporated into the optical pickup 5.

Furthermore, an output signal from the optical pickup 5 is sent to the information signal reproducing circuit 7 and the servo signal reproducing circuit 8. The information signal reproducing circuit 7 reproduces an RF (Radio Frequency) signal, which is an information signal recorded in the optical disc 3, based on the output signal from the optical pickup 5. Then, the servo signal reproducing circuit 8 generates servo signals, such as a focusing error signal and a tracking error signal, based on the output signal from the optical pickup 5 and controls the position of the objective lens 10, which is mounted on the optical pickup, via the actuator drive circuit 9 based on the servo signals. Furthermore, the spherical aberration correction element drive circuit 11 corrects a spherical aberration by moving a collimating lens (described later), which is mounted on the optical pickup device 5 in an optical axial direction, based on the generated servo signals.

Furthermore, the optical pickup device 5 is equipped with a mechanism for driving the optical pickup device 5 along a radial direction of the optical disc 3 and the position of the optical pickup device 5 is controlled according to an access signal from the access control circuit 12.

The control circuit 13 is a microcomputer equipped with, for example, a CPU (Central Processing Unit) and a memory which are not shown in the drawing. The control circuit 13 is connected to, for example, the spindle motor drive circuit 4, the laser lighting circuit 6, the information signal reproducing circuit 7, the servo signal reproducing circuit 8, the spherical aberration correction element drive circuit 11, the access control circuit 12, and the information signal recording circuit 14; and the control circuit 13 sends a control signal to each of the spindle motor drive circuit 4, the laser lighting circuit 6, the servo signal reproducing circuit 8, the spherical aberration correction element drive circuit 11, and the access control circuit 12 based on signals from the spindle motor drive circuit 4, the information signal reproducing circuit 7, the servo signal reproducing circuit 8, and the access control circuit 12, controls the rotations of the spindle motor 2, which rotates the optical disc 3, controls the position of the optical pickup device 5, controls the position of the objective lens 10, corrects the spherical aberration, and controls, for example, the quantity of light emitted from a laser diode in the optical pickup device 5.

Furthermore, when recording information, the information signal recording circuit 14 which is provided between the control circuit 13 and the laser lighting circuit 6 records information in the optical disc 3 by driving the laser lighting circuit 6 based on a recording control signal from the control circuit 13.

(1-2) Configuration of Optical Pickup Device According to this Embodiment

Next, an optical system of the optical pickup device 5 mounted in the optical disc apparatus 1 shown in FIG. 1 will be explained. As shown in FIG. 2, the optical pickup device 5 is configured by including a laser diode 20, a beam splitter 21, a front monitor 22, a collimating lens 23, a reflection mirror 24, a quarter wave plate 25, an actuator 26, an objective lens 10, a hologram element 27, a detecting lens 28, and a detector 29.

Incidentally, a case where the optical pickup device 5 according to this embodiment reproduces and records information in a BD (Blu-Ray Disc) will be explained below. However, the optical disc is not limited to the BD and other recording formats may be used.

The laser diode 20 is composed of a laser diode that emits a light beam L1 of diverging rays of an approximately 405 [nm] band in conformity with BD standards and, for example, the laser diode 20 is blink-driven by the aforementioned laser lighting circuit 6 (FIG. 1) according to target data to be recorded at the time of recording and reproduction and the lighting of the laser diode 20 is turned on and driven by constant power at the time of reproduction operation.

Furthermore, the beam splitter 21 is an optical component that transmits the light beam L1 and divides it into two or more light beams. The light beam L1 emitted from the laser diode 20 at the time of activation of the laser diode 20 permeates through the beam splitter 21 and is divided into the light beam L1, which enters the front monitor 22, and the light beam L1 which reflects off the beam splitter 21 and enters the collimating lens 23.

The front monitor 22 is an optical component for detecting the light quantity of the light beam L1 and is used when controlling the light quantity of the light beam L1 to a desired value in order to enhance the precision of the recording and reproduction operation of the optical disc 3. Specifically speaking, the front monitor 22 detects a change of the light quantity of the light beam L1 from the laser diode 20 and feeds back the detection result to the control circuit 13 (FIG. 1). As a result, the light quantity of the light beam L1 delivered to the optical disc 3 can be controlled under control of the control circuit 13.

The collimating lens 23 is an optical component that changes a state of divergence and convergence of the light beam L1 by driving the collimating lens 23 in an optical axial direction by means of a mechanism for driving the collimating lens 23 in the optical axial direction; and is used to compensate a spherical aberration due to a thickness error of a cover layer of the optical disc 3. Then, the light beam L1 which permeates through the collimating lens 23 reflects off the reflection mirror 24 and enters the quarter wave plate 25.

The quarter wave plate 25 is an optical component that changes linearly polarized light to circularly polarized light. Specifically speaking, the light beam L1 is converted by the quarter wave plate 25 into the circularly polarized light and is then collected by the objective lens 10, which is mounted on the actuator 26, onto the optical disc 3. Then, the light beam L1 is diffracted by the track of the optical disc 3 into three light beams (0th-order disc-diffracted light, +1st-order disc-diffracted light, and −1st-order disc-diffracted light).

Incidentally, the objective lens 10 is an optical component for collecting the optical beam of the light beam L1 and the position of the objective lens 10 can be changed to a direction moving closer to the optical disc 3 or to a direction moving away from the optical disc 3 and the objective lens 10 can be tilted in a radial direction of the optical disc 3 by using the actuator for driving the objective lens 10.

On the other hand, the light beam L1 reflected from the optical disc 3 is converted by the objective lens 10 into a parallel ray, which then sequentially passes through the quarter wave plate 25, the reflection mirror 24, the collimating lens 23, and the beam splitter 21 and enters the hologram element 27.

The hologram element 27 includes divided areas for diffracting the light beam L1, which has entered the hologram element 27, in different directions. The light beam L1 diffracted at the divided areas in this hologram element 27 enters the detecting lens 28. Incidentally, the hologram element 27 diffracts the light beam L1 in specified directions and gives astigmatism to the light beam L1. Specifically speaking, the hologram element 27 diffracts the −1st-order disc-diffracted light, which has entered the hologram element 27, in a specified direction and gives specified astigmatism to the −1st-order disc-diffracted light. Moreover, the hologram element 27 diffracts the +1st-order disc-diffracted light, which has entered the hologram element 27, in a specified direction and gives it astigmatism which is the opposite of the astigmatism given to the −1st-order disc-diffracted light. Furthermore, the hologram element 27 does not give astigmatism to the 0th-order disc-diffracted light which has permeated through the hologram element 27.

The detecting lens 28 is an optical component that gives astigmatism to the light beam L1 diffracted by the hologram element 27. Specifically speaking, the 0th-order diffracted light and the −1st-order diffracted light which have permeated through the hologram element 27 are given specified astigmatism by the detecting lens 28 and enter the detector 29 in a defocus state. Moreover, the +1st-order diffracted light which has permeated through the hologram element 27 is given astigmatism which is the opposite of the astigmatism given to the 0th-order diffracted light by the detecting lens 28, so that the astigmatism given by the hologram element 27 is suppressed and the light converges on the detector 29.

Furthermore, the detector 29 has a detection part configuration that allows the light beam L1 to converge; and this detector 29 serves to photoelectrically convert the light beam L1 which has entered the detection parts. The detector 29 sends the obtained signal to the information signal reproducing circuit 7 and the servo signal reproducing circuit 8; and the information signal reproducing circuit 7 generates an RF signal which is a reproduction signal; and the servo signal reproducing circuit 8 generals, for example, a focusing error signal and a tracking error signal which are servo signals.

Figure 2:
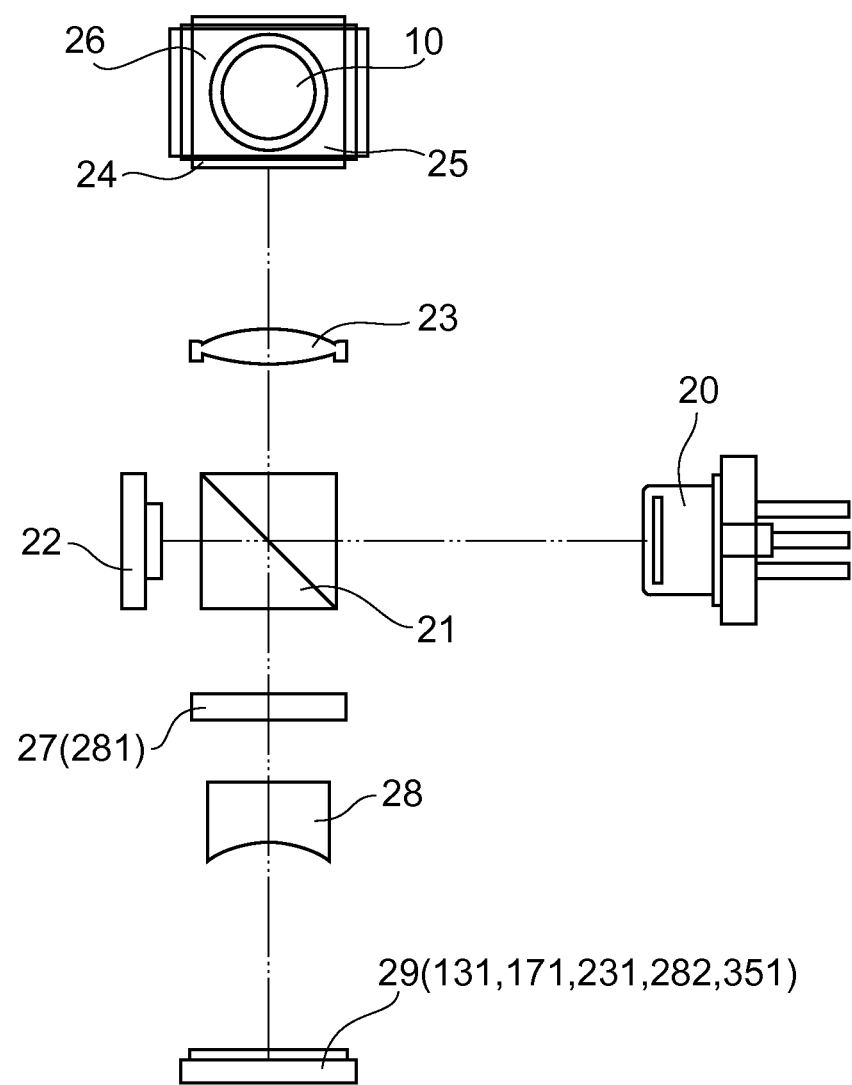
FIG. 2 is a plane view showing a configuration example for an optical pickup device according to the first embodiment.
Figure 3:
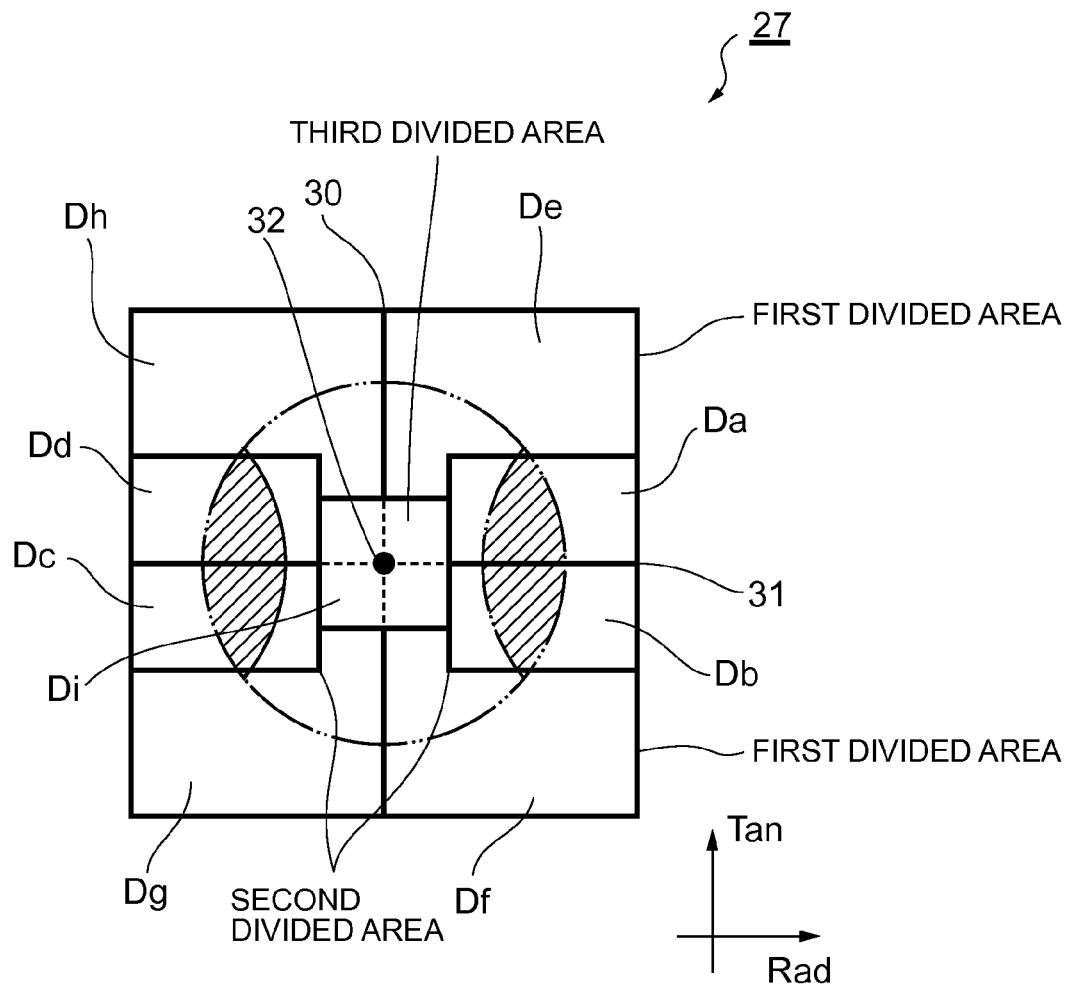
FIG. 3 is a plane view showing a configuration example for a hologram element according to the first embodiment.

FIG. 3 is an example of a schematic plan view of the hologram element 27 shown in FIG. 2 as seen from a direction along the optical axial direction. A chain double-dashed line in FIG. 3 indicates the outline of a light spot of the light beam L on the hologram element 27 when a focal point of the objective lens 10 is formed on a desired information recording layer of the optical disc 3. Also, shaded areas indicate interference areas (push-pull patterns) of the ±1st-order disc-diffracted light and the 0th-order disc-diffracted light which are diffracted by the track of the optical disc 3.

Furthermore, solid lines indicates boundaries between areas and the hologram element 27 is composed of: areas De, Df, Dg, and Dh (first divided area) where the 0th-order diffracted light reflected from the track of the optical disc 3 enters; and areas Da, Db, Dc, and Dd (second divided area) and an area Di (third divided area) where the 0th-order diffracted light and the ±1st-order diffracted light enter. The light beam L1 entering the respective areas is diffracted in different directions. Incidentally, the area Di in the hologram element 27 in FIG. 3 is located in a specified area including a center 32 of the hologram element 27 where a first division line 30 extending in the tangential direction intersects with the second division line 31 extending in the radial direction; the areas De, Df, Dg, and Dh are specified areas including the four corners of the hologram element 27 and located along the straight line of the first division line 30 so that they are generally symmetrical with respect to the first division line 30; and the areas Da, Db, Dc, and Dd are located along the second division line 31 so that they are generally symmetrical with respect to the second division line 31. In other words, the hologram element 27 is characterized in that it has the first, second and third divided areas; the third divided area is an area including the center of the hologram element 27; the first divided area is an area located along the first division line 30 extending in a direction generally parallel to the track of the optical disc 3 and passing through the approximate center of the hologram element 27; the second divided area is an area located along the second division line 31 extending in a direction generally perpendicular to the track of the optical disc 3 and passing through the approximate center of the hologram element 27; and the third divided area includes a push-pull area, where the 0th-order diffracted light and the ±1st-order diffracted light from the track of the optical disc 3 intersect with each other; and at least two detection parts for detecting the light beam L1 diffracted at the first divided area are aligned in a direction generally perpendicular to the track of the optical disc 3 and at least two detection parts for detecting the light beam L1 diffracted at the second divided area are aligned in a direction generally parallel to the track of the optical disc 3. Furthermore, this embodiment is characterized in that the size of the detector 29 is reduced by dividing the first divided area or the second divided area into at least four parts and combining the arrangements of the detection parts.

Incidentally, regarding the diffraction efficiency of the hologram element 27, for example, a ratio of the 0th-order diffracted light, the +1st-order diffracted light, and the −1st-order diffracted light is assumed to be 7:3:0. Accordingly, the detector 29 of the optical pickup device 5 according to this embodiment receives the 0th-order diffracted light, which has permeated through the hologram element 27, and the +1st-order diffracted light diffracted by the hologram element 27.

FIG. 4 shows an example of an arrangement pattern of the detection parts of the detector 29. A shaded area and black dots in FIG. 4 represent signal light. Now, the 0th-order diffracted light which has permeated through the areas Da, Db, Dc, Dd, De, Df, Dg, Dh, and Di of the hologram element 27 enters detection parts a, b, c, and d (first detection part group). Then, the focusing error signal and the RF signal can be obtained based on signals A, B, C, and D which are output from the detection parts a, b, c, and d (first detection part group) of the detector 29 according to the quantity of light.

In this embodiment, for example, an astigmatic method is used in order to detect the focusing error signal. The astigmatic method is a method of making use of the characteristic that the shape of a light spot of the light beam L1 which enters the detection parts a, b, c, and d (first detection part group) of the detector 29 is changed by the position of the focal point. In a case of a defocus state where the position of the information recording layer of the optical disc 3 becomes closer to or moves away from the focal point of the objective lens 10, the quantity of light which enters the detection parts a, c or the detection parts b, d among the detection parts a, b, c, and d (first detection part group) increases. Then, a difference between signals detected at the detection parts a, c and the detection parts b, d is found; and when the difference becomes 0, it is a state of just focus where the focal point of the objective lens 10 is located on the information recording layer of the optical disc 3. Therefore, the aforementioned actuator drive circuit 9 controls the objective lens 10 so that the above-described difference will become 0. Incidentally, the astigmatic method is a known technique, so any detailed explanation about it has been omitted.

The focusing error signal FES is generated by the aforementioned astigmatic method according to the following mathematic formula by using the signals A, B, C, and D.

[Math. 1]

$$FES=(A+C)-(B+D) \quad (1)$$

Also, the RF signal RF is generated according to the following mathematic formula by using the signals A, B, C, and D.

[Math. 2]

$$RF=A+B+C+D \quad (2)$$

Furthermore, the +1st-order diffracted light diffracted at the areas Da, Db, Dc, Dd, De, Df, Dg, and Dh of the hologram element 27 enters the detection parts a1, b1, c1, d1, e1, f1, g1, and h of the detector 29 shown in FIG. 4, respectively. Then, the tracking error signal can be obtained by using signals A1, B1, C1, D1, E1, F1, G1, and H1 which are output from the detection parts a1, b1, c1, d1, e1, f1, g1, and h1 of the detector 29 according to the quantity of light. Incidentally, the +1st-order diffracted light (not shown) diffracted at the area Di is treated as unnecessary light and enters the detector 29 by avoiding the detection parts in the radial direction.

In this embodiment, for example, a 1-beam Differential-Push-Pull method (hereinafter referred to as the 1-beam DPP [Differential-Push-Pull] method) is used to detect the tracking error signal.

The 1-beam DPP method is a method for generating the tracking error signal from a push-pull signal without generating offset when performing lens shift. The push-pull signal can be generated by, for example, dividing the optical beam, which has been reflected by the information recording layer of the optical disc 3, into two beams by using a division line extending through the center of the optical beam and generally in parallel with the tangential direction of the hologram element 27 and finding a difference between the right and left light beams. However, if only the signal including a push-pull component is used, when the position of the objective lens is changed in the radial (Rad) direction, that is, when the lens shift is performed, the quantity of light will become unbalanced and offset of a direct-current component will occur, thereby generating an unstable tracking error signal. So, a stable tracking error signal can be obtained by performing the operation to cancel offset by using a signal including an offset component. Performing the DPP method with one beam is called the 1-beam DPP method. Incidentally, the 1-beam DPP method is a known technique, so any further explanation about it has been omitted.

The tracking error signal TES is generated by the aforementioned 1-beam DPP method according to the following mathematical formula by using the signals A1, B1, C1, D1, E1, F1, G1, and H1.

[Math. 3]

$$TES=\{(A1+B1)-(C1+D1)\}-kt\{(E1+F1)-(G1+H1)\} \quad (3)$$

The letters kt in Mathematical Formula (3) is a coefficient for correcting an offset component included in the signals of a first term in Mathematical Formula (3) and an offset component included in the signals of a second term in Mathematical Formula (3) when the lens shift of the objective lens 10 is performed. As a result of such an operation, the stable tracking error signal without offset can be generated even if the lens shift of the objective lens 10 is performed.

Incidentally, an explanation will be given about stray light which occurs in an information recording layer other than a desired information recording layer (hereinafter referred to as the other information recording layer(s)) when recording and reproducing information in the multi layer optical disc 3 with reference to FIG. 5 to FIG. 8. when recording and reproducing information in the multi layer optical disc 3, it is necessary to think of at least two kinds of stray light. It is necessary to locate the detection parts of the detector 29 by avoiding the stray light (minimum interlayer stray light) when an interlayer distance between the adjacent information recording layers of the optical disc 3 is small. Furthermore, it is necessary to locate the detection parts of the detector 29 by avoiding: stray light (maximum interlayer stray light) from an information recording layer which is farthest from a plane of incidence of the light beam on the multi layer optical disc 3 (hereinafter referred to as the most back-side information recording layer) when recording and reproducing information in an information recording layer closest to the plane of incidence of the light beam on the multi layer optical disc 3 (hereinafter referred to as the most front-side information recording layer); and stray light (maximum interlayer stray light) from the most front-side information recording layer when recording and reproducing information in the most back-side information recording layer.

Specifically speaking, in the case of the multi layer optical disc 3, the distance between the adjacent information recording layers is shorter than that of a dual layer optical disc 3, so that the distance between the light beam L1 entering the detector 29 in a just-focus state and the stray light entering in a defocus state becomes narrower; and if the distance between the detection parts of the detector 29 respectively corresponding to the areas in the hologram element 27 is narrowed to reduce the area of the detector 29, the problem would be that the stray light diffracted at other areas would enter. Furthermore, in a case of the multi layer optical disc 3 with three or more layers, the number of layers is larger than that of the dual layer optical disc 3, so the distance between the most front-side information recording layer and the most back-side information recording layer becomes larger. Accordingly, the distance between the light beam L1 entering the detector 29 in the just-focus state and the stray light becomes larger in proportion to the distance between these information recording layers and the width of the stray light also increases accordingly. So, the distance between the detection parts of the detector 29 respectively corresponding to the areas in the hologram element 27 needs to be expanded, which results in a problem of an increase of the area of the detector 29.

Figure 5:
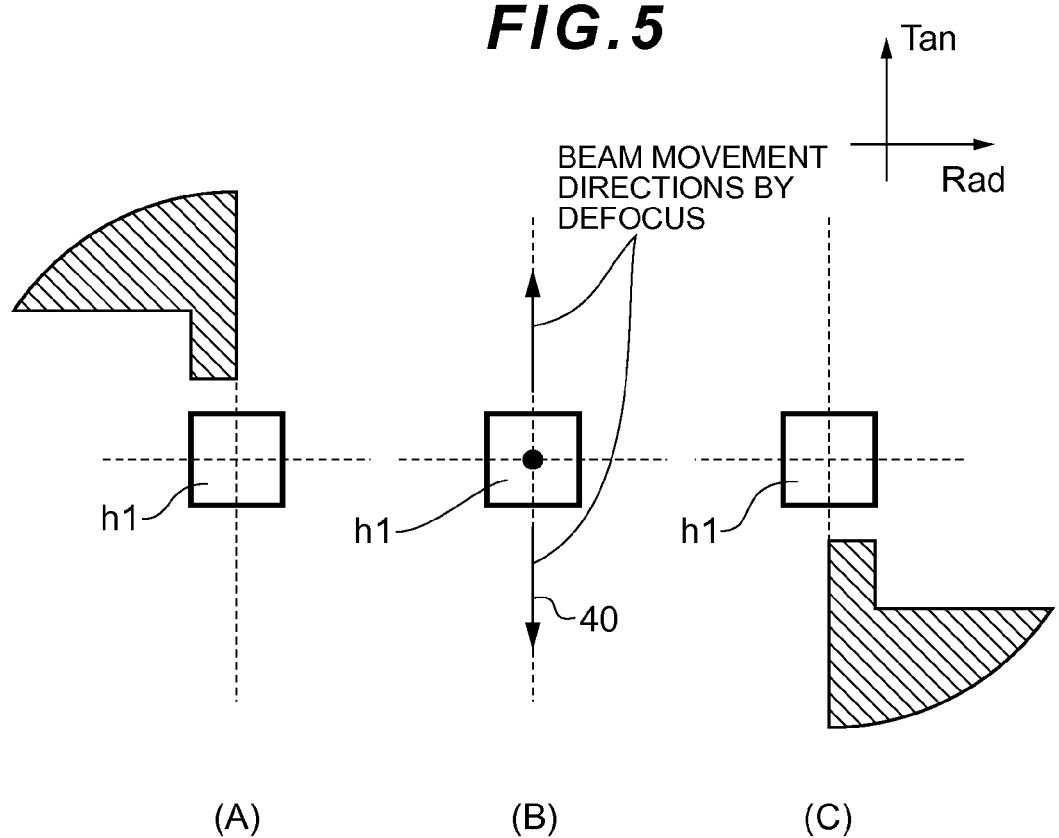
FIG. 5(A) is a schematic plan view of a light beam incident on a detection part h1 in a defocus state as seen from a direction along an optical axial direction.
FIG. 5(B) is a schematic plan view of a light beam incident on the detection part h1 in a just focus state as seen from the direction along the optical axial direction.
FIG. 5(C) a schematic plan view of a light beam incident on the detection part h1 in the defocus state as seen from the direction along the optical axial direction.

The stray light (minimum interlayer stray light) which is generated in a case where the distance between the adjacent information recording layers is small when recording and reproducing information in the multi layer optical disc 3 will be explained. FIG. 5 is a schematic plan view of the light beam L1, which has been diffracted at the area Dh of the hologram element 27 and enters the detection part h1, as seen from the direction along the optical axial direction. A black dot shown in FIG. 5(B) represents a light spot on the detection part h1 which has received the light beam L1 in the just focus state when the objective lens 10 forms a focal point on a desired information recording layer of the optical disc 3. A shaded area shown in FIG. 5(A) represents a light spot on the detection part h1 which has received the light beam L1 in the defocus state when the objective lens 10 forms a focal point in front of the information recording layer(s). A shaded area shown in FIG. 5(C) represents a light spot on the detection part h1 which has received the light beam L1 in the defocus state when the objective lens 10 forms a focal point behind the information recording layers.

Incidentally, the light beam L1 in the defocus state as shown in FIG. 5(A) forms the focal point behind the detector 29, so that the outline of the light spot on the detection part h1 becomes similar to that of the light spot of the light beam L1 passing through the area Dh in a direction projecting an image of the hologram element 27 as it is. Furthermore, the light beam L1 in the defocus state as shown in FIG. 5(C) forms the focal point in front of the detector 29, so that the light spot on the detection part h1 appears in a direction where an image of the hologram element 27 is reversed and projected to a point-symmetrical position. Therefore, since the light beam on the detector 29 becomes blurred point-symmetrically with respect to the convergence position shown in FIG. 5(B), the light beam L1 diffracted at the area Dh moves in a tangential direction because of defocus as shown in FIG. 5(A) to FIG. 5(C) and with arrows 40.

Now, the defocus is explained because the stray light from the other layer(s) in the multi layer optical disc can be interpreted as the light beam L1 in the defocus state which has been reflected at a position that is not the focal position. Specifically speaking, the light beam L1 in the defocus state as shown in FIG. 5(A) can be interpreted as the stray light from a front-side recording layer when the focal point is formed on a recording layer behind the front-side recording layer of the two recording layers. Furthermore, the light beam L1 in the defocus state as shown in FIG. 5(C) can be interpreted as the stray light from the recording layer behind the front-side recording layer when the focal point is formed on the front-side recording layer of the two recording layers.

Figure 6:
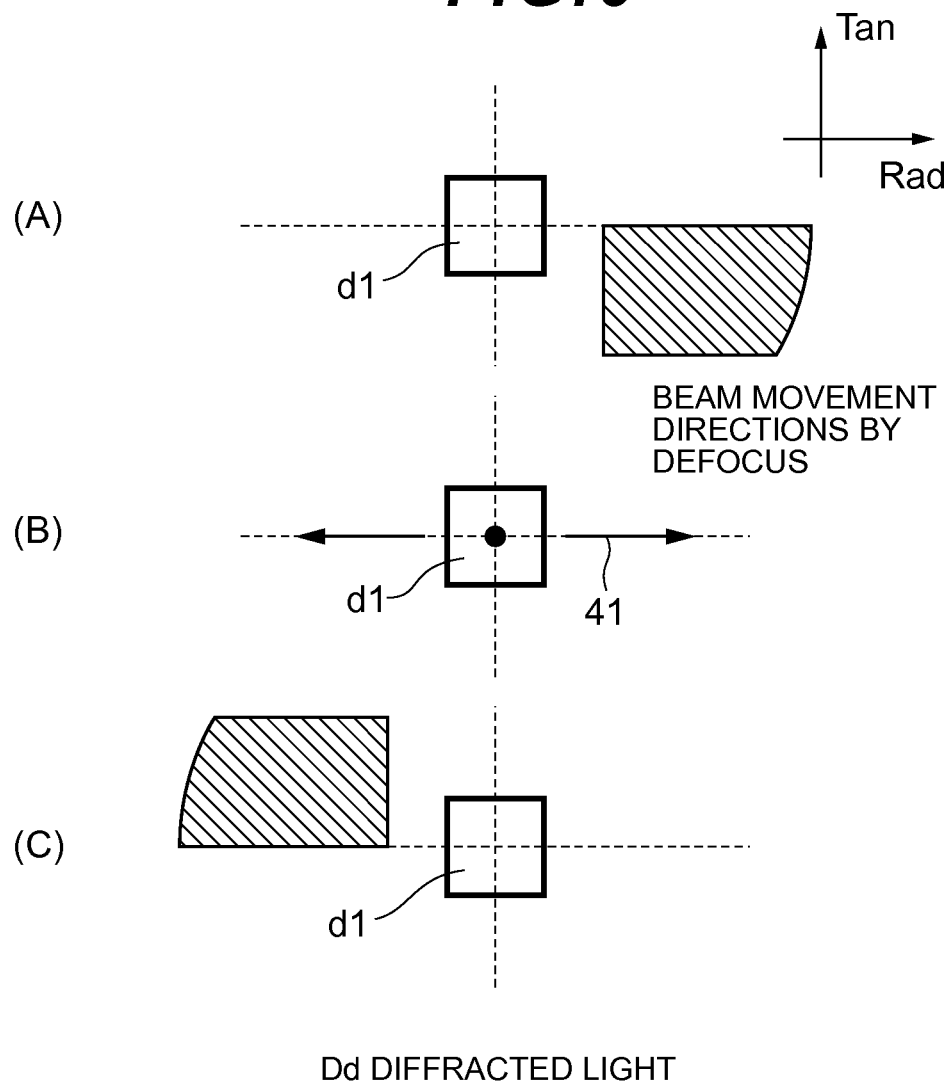
FIG. 6(A) is a schematic plan view of a light beam incident on a detection part d1 in the defocus state as seen from the direction along the optical axial direction.
FIG. 6(B) is a schematic plan view of a light beam incident on the detection part d1 in the just focus state as seen from the direction along the optical axial direction.
FIG. 6(C) a schematic plan view of a light beam incident on the detection part d1 in the defocus state as seen from the direction along the optical axial direction.

FIG. 6 is a schematic plan view of the light beam L1, which has been diffracted at the area Dd of the hologram element 27 and enters the detection part d1, as seen from the direction along the optical axial direction. A black dot shown in FIG. 6(B) represents a light spot on the detection part d1 which has received the light beam L1 in the just focus state when the objective lens 10 forms a focal point on a desired information recording layer of the optical disc 3. A shaded area shown in FIG. 6(A) represents a light spot on the detection part d1 which has received the light beam L1 in the defocus state when the objective lens 10 forms a focal point behind the information recording layers. A shaded area shown in FIG. 6(C) represents a light spot on the detection part d1 which has received the light beam L1 in the defocus state when the objective lens 10 forms a focal point in front of the information recording layers.

Incidentally, the light beam L1 in the defocus state as shown in FIG. 6(A) forms the focal point in front of the detector 29, so that the light spot on the detection part h1 appears in a direction where an image of the hologram element 27 is reversed and projected to a point-symmetrical position. Furthermore, the light beam L1 in the defocus state as shown in FIG. 6(C) forms the focal point behind the detector 29, so that the outline of the light spot on the detection part d1 becomes similar to that of the light spot of the light beam L1 passing through the area Dh in a direction projecting an image of the hologram element 27 as it is. Therefore, since the light beam becomes blurred point-symmetrically with respect to the convergence position shown in FIG. 6(B), the light beam L1 diffracted at the area Dd moves in a radial direction because of defocus as shown in FIG. 6(A) to FIG. 6(C) and with arrows 41.

Now, as a result of comparison between FIG. 5 and FIG. 6, it can be seen that the moving directions of the light beam L1, which enters the detection parts, as a result of the defocus are different. For example, the light beam L1 diffracted at the area Dh moves in the tangential direction as a result of the defocus and the light beam diffracted at the area Dd moves in the radial direction as a result of the defocus. Accordingly, it is important to differentiate how to avoid the stray light, depending on the relevant area. For example, when the areas of the hologram element 27 are the areas De, Df, Dg, Dh (the first divided area) which are separated from the center 32 in the tangential direction, it is desirable that the stray light should be avoided in the tangential direction. By avoiding the stray light in the above-described manner, it is possible to configure the optical pickup device so that the stray light will not enter the detection parts of the detector 29 even if the position of the objective lens 10 is changed in the radial direction in order to follow the track of the optical disc 3. On the other hand, if the detection parts e1, f1, g1, and h1 (the second detection part group) for detecting the light beam L1 diffracted at the areas De, Df, Dg, and Dh (the first divided area) are aligned in the tangential direction, the distance between the light beam L1 entering the detector 29 in the just-focus state and the stray light entering in the defocus state becomes narrow, and the resulting problem would be that the stray light of the light beam L1 diffracted at other areas may enter the detection parts in the case of the minimum interlayer stray light caused by the optical disc 3 with a small interlayer distance. Therefore, the influence of the stray light which has occurred between the information recording layers having a relationship of the minimum interlayer distance can be minimized by aligning the detection parts e1, f1, g1, and h1 (the second detection part group) of the detector 29 in the radial direction.

Furthermore, if the areas of the hologram element 27 are the areas Da, Db, Dc, and Dd (the second divided area) which are separated from the center 32 in the radial direction, it is desirable to avoid the stray light in the radial direction. By avoiding the stray light in the above-described manner, it is possible to configure the optical pickup device so that the stray light will not enter the detection parts of the detector 29 even if the position of the objective lens 10 is changed in the radial direction in order to follow the track of the optical disc 3. On the other hand, if the detection parts a1, b1, c1, and d1 (the third detection part group) for detecting the light beam L1 diffracted at the areas Da, Db, Dc, and Dd (the second divided area) are aligned in the radial direction, the distance between the light beam L1 entering the detector 29 in the just-focus state and the stray light entering in the defocus state becomes narrow, and the resulting problem would be that the stray light of the light beam L1 diffracted at other areas may enter the detection parts in the case of the minimum interlayer stray light caused by the optical disc 3 with a small interlayer distance. Therefore, the influence of the stray light which has occurred between the information recording layers having a relationship of the minimum interlayer distance can be minimized by aligning the detection parts a1, b1, c1, and d1 (the third detection part group) of the detector 29 in the tangential direction.

Figure 7:
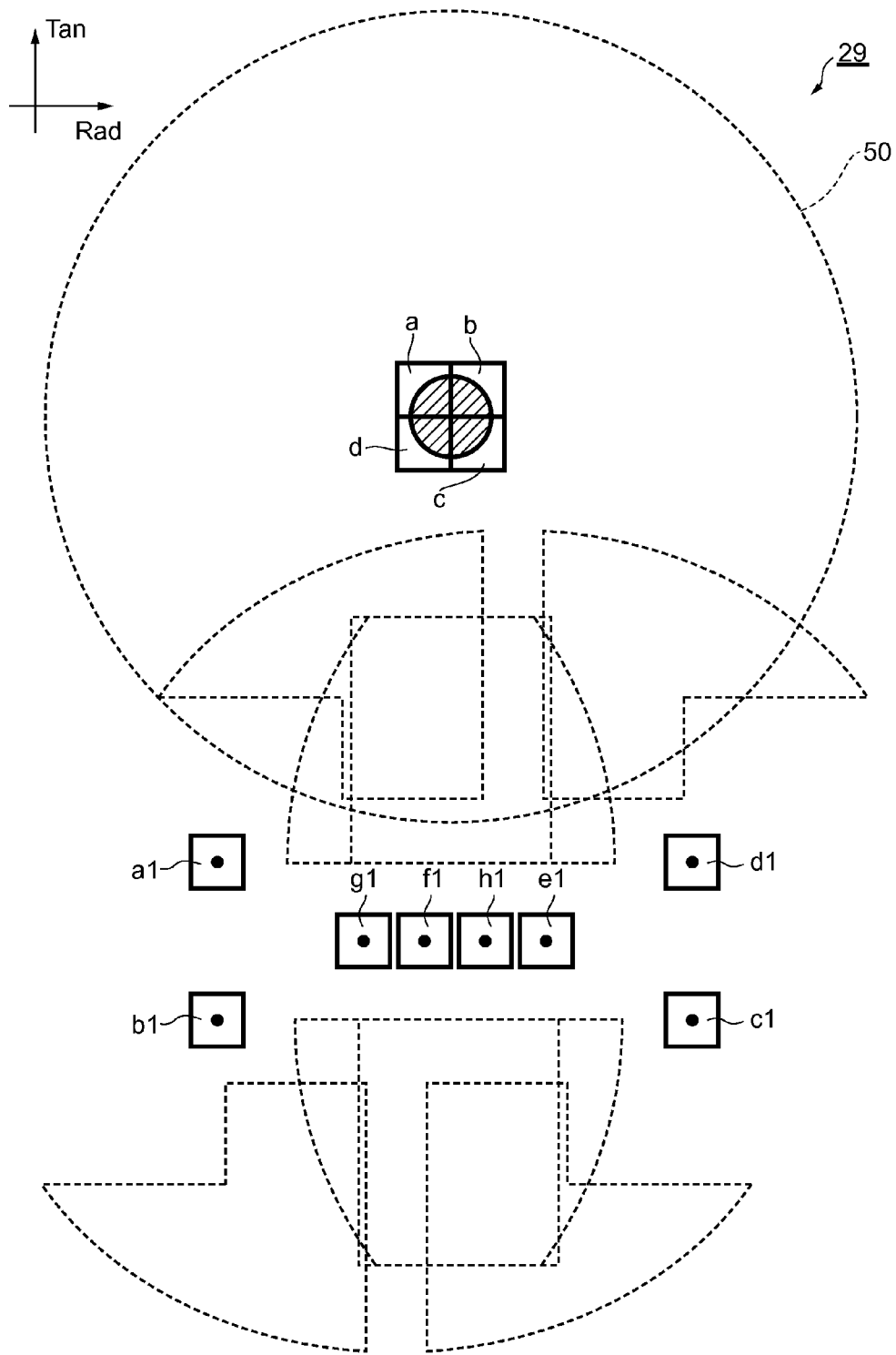
FIG. 7 is a schematic plan view showing a state of a maximum interlayer stray light caused by a light beam which has entered the detector.

Next, the stray light (maximum interlayer stray light) which occurs in a case where the interlayer distance between the information recording layers is large when recording and reproducing information in the multi layer optical disc 3 will be explained. FIG. 7 is a schematic plan view of the light beam L1 which has been diffracted at each area Da to Dh of the hologram element 27 and enters the detection parts a1 to h1 of the detector 29 as seen from the direction along the optical axial direction. Each of black dots and shaded areas shown in FIG. 7 represents a light spot on the relevant detection part which has received the light beam L1 when the objective lens 10 forms a focal point on a desired information recording layer of the optical disc 3. Dashed lines shown in FIG. 7 represent the maximum interlayer stray light.

When explaining the maximum interlayer stray light, it has to be explained by referring to: stray light (maximum interlayer stray light) which occurs from the most back-side information recording layer when the focal point of the objective lens 10 is formed on the most front-side information recording layer of the multi layer optical disc 3; and stray light (maximum interlayer stray light) which occurs from the most front-side information recording layer when the focal point of the objective lens 10 is formed on the most back-side information recording layer. However, for ease of explanation, the case of the stray light from the most back-side information recording layer when the focal point is formed on the most front-side information recording layer will be explained below with reference to FIG. 7.

The light spot of the stray light of the light beam L1 in the defocus state expands in the radial direction and the tangential direction and the size of the light spot also increases in accordance with the distance between the most front-side information recording layer and the most back-side information recording layer which have a relationship of the maximum interlayer distance with the largest interlayer distance.

Specifically speaking, for example, in a case of a dual layer optical disc 3, the interlayer distance between the most front-side information recording layer and the most back-side information recording layer is normally defined as 25±5 micrometers and is 20 micrometers at minimum and 30 micrometers at maximum, so that the size of the light spot on the detector 29 by the stray light which has occurred in the other information recording layer(s) is limited to a certain degree. However, in a case of an optical disc 3 with three or more layers, for example, there is a possibility that the largest interlayer distance between the most front-side information recording layer and the most back-side information recording layer may be longer than the interlayer distance of the dual layer case. If the interlayer distance becomes longer, and when the focal point of the objective lens 10 is formed on the most front-side information recording layer, the distance between the focal point of the stray light from the most back-side information recording layer and the detector 29 becomes longer; and as a result, the stray light expands on the detector 29 in the radial direction and the tangential direction and the light spot further becomes larger relative to the light beam L1 which enters in the just-focus state on the detector 29.

Accordingly, it is necessary to locate the detection parts a, b, c, and d (the first detection part group), the detection parts e1, f1, g1, and h1 (the second detection part group), and the detection parts a1, b1, c1, and d1 (the third detection part group) of the detector 29 at sufficiently separate positions to prevent the stray light from entering the detection parts in order to avoid the above-described maximum interlayer stray light so as to obtain a stable tracking error signal.

Since the optical pickup device is configured to prevent the minimum interlayer stray light and the maximum interlayer stray light, which occur in the other information recording layer(s) when recording and reproducing information in the multi layer optical disc 3 as described above, from entering the detection parts of the detector 29, the detector in the conventional optical pickup device described in Japanese Patent Application Laid-Open (Kokai) Publication No. 2008-135151 detects a stable tracking error signal even with a multi layer optical disc by locating the detection parts at positions separate from the stray light.

In the case of the conventional optical pickup device described in Japanese Patent Application Laid-Open (Kokai) Publication No. 2008-135151, the second and third detection part groups of the detector for detecting the tracking error signal are actually located at positions sufficiently separated from the optical axis of the 0th-order diffracted light in order to avoid the maximum interlayer stray light 50 (FIG. 7) which occurs as a result of incidence of the 0th-order diffracted light on the first detection part group. Then, the second detection part group composed of a plurality of detection parts is aligned in the radial direction relative to the optical axis. Furthermore, the third detection part group is aligned and placed in the tangential direction and the second detection part group and the third detection part group are located in directions to form approximately 90 degrees with the optical axis, thereby enabling the second and third detection part groups to avoid the maximum interlayer stray light 50 caused by the 0th-order diffracted light and also avoid the minimum interlayer stray light and the maximum interlayer stray light which occur in the radial direction and the tangential direction of the first detection part group and the second detection part group, respectively.

However, the problem of such a conventional detector is that the second and third detection part groups expand in proportion to the maximum interlayer distance between recording layers of the disc and the required area of the detection parts of the detector 29 increases and the size of the detector 29 increases accordingly.

Figure 8:
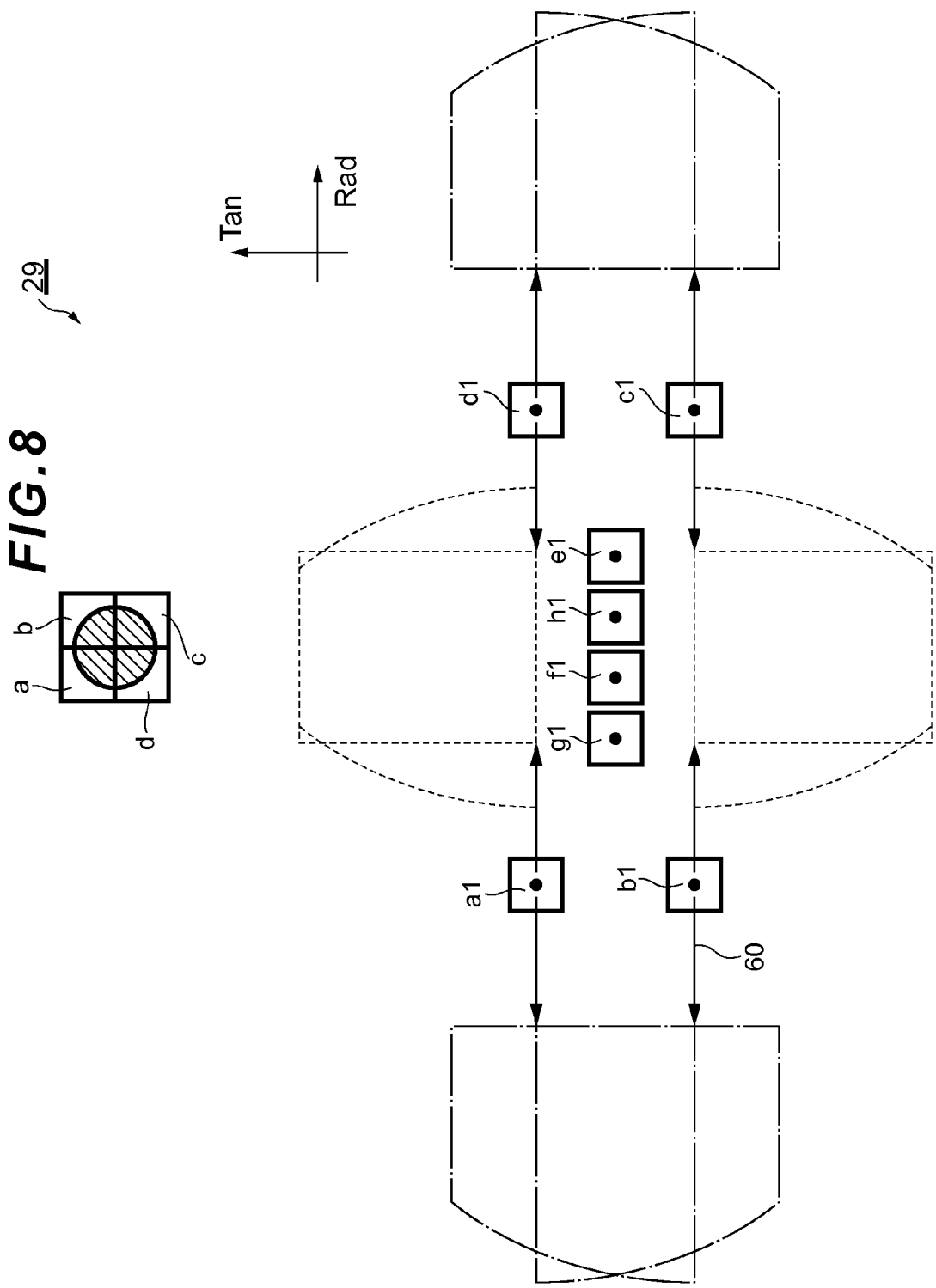
FIG. 8 is a schematic plan view of a light beam L1 which has entered detection parts a1, b1, c1, and d1, as seen from the direction along the optical axial direction.
Figure 9:
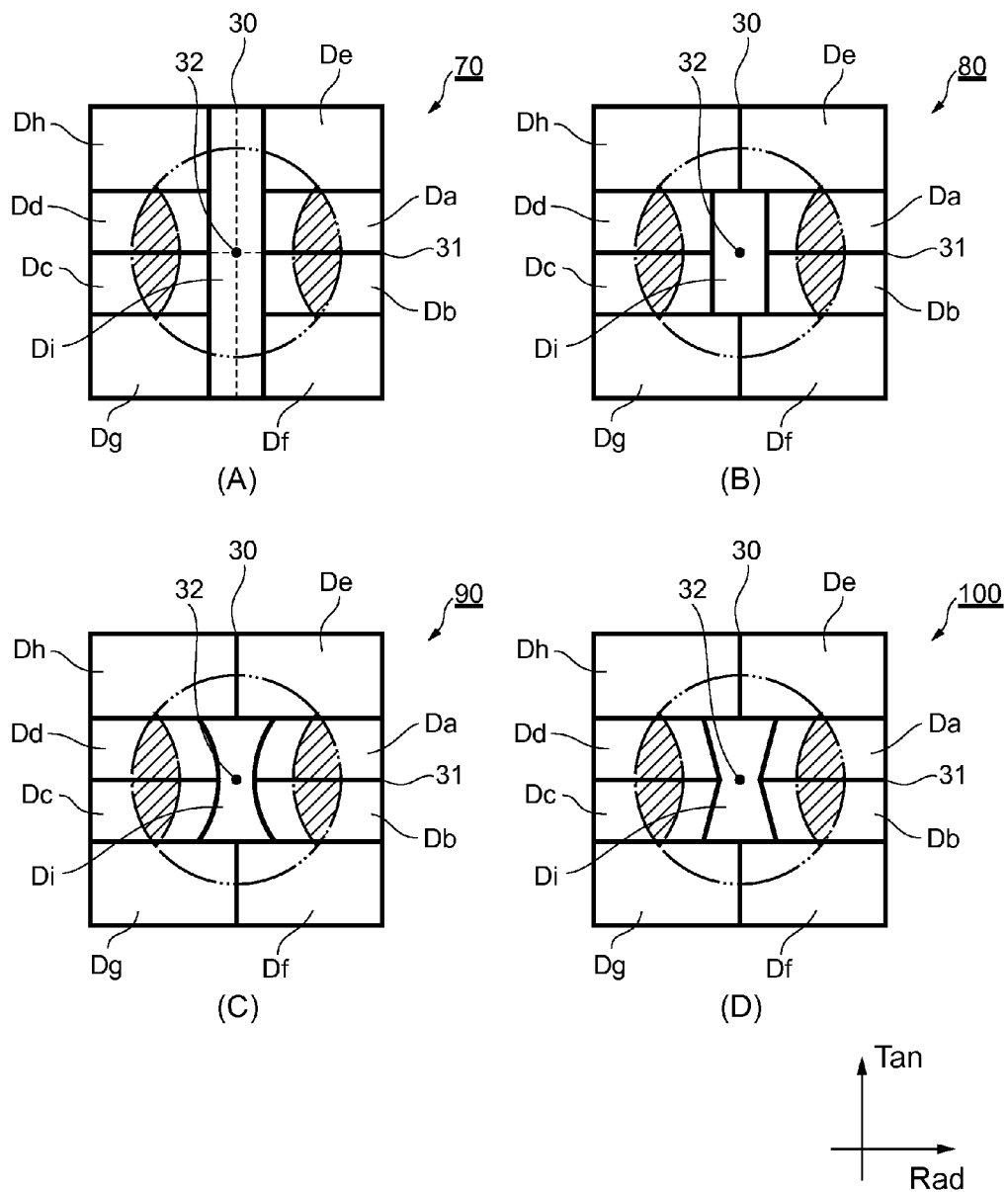
FIG. 9(A) shows a variation where a third area is extended along the tangential direction.
FIG. 9(B) shows a variation where the third area has the same tangential-direction width as that of second areas.
FIG. 9(C) shows a variation where the third area is of an arcuate shape.
FIG. 9(D) shows a variation where the third area is of a V-shape.

So, with the optical disc apparatus 1 according to this embodiment, the detection parts e1, f1, g1, and h1 (the second detection part group) and a1, b1, c1 and d1 (the third detection part group) are located at positions where the maximum interlayer stray light 50 (FIG. 7), which is caused by the 0th-order diffracted light and has occurred due to the incidence of the 0th-order diffracted light on the first detection part group, would not be received, as shown in FIG. 8 in order to prevent the above-described problem. Furthermore, the detection parts e1, f1, g1, and h1 (the second detection part group) and a1, b1, c1 and d1 (the third detection part group) are gathered and located in the tangential direction, which is the same direction, relative to the first detection part group. Furthermore, the detection parts e1, f1, g1, and h1 (the second detection part group) are located and aligned in the radial direction and the detection parts a1, b1, c1 and d1 (the third detection part group) are located in the tangential direction. As a result, the minimum interlayer stray light and the maximum interlayer stray light can be avoided efficiently and the area of the detection parts on the detector 29 can be reduced.

FIG. 8 is a schematic plan view of the light beam L1, which has been diffracted by the hologram element 27 and enters the detection parts a1, b1, c1, and d1, as seen from the direction along the optical axial direction. Incidentally, for ease of explanation, only the stray light diffracted at the areas Da, Db, Dc, and Dd of the hologram element will be shown in FIG. 8 and explained.

Black dots in FIG. 8 indicate signal light; dashed lines indicate stray light from the most front-side layer when recording and reproducing information in the most back-side layer; and alternate long and short dash lines indicate stray light from the back-side layer(s) when recording and reproducing information in the most front-side layer. Incidentally, the dashed lines and the alternate long and short dash lines do not occur at the same time, but they are indicated in the same drawing for the sake of explanation.

Furthermore, arrows 60 indicate movement directions of the stray light, which change according to the distance between a desired information recording layer and the other information recording layer(s). If the distance between the desired information recording layer and the other information recording layer(s) is small, the minimum interlayer stray light will be located at a position where the length of the arrow 60 is short; and if the distance between the desired information recording layer and the other information recording layer(s) is large, the maximum interlayer stray light will be located at a position where the length of the arrow 60 is long.

Now, for example, the stray light diffracted at the hologram element area Da moves in the radial direction according to the distance between the desired information recording layer and the other information recording layer(s) and expands in the tangential direction at the same time. When this happens, the stray light expanding in the tangential direction depends on the areas of the hologram element 27 as shown in FIG. 6. Therefore, in this embodiment, the detection part a1 is located so that the maximum interlayer stray light and the minimum interlayer stray light diffracted at the area Da of the hologram element 27 would not enter the detection parts e1, f1, g1, and h1 (the second detection part group) aligned in the radial direction. Then, similarly, the detection parts b1, c1, and d1 are located so that the maximum interlayer stray light and the minimum interlayer stray light diffracted at the hologram element areas Db, pc, and Dd would not enter the detection parts e1, f1, g1, and h1 (the second detection part group). As a result, the maximum interlayer stray light and the minimum interlayer stray light diffracted at the areas Da, Db, Dc, and Dd (the second divided area) of the hologram element 27 will not enter the detection parts e1, f1, g1, and h1 (the second detection part group).

Furthermore, the maximum interlayer stray light diffracted at the areas De, Df, Dg, and Dh (the first divided area) of the hologram element 27 moves in the tangential direction according to the distance between the desired information recording layer and the other information recording layer(s), so that it will not enter the detection parts a1, b1, c1, and d1 (the third detection part group). However, the stray light diffracted at the areas De, Df, Dg, and Dh (the first divided area) of the hologram element 27 expands in the radial direction on the detector 29 according to the interlayer distance, so that the detection parts e1, f1, g1, and h1 (the second detection part group) aligned in the radial direction and the detection parts a1 and b1 and the detection parts c1 and d1, which are aligned in the tangential direction are separated by a specified amount in the radial direction and are located at positions avoiding the stray light. As a result, each detection part of the detector 29 can completely avoid the maximum interlayer stray light and the minimum interlayer stray light.

(1-3) Advantageous Effects of this Embodiment

When recording and reproducing information in the optical disc 3 having a plurality of information recording layers according to this embodiment as described above, the minimum interlayer stray light and the maximum interlayer stray light can be avoided even if the detection parts are located in a small area, by combining and locating the detection parts of the detector 29 in consideration of the stray light; and as compared to a case where the size of the detection parts of the detector 29 is increased according to the maximum interlayer stray light which increases in proportion to the maximum interlayer distance of the disc as in a conventional case, it is possible to realize the optical pickup device 5 which can be downsized at low cost.

(1-4) Variation of First Embodiment

Incidentally, the aforementioned first embodiment has described the case where the configuration of the hologram element 27 is designed as shown in FIG. 3; however, the present invention is not limited to this example and, for example, it is only necessary to configure the hologram element 27 as shown in FIG. 9(A), FIG. 9(B), FIG. 9(C), and FIG. 9(D) so that the respective areas De, Df, Dg, and Dh are symmetrical with respect to the first division line 30 and the respective areas Da, Db, Dc, and Dd are symmetrical with respect to the second division line 31. In this case, the area Di (the third divided area) may be configured in any manner.

Furthermore, the aforementioned first embodiment has described the case where the arrangement pattern of the detection parts of the detector 29 is configured as shown in FIG. 4; however, the present invention is not limited to this example and, for example, any arrangement pattern of the detection parts for detecting the tracking error signal may be employed as long as the detection parts are located at positions where the maximum interlayer stray light caused by the 0th-order diffracted light which enters the detection parts a, b, c, and d (the first detection part group) can be avoided as shown in FIG. 10(A) and FIG. 10(B).

(2) Second Embodiment (2-1) Configuration of Optical Pickup Device According to this Embodiment Referring to FIG. 1, the reference numeral 130 represents an optical pickup device according to this embodiment. This optical pickup device 130 is configured in the same manner as the optical pickup device 5 according to the first embodiment, except that the configuration of detection parts of a detector 131 is different.

In fact, the first embodiment has described the case where the detection part groups for detecting the tracking error signal, which are composed of the detection parts e1, f1, g1, and h1 (the second detection part group) and a1, b1, c1 and d1 (the third detection part group), are located in the tangential direction relative to the detection parts a, b, c, and d (the first detection part group) of the detector 29. Regarding the detector 131 according to this embodiment, a case where detection part groups for detecting the tracking error signal, which are composed of detection parts e2, f2, g2, and h2 (fourth detection part group) and detection parts a2, b2, c2, and d2 (fifth detection part group), are located in the radial direction relative to the detection parts a, b, c, and d (the first detection part group). As a result, the minimum interlayer stray light and the maximum interlayer stray light can be avoided efficiently and the area of the detection parts on the detector 131 can be reduced with respect to the optical pickup device 130 according to this embodiment in the same manner as the optical pickup device 5 according to the first embodiment.

Figure 11:
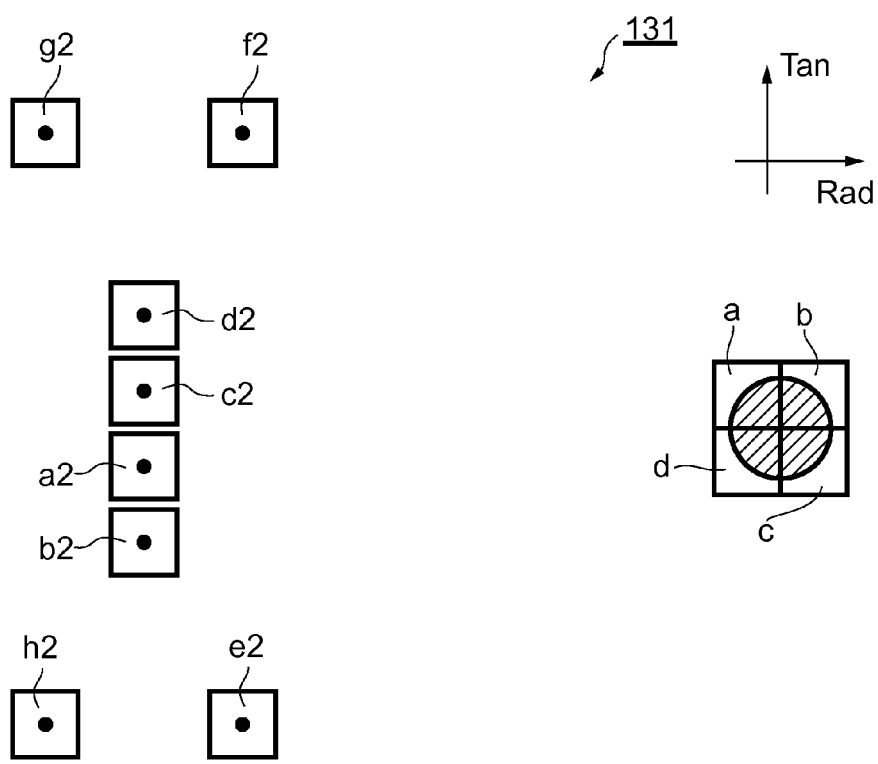
FIG. 11 is a plan view showing an example of an arrangement pattern of detection parts of a detector according to a second embodiment.

FIG. 11 shows a configuration example for the detection parts of the detector 131 used in the optical pickup device 130 according to the second embodiment. With the detector 131 according to this embodiment, the 0th-order diffracted light which has permeated through the areas Da, Db, Dc, Dd, De, Df, Dg, Dh, and Di of the hologram element 27 (FIG. 3) according to the first embodiment enters the detection parts a, b, c, and d (the first detection part group). Then, the focusing error signal and the RF signal can be obtained from signals A, B, C, and D which are output from the detection parts a, b, c, and d (the first detection part group) on the detector 131 according to the quantity of light.

In this embodiment, the focusing error signal FES is generated by the aforementioned astigmatic method according to the following mathematic formula by using the signals A, B, C, and D.

[Math. 4]

$$FES=(A+C)-(B+D) \quad (4)$$

Also, the RF signal RF is generated according to the following mathematic formula by using the signals A, B, C, and D.

[Math. 5]

$$RF=A+B+C+D \quad (5)$$

Furthermore, the +1st-order diffracted light diffracted at the areas Da, Db, Dc, Dd, De, Df, Dg, and Dh of the hologram element 27 enters the detection parts a2, b2, c2, d2, e2, f2, g2, and h2 of the detector 131 shown in FIG. 11, respectively. Then, the tracking error signal can be obtained by using signals A2, B2, C2, D2, E2, F2, G2, and H2 which are output from the detection parts a2, b2, c2, d2, e2, f2, g2, and h2 of the detector 131 according to the quantity of light. Incidentally, the +1st-order diffracted light (not shown) diffracted at the area Di is treated as unnecessary light and enters the detector 131 by avoiding the detection parts in the radial direction.

In this embodiment, the tracking error signal TES is generated by the 1-beam DPP method according to the following mathematical formula by using the signals A2, B2, C2, D2, E2, F2, G2, and H2.

[Math. 6]

$$TES=\{(A2+B2)-(C2+D2)\}-kt\{(E2+F2)-(G2+H2)\} \quad (6)$$

The letters kt in Mathematical Formula (6) is a coefficient for correcting an offset component included in the signals of a first term in Mathematical Formula (6) and an offset component included in the signals of a second term in Mathematical Formula (6) when the lens shift of the objective lens 10 is performed. As a result of such an operation, the stable tracking error signal without offset can be generated even if the lens shift of the objective lens 10 is performed.

Figure 12:
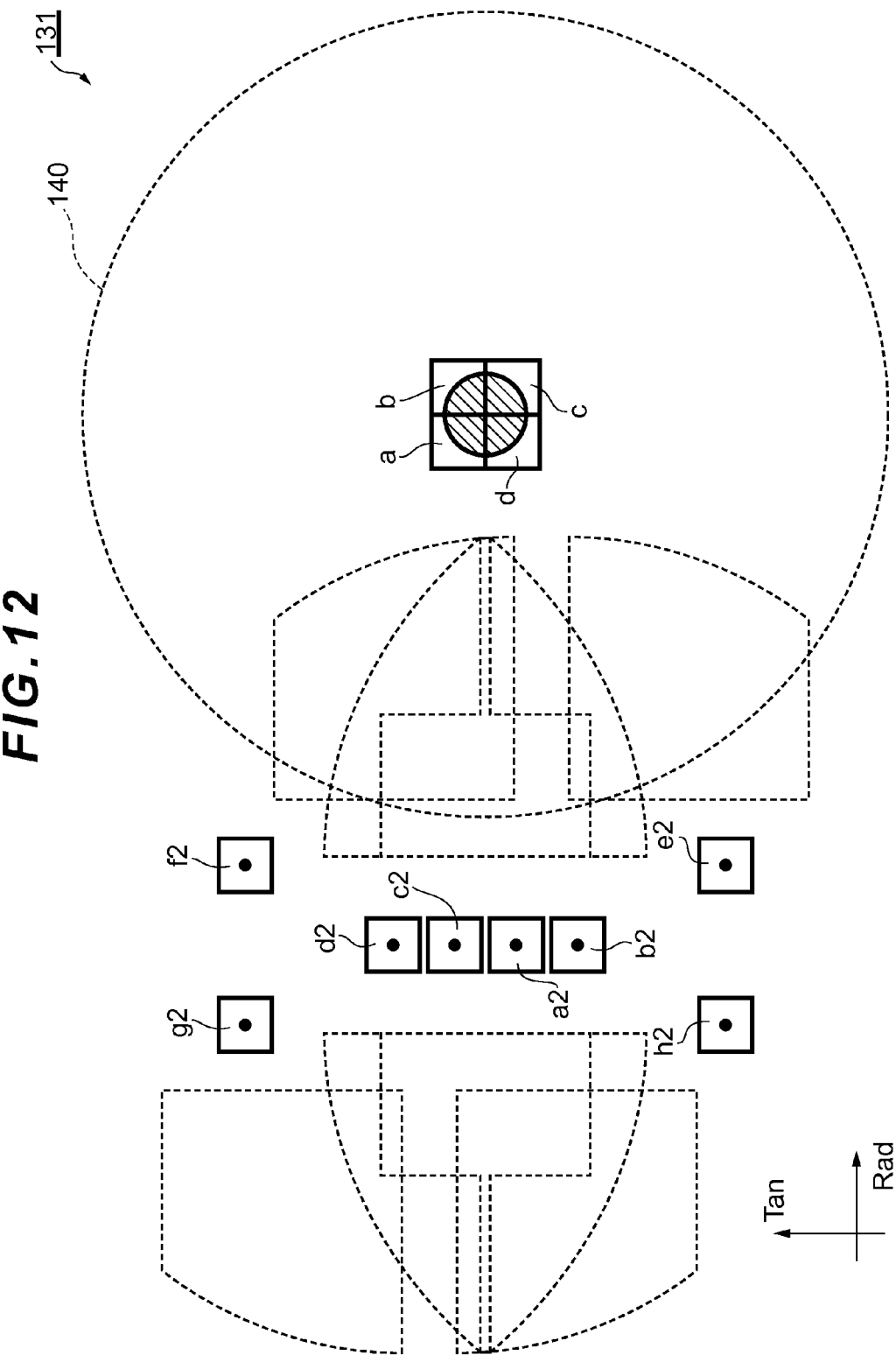
FIG. 12 is a schematic plan view showing the state of a maximum interlayer stray light caused by a light beam which has entered the detector.

A method for avoiding the stray light of the multi layer optical disc 3 according to this embodiment will be explained below with reference to FIG. 12 and FIG. 13.

A method for avoiding the minimum interlayer stray light according to this embodiment will be firstly explained.

Incidentally, the same stray light as the stray light generated at the detection parts shown in FIG. 5 and FIG. 6 from the light beam L1 entering the detection parts because of defocus is also generated at the detection parts of the detector 131 according to this embodiment. Therefore, with the detector 131, the detection parts e2 and h2 and the detection parts f2 and g2 for detecting the light beam diffracted at the areas De, Dh, Dg and Df (the first divided area) of the hologram element 27 are aligned in the radial direction; and the detection parts a2, b2, c2, and d2 (the fifth detection part group) for detecting the light beam diffracted at the areas Da, Db, Dc, and Dd (the second divided area) are aligned in the tangential direction, thereby minimizing the influence of the minimum interlayer stray light.

With the detector 131 as described above, the stray light is avoided in the tangential direction at the areas De, Df, Dg, and Dh (the first divided area) of the hologram element 27, whose positions are separated from the center 32 in the tangential direction; and the stray light is avoided in the radial direction at the areas Da, Db, Dc, and Dd (the second divided area) of the hologram element 27, whose positions are separated from the center 32 in the radial direction. As a result, the detector 131 can avoid the minimum interlayer stray light efficiently.

Next, a method for avoiding the maximum interlayer stray light according to this embodiment will be explained. FIG. 12 is a schematic plan view of the light beam L1 which has been diffracted at each area Da to Dh of the hologram element 27 and enters the detection parts a2 to h2 of the detector 131 as seen from the direction along the optical axial direction. Each of black dots and shaded areas shown in FIG. 12 represents a light spot on the relevant detection part which has received the light beam L1 when the objective lens 10 forms a focal point on a desired information recording layer of the optical disc 3. Dashed lines shown in FIG. 12 represent the maximum interlayer stray light.

When explaining the maximum interlayer stray light, it has to be explained by referring to: stray light (maximum interlayer stray light) which occurs from the most back-side information recording layer when the focal point of the objective lens 10 is formed on the most front-side information recording layer of the multi layer optical disc 3; and stray light (maximum interlayer stray tight) which occurs from the most front-side information recording layer when the focal point of the objective lens 10 is formed on the most back-side information recording layer. However, for ease of explanation, the case of the stray light from the most front-side recording layer when the focal point is formed on the most back-side recording layer will be explained below with reference to FIG. 12.

With the detector 231 according to this embodiment, the detection part groups, which are composed of the detection parts e2, f2, g2, and h2 (the fourth detection part group) and the detection parts a2, b2, c2, and d2 (the fifth detection part group), for detecting the tracking error signal are aligned in the radial direction relative to the first detection part group in order to avoid the maximum interlayer stray light 140 caused by the 0th-order diffracted light entering the detection parts a, b, c, and d (the first detection part group). As a result, the detector 131 can avoid the maximum interlayer stray light 140 caused by the 0th-order diffracted light.

Furthermore, with the detector 131, the detection parts f2 and g2 and the detection parts e2 and h2 for detecting the light beam L1 diffracted at the areas De, Dh, Dg and Df (the first divided area) of the hologram element 27 are aligned in the radial direction and the detection parts a2, b2, c2, and d2 (the fifth detection part group), which are aligned in the tangential direction, for detecting the light beam L1 diffracted at the areas Da, Db, Dc, and Dd (the second divided area) are placed between the detection parts e2 and h2 and the detection parts f2 and g2. As a result, the detector 131 can avoid the maximum interlayer stray light.

Figure 13:
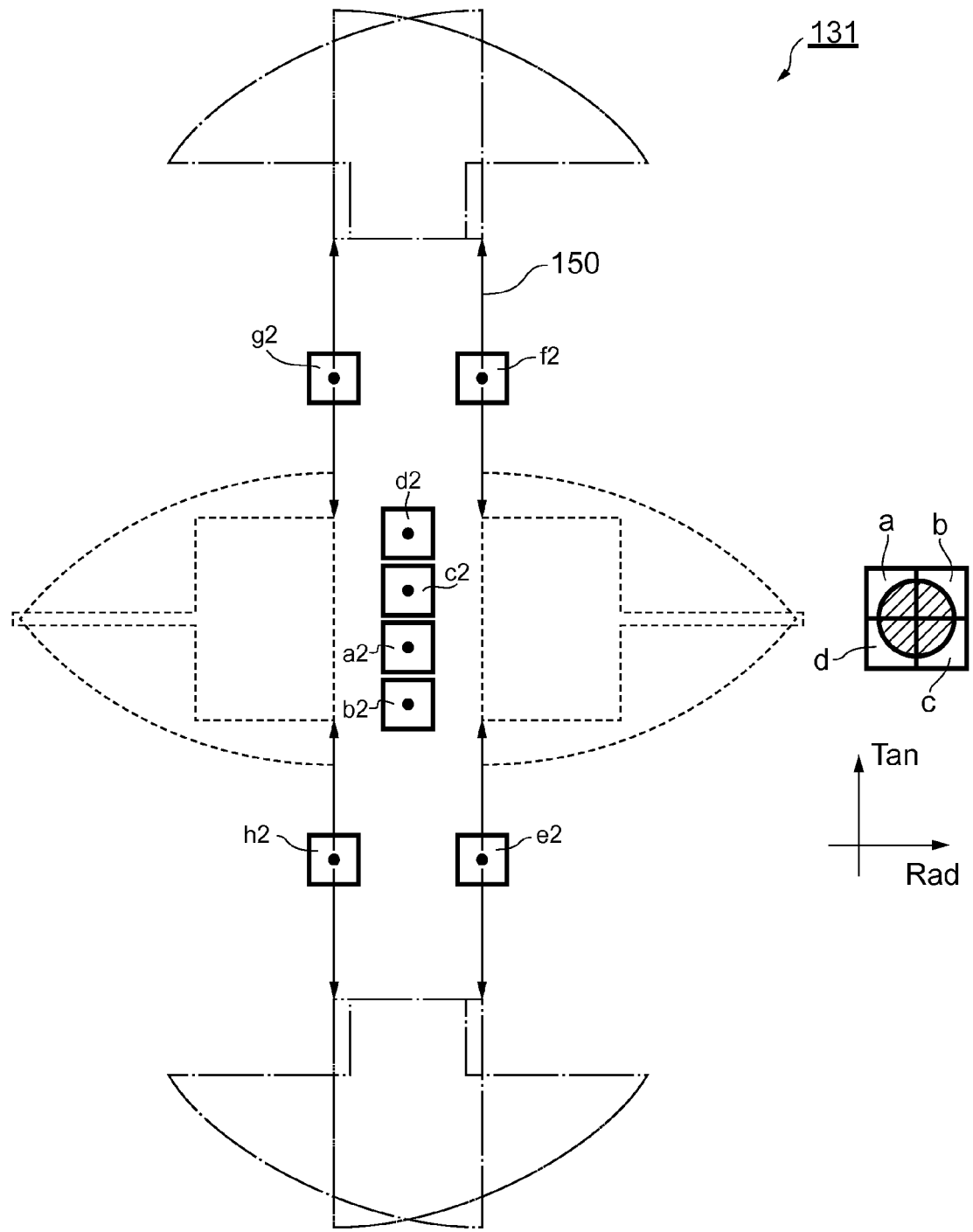
FIG. 13 is a schematic plan view of a light beam L1 which has entered detection parts e1, f1, g1, and h1, as seen from the direction along the optical axial direction.

FIG. 13 is a schematic plan view of the light beam L1 which has been diffracted by the hologram element 27 and enters the detection parts e2, f2, g2, and h2 (the fourth detection part group) as seen from the direction along the optical axial direction. Incidentally, for ease of explanation, only the stray light diffracted at the areas De, Df, Dg, and Dh (the first divided area) of the hologram element will be shown in FIG. 13 and explained.

Black dots in FIG. 13 indicate signal light; dashed lines indicate stray light from the most front-side layer when recording and reproducing information in the most back-side layer; and alternate long and short dash lines indicate stray light from the back-side layer(s) when recording and reproducing information in the most front-side layer. Incidentally, the dashed lines and the alternate long and short dash lines do not occur at the same time, but they are indicated in the same drawing for the sake of explanation.

Furthermore, arrows 150 indicate movement directions of the stray light, which change according to the distance between a desired information recording layer and the other information recording layer(s). If the distance between the desired information recording layer and the other information recording layer(s) is small, the minimum interlayer stray light will be located at a position where the length of the arrow 150 is short; and if the distance between the desired information recording layer and the other information recording layer(s) is large, the maximum interlayer stray light will be located at a position where the length of the arrow 150 is long.

Now, for example, the stray light diffracted at the area De of the hologram element 27 moves in the tangential direction according to the distance between the desired information recording layer and the other information recording layer(s) and expands in the radial direction at the same time. When this happens, the stray light expanding in the radial direction depends on the areas of the hologram element 27 as shown in FIG. 5. Therefore, in this embodiment, the detection part e2 is located so that the maximum interlayer stray light and the minimum interlayer stray light diffracted at the area De of the hologram element 27 would not enter the detection parts a2, b2, c2, and d2 (the fifth detection part group) aligned in the tangential direction. Then, similarly, the detection parts f2, g2 and h2 are located so that the maximum interlayer stray light and the minimum interlayer stray light diffracted at the areas Df, Dg, and Dh of the hologram element 27 would not enter the detection parts a2, b2, c2, and d2 (the fifth detection part group). As a result, the maximum interlayer stray light and the minimum interlayer stray light diffracted at the areas De, Df, Dg, and Dh (the first divided area) of the hologram element 27 will not enter the detection parts a2, b2, c2, and d2 (the fifth detection part group).

Furthermore, the maximum interlayer stray light diffracted at the areas Da, Db, Dc, and Dd (the second divided area) of the hologram element 27 moves in the radial direction according to the distance between the desired information recording layer and the other information recording layer(s), so that it will not enter the detection parts e2, f2, g2, and h2 (the fourth detection part group). However, the stray light diffracted at the areas Da, Db, Dc, and Dd (the second divided area) of the hologram element 27 expands in the tangential direction on the detector 29 according to the interlayer distance, so that the detection parts f2 and g2 and the detection parts e2 and h2, which are aligned in the radial direction, and the detection parts a2, b2, c2, and d2, which are aligned in the tangential direction, are separated by a specified amount in the tangential direction and are located at positions avoiding the stray light. As a result, each detection part of the detector 131 can completely avoid the maximum interlayer stray light and the minimum interlayer stray light.

(2-2) Advantageous Effects of this Embodiment

The optical pickup device 130 according to this embodiment can obtain the same advantageous effects as those of the optical pickup device 5 according to the first embodiment as described above.

(2-3) Variation of Second Embodiment

Incidentally, the aforementioned second embodiment has described the case where the arrangement pattern of the detection parts of the detector 131 is configured as shown in FIG. 4; however, the present invention is not limited to this example and, for example, any arrangement pattern of the detection parts for detecting the tracking error signal may be employed as long as the detection parts are located at positions where the maximum interlayer stray light caused by the 0th-order diffracted light which enters the detection parts a, b, c, and d (the first detection part group) can be avoided as shown in FIG. 14.

(3) Third Embodiment (3-1) Configuration of Optical Pickup Device According to this Embodiment Referring to FIG. 1, the reference numeral 170 represents an optical pickup device according to this embodiment. This optical pickup device 170 is configured in the same manner as the optical pickup device 5 according to the first embodiment, except that the configuration of detection parts of a detector 171 is different.

In fact, the first embodiment has described the case where the detection parts a1 and b1 and the detection parts c1 and d1 of the detector 29 for detecting the light beam diffracted at the areas Da, Db, Dc, and Dd (the second divided area) of the hologram element 27 are aligned respectively in the tangential direction and the detection parts e1, f1, g1, and h1 (the second detection part group), which are aligned in the radial direction, for detecting the light beam L1 diffracted at the areas De, Df, Dg, and Dh (the first divided area) are placed between the detection parts a1 and b1 and the detection parts c1 and d1. Regarding the detector 171 according to this embodiment, an explanation will be given about a case where detection parts e3, f3, g3, and h3 (sixth detection part group) for detecting the light beam L1 diffracted at the areas De, Df, Dg, and Dh (the first divided area) of the hologram element 27 are aligned in the radial direction; and, furthermore, detection parts a3, b3, c3, and d3 (seventh detection part group) of the detector 171 for detecting the light beam L1 diffracted at the areas Da, Db, Dc, and Dd (the second divided area) are aligned along the same extension line in the tangential direction. As a result, the minimum interlayer stray light and the maximum interlayer stray light can be avoided efficiently and the area of the detection parts on the detector 171 can be reduced with respect to the optical pickup device 170 according to this embodiment in the same manner as the optical pickup device 5 according to the first embodiment.

FIG. 15 shows a configuration example for the detection parts of the detector 171 used in the optical pickup device 170 according to the third embodiment. With the detector 171 according to this embodiment, the 0th-order diffracted light which has permeated through the areas Da, Db, Dc, Dd, De, Df, Dg, Dh, and Di of the hologram element 27 (FIG. 3) according to the first embodiment enters the detection parts a, b, c, and d (the first detection part group). Then, the focusing error signal and the RF signal can be obtained from signals A, B, C, and D which are output from the detection parts a, b, c, and d (the first detection part group) on the detector 171 according to the quantity of light.

In this embodiment, the focusing error signal FES is generated by the aforementioned astigmatic method according to the following mathematic formula by using the signals A, B, C, and D.

[Math. 7]

$$FES=(A+C)-(B+D) \quad (7)$$

Also, the RF signal RF is generated according to the following mathematic formula by using the signals A, B, C, and D.

[Math. 8]

$$RF=A+B+C+D \quad (8)$$

Furthermore, the +1st-order diffracted light diffracted at the areas Da, Db, Dc, Dd, De, Df, Dg, and Dh of the hologram element 27 enters the detection parts a3, b3, c3, d3, e3, f3, g3, and h3 of the detector 171 shown in FIG. 15, respectively. Then, the tracking error signal can be obtained by using signals A3, B3, C3, D3, E3, F3, G3, and H3 which are output from the detection parts a3, b3, c3, d3, e3, f3, g3, and h3 of the detector 171 according to the quantity of light. Incidentally, the +1st-order diffracted light (not shown) diffracted at the area Di is treated as unnecessary light and enters the detector 171 by avoiding the detection parts in the radial direction.

In this embodiment, the tracking error signal TES is generated by the 1-beam DPP method according to the following mathematical formula by using the signals A3, B3, C3, D3, E3, F3, G3, and H3.
[Math. 9]

$$TES=\{(A3+B3)-(C3+D3)\}-kt\{(E3+F3)-(G3+H3)\} \quad (9)$$

The letters kt in Mathematical Formula (9) is a coefficient for correcting an offset component included in the signals of a first term in Mathematical Formula (9) and an offset component included in the signals of a second term in Mathematical Formula (9) when the lens shift of the objective lens 10 is performed. As a result of such an operation, the stable tracking error signal without offset can be generated even if the lens shift of the objective lens 10 is performed.

Figure 16:
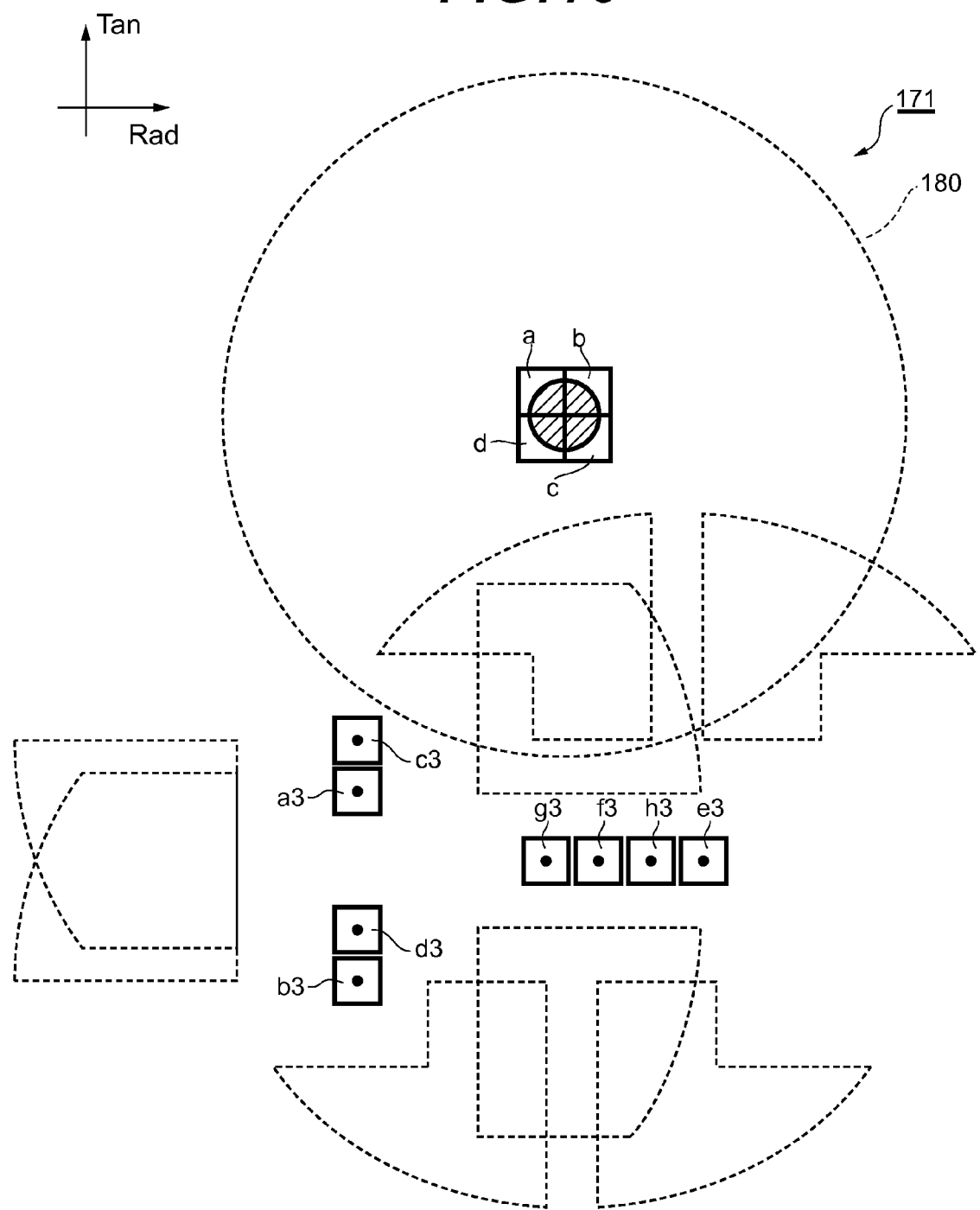
FIG. 16 is a schematic plan view showing the state of a maximum interlayer stray light caused by a light beam which has entered the detector.

A method for avoiding the stray light of the multi layer optical disc 3 according to this embodiment will be explained below with reference to FIG. 16 and FIG. 17.

A method for avoiding the minimum interlayer stray light according to this embodiment will be firstly explained.

Incidentally, the same stray light as the stray light generated at the detection parts shown in FIG. 5 and FIG. 6 from the light beam L1 entering the detection parts because of defocus is also generated at the detection parts of the detector 171 according to this embodiment. Therefore, with the detector 171, the detection parts e3, h3, f3, and g3 (the sixth detection part group) for detecting the light beam diffracted at the areas De, Dh, Dg and Df (the first divided area) of the hologram element 27 are aligned in the radial direction; and the detection parts a3, b3, c3, and d3 (the seventh detection part group) for detecting the light beam diffracted at the areas Da, Db, Dc, and Dd (the second divided area) are aligned in the tangential direction, thereby minimizing the influence of the minimum interlayer stray light.

With the detector 171 as described above, the stray light is avoided in the tangential direction at the areas De, Df, Dg, and Dh (the first divided area) of the hologram element 27, whose positions are separated from the center 32 in the tangential direction; and the stray light is avoided in the radial direction at the areas Da, Db, Dc, and Dd (the second divided area) of the hologram element 27, whose positions are separated from the center 32 in the radial direction. As a result, the detector 171 can avoid the minimum interlayer stray light efficiently.

Next, a method for avoiding the maximum interlayer stray light according to this embodiment will be explained. FIG. 16 is a schematic plan view of the light beam L1 which has been diffracted at each area Da to Dh of the hologram element 27 and enters the detection parts a3 to h3 of the detector 171 as seen from the direction along the optical axial direction. Each of black dots and shaded areas shown in FIG. 16 represents a light spot on the relevant detection part which has received the light beam L1 when the objective lens 10 forms a focal point on a desired information recording layer of the optical disc 3. Dashed lines shown in FIG. 16 represent the maximum interlayer stray light.

When explaining the maximum interlayer stray light, it has to be explained by referring to: stray light (maximum interlayer stray light) which occurs from the most back-side information recording layer when the focal point of the objective lens 10 is formed on the most front-side information recording layer of the multi layer optical disc 3; and stray light (maximum interlayer stray light) which occurs from the most front-side information recording layer when the focal point of the objective lens 10 is formed on the most back-side information recording layer. However, for ease of explanation, the case of the stray light from the most front-side recording layer when the focal point is formed on the most back-side recording layer will be explained below with reference to FIG. 16.

With the detector 171 according to this embodiment, the detection part groups, which are composed of the detection parts e3, f3, g3, and h3 (the sixth detection part group) and the detection parts a3, b3, c3, and d3 (the seventh detection part group), for detecting the tracking error signal are aligned in the tangential direction relative to the first detection part group in order to avoid the maximum interlayer stray light 180 caused by the 0th-order diffracted light entering the detection parts a, b, c, and d (the first detection part group). As a result, the detector 171 can avoid the maximum interlayer stray light 180 caused by the 0th-order diffracted light.

Furthermore, with the detector 171, the detection parts e3, f3, g3, and h3 (the sixth detection part group) for detecting the light beam L1 diffracted at the areas De, Dh, Dg and Df (the first divided area) of the hologram element 27 are aligned in the radial direction and the detection parts a3, b3, c3, and d3 (the seventh detection part group) for detecting the light beam L1 diffracted at the areas Da, Db, Dc, and Dd (the second divided area) are aligned in the tangential direction. Incidentally, each detection part is located as shown in FIG. 17 so that an extension line of the detection parts e3, f3, g3, and h3 (the sixth detection part group) in the radiation direction and an extension line of the detection parts a3, b3, c3, and d3 (the seventh detection part group) in the tangential direction form approximately 90 degrees. As a result, the detector 171 can avoid the maximum interlayer stray light.

Figure 17:
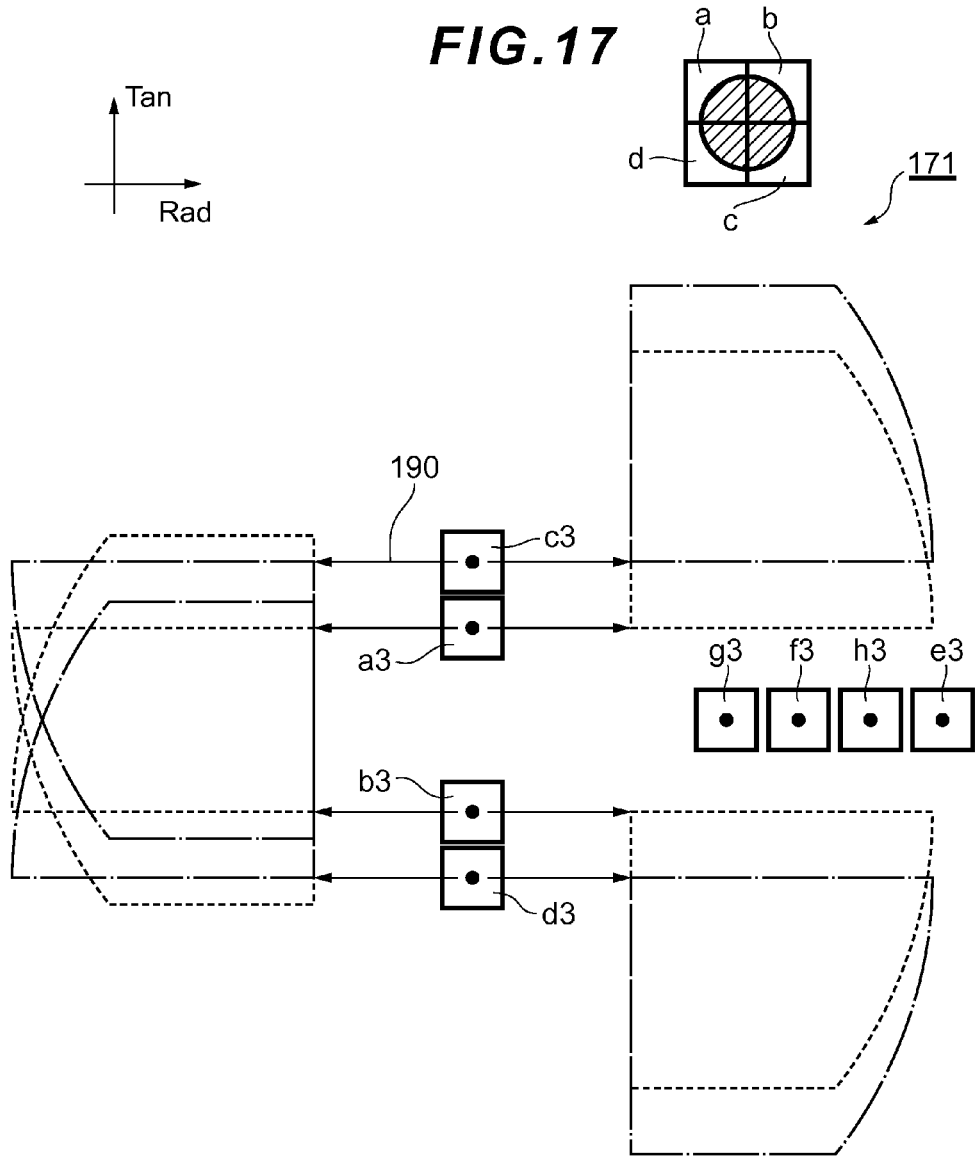
FIG. 17 is a schematic plan view of a light beam L1 which has entered detection parts a1, b1, c1, and d1, as seen from the direction along the optical axial direction.

FIG. 17 is a schematic plan view of the light beam L1 which has been diffracted by the hologram element 27 and enters the detection parts a3, b3, c3 and d3 (the seventh detection part group) as seen from the direction along the optical axial direction. Incidentally, for ease of explanation, only the stray light diffracted at the areas Da, Db, Dc, and Dd (the second divided area) of the hologram element will be shown in FIG. 17 and explained.

Black dots in FIG. 17 indicate signal light; dashed lines indicate stray light from the most front-side layer when recording and reproducing information in the most back-side layer; and alternate long and short dash lines indicate stray light from the back-side layer(s) when recording and reproducing information in the most front-side layer. Incidentally, the dashed lines and the alternate long and short dash lines do not occur at the same time, but they are indicated in the same drawing for the sake of explanation.

Furthermore, arrows 190 indicate movement directions of the stray light, which change according to the distance between a desired information recording layer and the other information recording layer(s). If the distance between the desired information recording layer and the other information recording layer(s) is small, the minimum interlayer stray light will be located at a position where the length of the arrow 150 is short; and if the distance between the desired information recording layer and the other information recording layer(s) is large, the maximum interlayer stray light will be located at a position where the length of the arrow 190 is long.

Now, for example, the stray light diffracted at the area De of the hologram element moves in the radial direction according to the distance between the desired information recording layer and the other information recording layer(s) and expands in the tangential direction at the same time. When this happens, the stray light expanding in the tangential direction depends on the areas of the hologram element 27 as shown in FIG. 6. Therefore, in this embodiment, the detection part a3 is located so that the maximum interlayer stray light and the minimum interlayer stray light diffracted at the area Da of the hologram element 27 would not enter the detection parts e3, f3, g3, and h3 (the sixth detection part group) aligned in the radial direction. Then, similarly, the detection parts detection part b3, c3 and d3 are located so that the maximum interlayer stray light and the minimum interlayer stray light diffracted at the hologram element areas Db, Dc, and Dd would not enter the detection parts e3, f3, g3, and h3 (the sixth detection part group). As a result, the maximum interlayer stray light and the minimum interlayer stray light diffracted at the areas Da, Db, Dc, and Dd (the second divided area) of the hologram element 27 will not enter the detection parts e3, f3, g3, and h3 (the sixth detection part group). Incidentally, the detection part a3 and the detection part c3 are located in the detector 171 according to this embodiment so that a direction of incidence of the stray light diffracted at the area Da on the detection part a3 becomes identical to a direction of incidence of the stray light diffracted at the area Dc, which is point-symmetrical to the area Da with respect to the center 32, on the detection part c3. The detection parts b3 and d3 corresponding to the areas Db and Dc having a point-symmetrical relationship with respect to the center 32 of the hologram element 27 are also located so that their directions of incidence of the stray light become identical to each other.

Furthermore, the maximum interlayer stray light diffracted at the areas De, Df, Dg, and Dh (the first divided area) of the hologram element 27 moves in the tangential direction according to the distance between the desired information recording layer and the other information recording layer(s), so that it will not enter the detection parts a3, b3, c3, and d3 (the seventh detection part group). However, the stray light diffracted at the areas De, Df, Dg, and Dh (the first divided area) of the hologram element 27 expands in the radial direction on the detector 171 according to the interlayer distance, so that the detection parts e3, f3, g3, and h3 (the sixth detection part group), which are aligned in the radial direction, and the detection parts a3 and c3 and the detection parts b3 and d3, which are aligned in the tangential direction, are separated by a specified amount in the radial direction and are located at positions avoiding the stray light. As a result, each detection part of the detector 171 can completely avoid the maximum interlayer stray light and the minimum interlayer stray light.

(3-2) Advantageous Effects of this Embodiment

The optical pickup device 170 according to this embodiment can obtain the same advantageous effects as those of the optical pickup device 5 according to the first embodiment as described above.

(3-3) Variation of Third Embodiment

Incidentally, the aforementioned third embodiment has described the case where the arrangement pattern of the detection parts of the detector 171 is configured as shown in FIG. 15; however, the present invention is not limited to this example and, for example, any arrangement pattern of the detection parts for detecting the tracking error signal may be employed as long as the detection parts are located at positions where the maximum interlayer stray light caused by the 0th-order diffracted light which enters the detection parts a, b, c, and d (the first detection part group) can be avoided as shown in FIG. 18.

(4) Fourth Embodiment (4-1) Configuration of Optical Pickup Device According to this Embodiment Referring to FIG. 1, the reference numeral 230 represents an optical pickup device according to this embodiment. This optical pickup device 230 is configured in the same manner as the optical pickup device 5 according to the first embodiment, except that the configuration of detection parts of a detector 231 is different.

In fact, the first embodiment has described the case where the detection groups composed of the detection parts e1, f1, g1, and h1 (the second detection part group) and a1, b1, c1 and d1 (the third detection part group) for detecting the tracking error signal are located in the tangential direction relative to the detection parts a, b, c, and d (the first detection part group); and the detection parts a1 and b1 and the detection parts c1 and d1 are aligned respectively in the tangential direction; and the detection parts e1, f1, g1, and h1 (the second detection part group) are placed between the detection parts a1 and b1 and the detection parts c1 and d1. Regarding the detector 231 according to this embodiment, an explanation will be given about a case where detection part groups composed of detection parts e4, f4, g4, and h4 (eighth detection part group) and detection parts a4, b4, c4, and d4 (ninth detection part group) for detecting the tracking error signal are located in the radial direction relative to the detection parts a, b, c, and d (the first detection part group); and the detection parts e4, f4, g4, and h4 (the eighth detection part group) are aligned in the radial direction; and the detection parts a4, b4, c4, and d4 (the ninth detection part group) are aligned along the same extension line in the tangential direction. As a result, the minimum interlayer stray light and the maximum interlayer stray light can be avoided efficiently and the area of the detection parts on the detector 231 can be reduced with respect to the optical pickup device 230 according to this embodiment in the same manner as the optical pickup device 5 according to the first embodiment.

FIG. 19 shows a configuration example for the detection parts of the detector 231 used in the optical pickup device 230 according to the fourth embodiment. With the detector 231 according to this embodiment, the 0th-order diffracted light which has permeated through the areas Da, Db, Dc, Dd, De, Df, Dg, Dh, and Di of the hologram element 27 (FIG. 3) according to the first embodiment enters the detection parts a, b, c, and d (the first detection part group). Then, the focusing error signal and the RF signal can be obtained from signals A, B, C, and D which are output from the detection parts a, b, c, and d (the first detection part group) on the detector 231 according to the quantity of light.

In this embodiment, the focusing error signal FES is generated by the aforementioned astigmatic method according to the following mathematic formula by using the signals A, B, C, and D.

[Math. 10]

$$FES = (A+C) - (B+D) \tag{10}$$

Also, the RF signal RF is generated according to the following mathematic formula by using the signals A, B, C, and D.

[Math. 11]

$$RF = A + B + C + D \tag{11}$$

Furthermore, the +1st-order diffracted light diffracted at the areas Da, Db, Dc, Dd, De, Df, Dg, and Dh of the hologram element 27 enters detection parts a4, b4, c4, d4, e4, f4, g4, and h4 of the detector 231 shown in FIG. 19, respectively. Then, the tracking error signal can be obtained by using signals A4, B4, C4, D4, E4, F4, G4, and H4 which are output from the detection parts a4, b4, c4, d4, e4, f4, g4, and h4 of the detector 231 according to the quantity of light. Incidentally, the +1st-order diffracted light (not shown) diffracted at the area Di is treated as unnecessary light and enters the detector 231 by avoiding the detection parts in the radial direction.

In this embodiment, the tracking error signal TES is generated by the 1-beam DPP method according to the following mathematical formula by using the signals A4, B4, C4, D4, E4, F4, G4, and H4.
[Math. 12]

$$TES=\{(A4+B4)-(C4+D4)\}-kt\{(E4+F4)-(G4+H4)\} \quad (12)$$

The letters kt in Mathematical Formula (12) is a coefficient for correcting an offset component included in the signals of a first term in Mathematical Formula (12) and an offset component included in the signals of a second term in Mathematical Formula (12) when the lens shift of the objective lens 10 is performed. As a result of such an operation, the stable tracking error signal without offset can be generated even if the lens shift of the objective lens 10 is performed.

Figure 20:
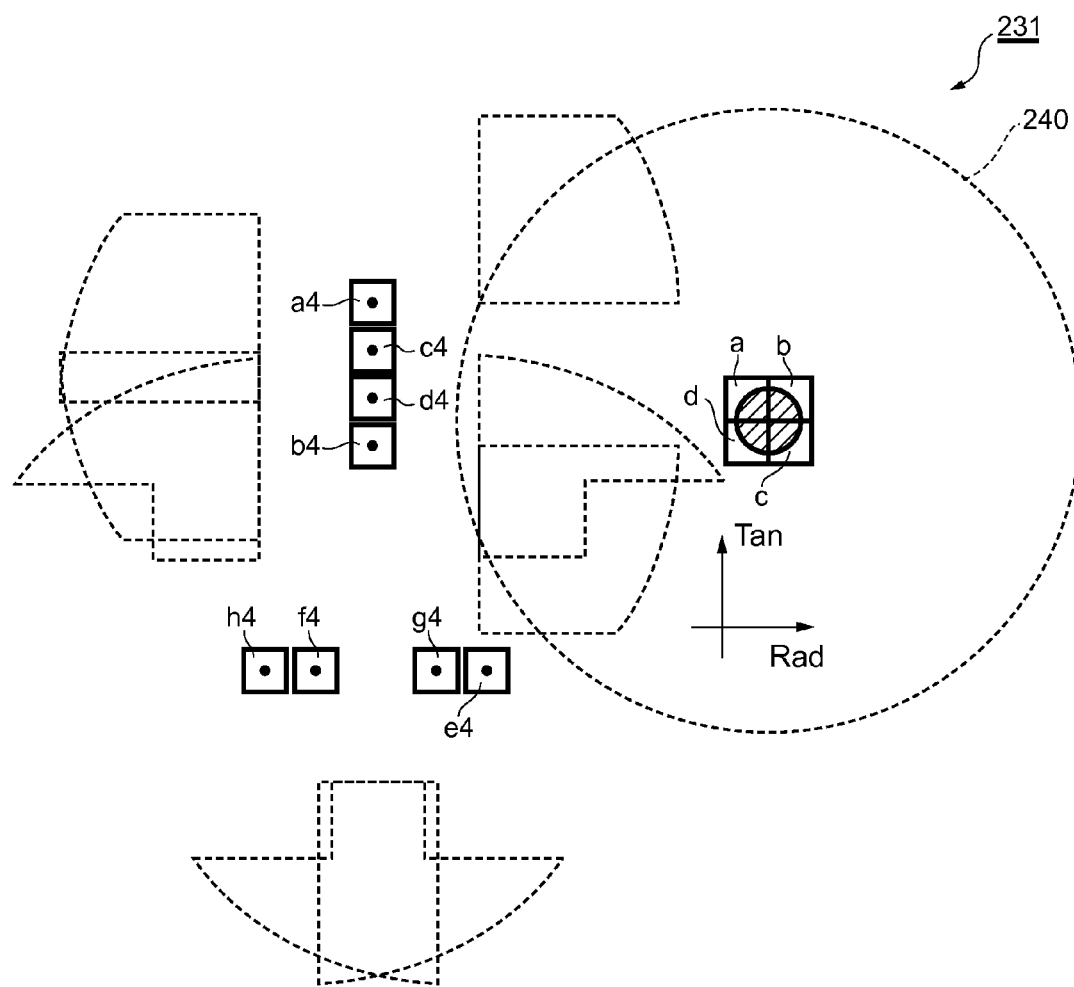
FIG. 20 is a schematic plan view showing the state of a maximum interlayer stray light caused by a light beam which has entered the detector.

A method for avoiding the stray light of the multi layer optical disc 3 according to this embodiment will be explained below with reference to FIG. 20 and FIG. 21.

A method for avoiding the minimum interlayer stray light according to this embodiment will be firstly explained.

Incidentally, the same stray light as the stray light generated at the detection parts shown in FIG. 5 and FIG. 6 from the light beam L1 entering the detection parts because of defocus is also generated at the detection parts of the detector 231 according to this embodiment. Therefore, with the detector 231, the detection parts e4, h4, f4, and g4 (the eighth detection part group) for detecting the light beam diffracted at the areas De, Dh, Dg and Df (the first divided area) of the hologram element 27 are aligned in the radial direction; and the detection parts a4, b4, c4, and d4 (the ninth detection part group) for detecting the light beam diffracted at the areas Da, Db, Dc, and Dd (the second divided area) are aligned in the tangential direction, thereby minimizing the influence of the minimum interlayer stray light.

Therefore, with the detector 231, the detection parts e4, h4, f4, and g4 (the eighth detection part group) for detecting the light beam diffracted at the areas De, Dh, Dg and Df (the first divided area) of the hologram element 27 are aligned in the radial direction; and the detection parts a4, b4, c4, and d4 (the ninth detection part group) for detecting the light beam diffracted at the areas Da, Db, Dc, and Dd (the second divided area) are aligned in the tangential direction. Incidentally, each detection part is located as shown in FIG. 20 so that an extension line of the detection parts e4, f4, g4, and h4 (the eighth detection part group) in the radiation direction and an extension line of the detection parts a4, b4, c4, and d4 (the ninth detection part group) in the radial direction form approximately 90 degrees.

Then, with the detector 231 as described above, the stray light is avoided in the tangential direction at the areas De, Df, Dg, and Dh (the first divided area) of the hologram element 27, whose positions are separated from the center 32 in the tangential direction; and the stray light is avoided in the radial direction at the areas Da, Db, Dc, and Dd (the second divided area) of the hologram element 27, whose positions are separated from the center 32 in the radial direction. As a result, the detector 231 can avoid the minimum interlayer stray light efficiently.

Next, a method for avoiding the maximum interlayer stray light according to this embodiment will be explained. FIG. 20 is a schematic plan view of the light beam L1 which has been diffracted at each area Da to Dh of the hologram element 27 and enters the detection parts a4 to h4 of the detector 231 as seen from the direction along the optical axial direction. Each of black dots and shaded areas shown in FIG. 21 represents a light spot on the relevant detection part which has received the light beam L1 when the objective lens 10 forms a focal point on a desired information recording layer of the optical disc 3. Dashed lines shown in FIG. 21 represent the maximum interlayer stray light.

When explaining the maximum interlayer stray light, it has to be explained by referring to: stray light (maximum interlayer stray light) which occurs from the most back-side information recording layer when the focal point of the objective lens 10 is formed on the most front-side information recording layer of the multi layer optical disc 3; and stray light (maximum interlayer stray light) which occurs from the most front-side information recording layer when the focal point of the objective lens 10 is formed on the most back-side information recording layer. However, for ease of explanation, the case of the stray light from the most front-side recording layer when the focal point is formed on the most back-side recording layer will be explained below with reference to FIG. 20.

With the detector 231 according to this embodiment, the detection part groups, which are composed of the detection parts e4, f4, g4, and h4 (the eighth detection part group) and the detection parts a4, b4, c4, and d4 (the ninth detection part group), for detecting the tracking error signal are aligned in the radial direction relative to the first detection part group in order to avoid the maximum interlayer stray light 240 caused by the 0th-order diffracted light entering the detection parts a, b, c, and d (the first detection part group). As a result, the detector 231 can avoid the maximum interlayer stray light 240 caused by the 0th-order diffracted light.

Figure 21:
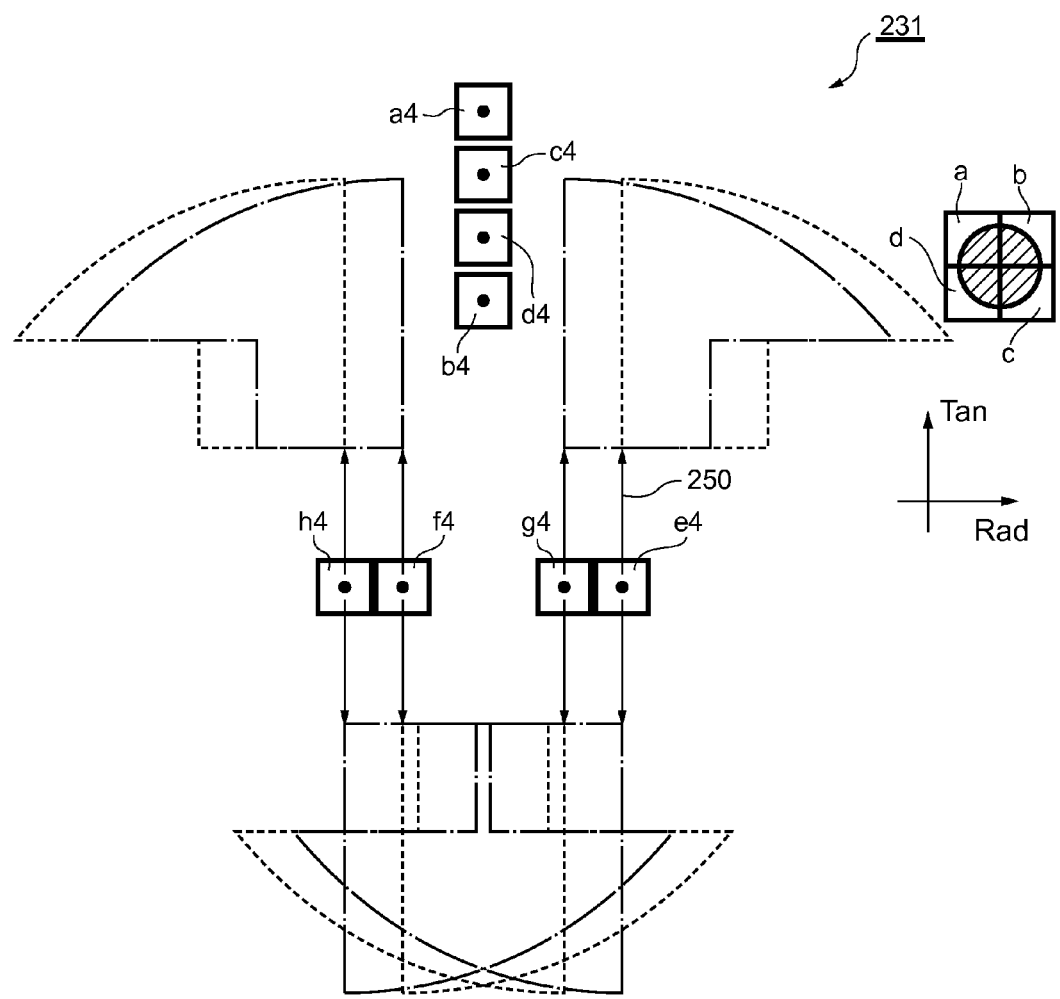
FIG. 21 is a schematic plan view of a light beam L1 which has entered detection parts e1, f1, g1, and h1, as seen from the direction along the optical axial direction.

FIG. 21 is a schematic plan view of the light beam L1 which has been diffracted by the hologram element 27 and enters the detection parts e4, f4, g4, and h4 (the eighth detection part group) as seen from the direction along the optical axial direction. Incidentally, for ease of explanation, only the stray light diffracted at the areas De, Df, Dg, and Dh (the first divided area) of the hologram element will be shown in FIG. 21 and explained.

Black dots in FIG. 21 indicate signal light; dashed lines indicate stray light from the most front-side layer when recording and reproducing information in the most back-side layer; and alternate long and short dash lines indicate stray light from the back-side layer(s) when recording and reproducing information in the most front-side layer. Incidentally, the dashed lines and the alternate long and short dash lines do not occur at the same time, but they are indicated in the same drawing for the sake of explanation.

Furthermore, arrows 250 indicate movement directions of the stray light, which change according to the distance between a desired information recording layer and the other information recording layer(s). If the distance between the desired information recording layer and the other information recording layer(s) is small, the minimum interlayer stray light will be located at a position where the length of the arrow 250 is short; and if the distance between the desired information recording layer and the other information recording layer(s) is large, the maximum interlayer stray light will be located at a position where the length of the arrow 250 is long.

Now, for example, the stray light diffracted at the area De of the hologram element 27 moves in the tangential direction according to the distance between the desired information recording layer and the other information recording layer(s) and expands in the radial direction at the same time. When this happens, the stray light expanding in the radial direction depends on the areas of the hologram element 27 as shown in FIG. 5. Therefore, in this embodiment, the detection part e4 is located so that the maximum interlayer stray light and the minimum interlayer stray light diffracted at the area De of the hologram element 27 would not enter the detection parts a4, b4, c4, and d4 (the ninth detection part group) aligned in the tangential direction. Then, similarly, the detection parts f4, g4 and h4 are located so that the maximum interlayer stray light and the minimum interlayer stray light diffracted at the areas Df, Dg, and Dh of the hologram element 27 would not enter the detection parts a4, b4, c4, and d4 (the ninth detection part group). As a result, the maximum interlayer stray light and the minimum interlayer stray light diffracted at the areas De, Df, Dg, and Dh (the first divided area) of the hologram element 27 will not enter the detection parts a4, b4, c4, and d4 (the ninth detection part group). Incidentally, the detection part e4 and the detection part g4 are located in the detector 231 according to this embodiment so that a direction of incidence of the stray light diffracted at the area De on the detection part e4 becomes identical to a direction of incidence of the stray light diffracted at the area Dg, which is point-symmetrical to the area De with respect to the center 32, on the detection part g4. The detection parts h4 and f4 corresponding to the areas Df and Dh having a point-symmetrical relationship with respect to the center 32 of the hologram element 27 are also located so that their directions of incidence of the stray light become identical to each other.

Furthermore, the maximum interlayer stray light diffracted at the areas Da, Db, Dc, and Dd (the second divided area) of the hologram element 27 moves in the radial direction according to the distance between the desired information recording layer and the other information recording layer(s), so that it will not enter the detection parts e4, f4, g4, and h4 (the eighth detection part group). However, the stray light diffracted at the areas Da, Db, Dc, and Dd (the second divided area) of the hologram element 27 expands in the tangential direction on the detector 29 according to the interlayer distance, so that the detection parts f4 and g4 and the detection parts e4 and h4, which are aligned in the radial direction, and the detection parts a4, b4, c4, and d4, which are aligned in the tangential direction, are separated by a specified amount in the tangential direction and are located at positions avoiding the stray light. As a result, each detection part of the detector 231 can completely avoid the maximum interlayer stray light and the minimum interlayer stray light.

(4-2) Advantageous Effects of this Embodiment

The optical pickup device 230 according to this embodiment can obtain the same advantageous effects as those of the optical pickup device 5 according to the first embodiment as described above.

(4-3) Variation of Fourth Embodiment

Figure 22:
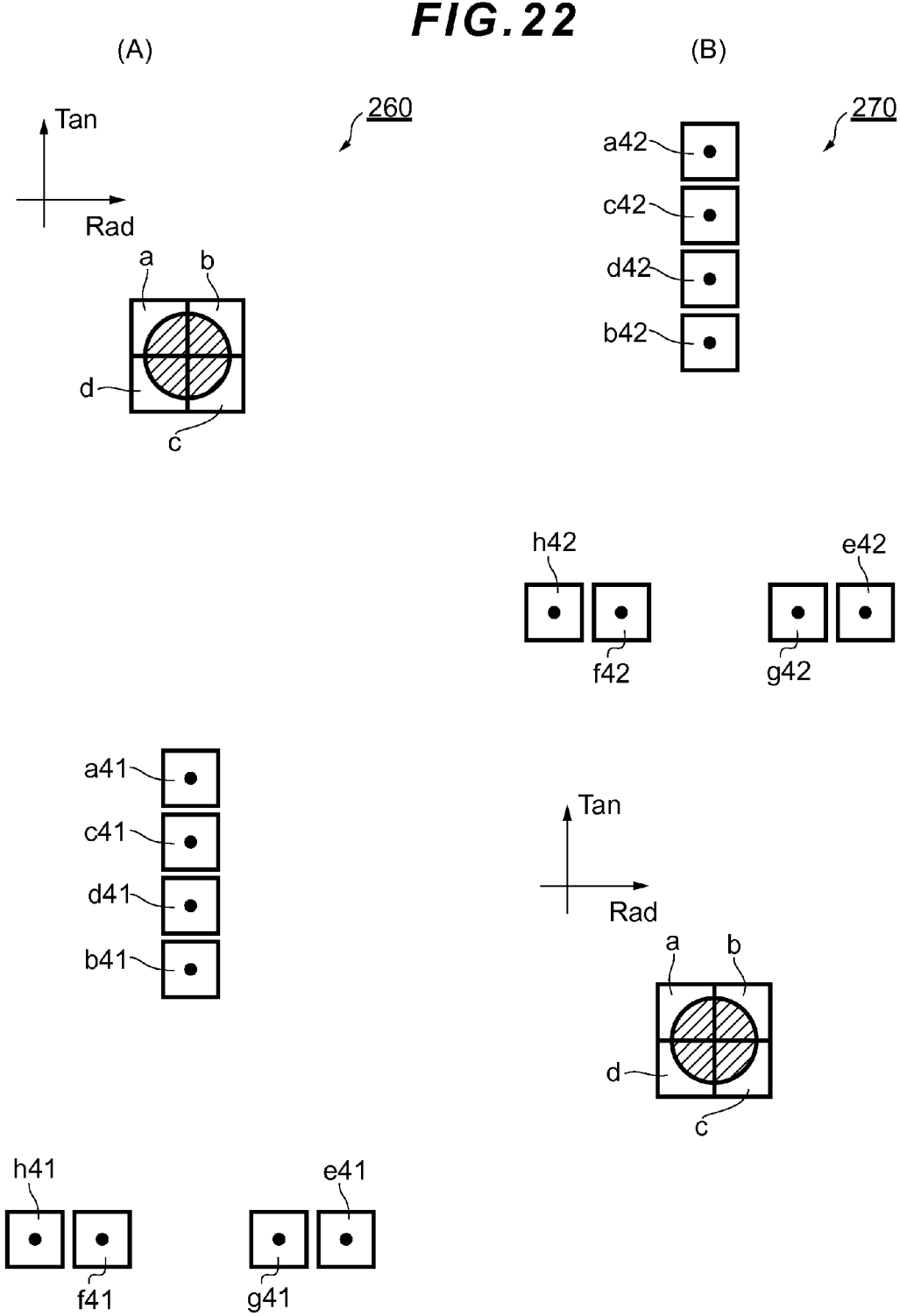
FIG. 22(A) shows a variation of an arrangement pattern of the detection parts of the detector according to the fourth embodiment.
FIG. 22(B) shows a variation of an arrangement pattern of the detection parts of the detector according to the fourth embodiment.

Incidentally, the aforementioned fourth embodiment has described the case where the arrangement pattern of the detection parts of the detector 231 is configured as shown in FIG. 19; however, the present invention is not limited to this example and, for example, any arrangement pattern of the detection parts for detecting the tracking error signal may be employed as long as the detection parts are located at positions where the maximum interlayer stray light caused by the 0th-order diffracted light which enters the detection parts a, b, c, and d (the first detection part group) can be avoided as shown in FIG. 22(A) and FIG. 22(B).

(5) Fifth Embodiment (5-1) Configuration of Optical Pickup Device According to this Embodiment Referring to FIG. 1, the reference numeral 280 represents an optical pickup device according to this embodiment. This optical pickup device 280 is configured in the same manner as the optical pickup device 5 according to the first embodiment, except that the configuration of a hologram element 281 and detection parts of the detector 281 are different.

In fact, the first embodiment has described the case where the areas Da, Db, Dc, and Dd on the hologram element 27 are located along the straight line of the second division line 31 extending in the radial direction and at positions symmetrical with respect to the second division line 31. Regarding the hologram element 281 according to this embodiment, the areas Da and Db are integrated with each other to form one area Dab and the areas Dc and Dd are integrated with each other to form one area Dcd, and the area Dab and the area Dcd are located at symmetrical positions with respect to the second division line 31 extending in the radial direction.

Furthermore, the first embodiment has described the case where the detection part groups, which are composed of the detection parts e1, f1, g1, and h1 (the second detection part group) and a1, b1, c1 and d1 (the third detection part group), for detecting the tracking error signal are located in the tangential direction relative to the detection parts a, b, c, and d (the first detection part group) of the detector 29. Regarding the detector 282 according to this embodiment, a case where detection part groups, which are composed of detection parts e5, f5, g5, and h5 (10th detection part group) and detection parts ab5 and cd5 (11th detection part group), for detecting the tracking error signal are located in the radial direction relative to the detection parts a, b, c, and d (the first detection part group). As a result, the minimum interlayer stray light and the maximum interlayer stray light can be avoided efficiently and the area of the detection parts on the detector 282 can be reduced with respect to the optical pickup device 280 according to this embodiment in the same manner as the optical pickup device 5 according to the first embodiment.

Figure 23:
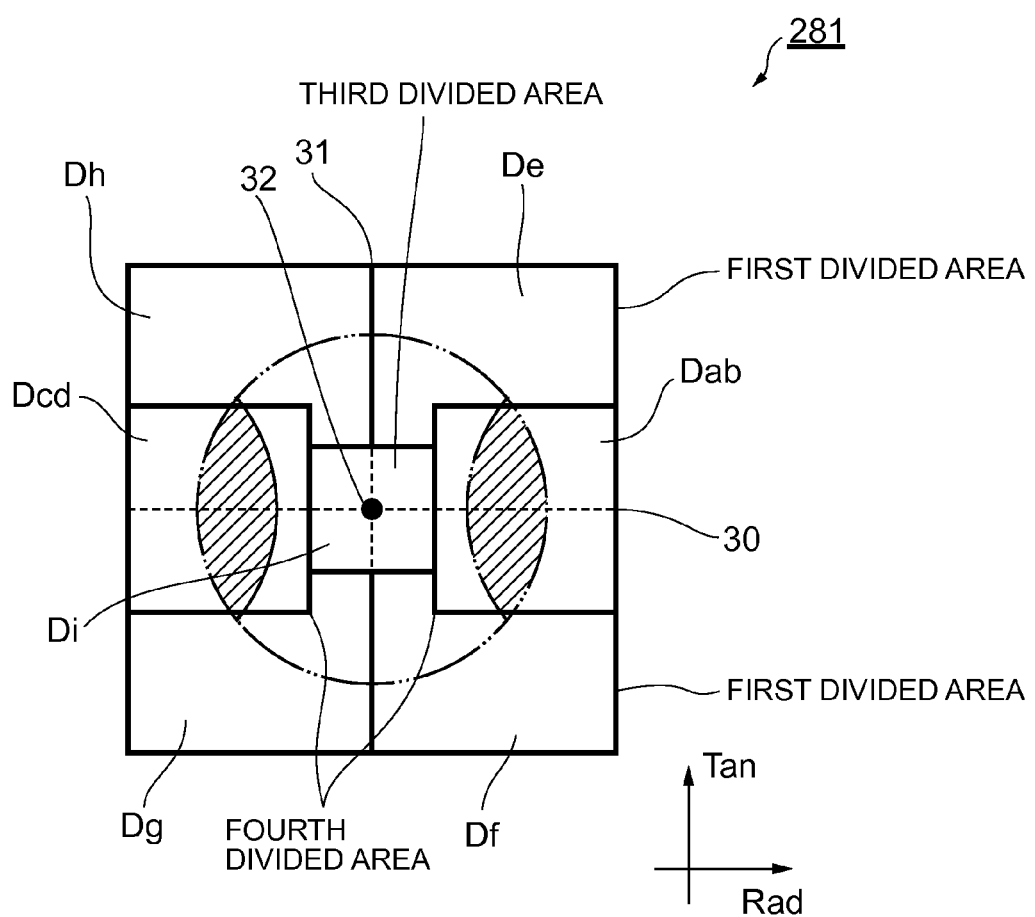
FIG. 23 is a plan view showing a configuration example for an optical pickup device according to a fifth embodiment.

FIG. 23 is an example of a schematic plan view of the hologram element 281 used in the optical pickup device 280 according to the fifth embodiment as seen from the direction along the optical axial direction. A chain double-dashed line in FIG. 23 indicates the outline of a light spot of the light beam L on the hologram element 281 when a focal point of the objective lens 10 is formed on a desired information recording layer of the optical disc 3. Also, shaded areas indicate interference areas (push-pull patterns) of the ±1st-order disc-diffracted light and the 0th-order disc-diffracted light which are diffracted by the track of the optical disc 3.

Furthermore, solid lines indicates boundaries between areas and the hologram element 281 is formed of: areas De, Df, Dg, and Dh (first divided area) where the 0th-order disc-diffracted light reflected from the track of the optical disc 3 enters; and areas Dab and Dcd (fourth divided area) and an area Di (third divided area) where the 0th-order disc-diffracted light and the ±1st-order disc-diffracted light enter. The light beam L1 entering the respective areas is diffracted in different directions. Incidentally, the area Di in the hologram element 281 in FIG. 23 is located in a specified area including the center 32 of the hologram element 281 where the first division line 30 extending in the tangential direction intersects with the second division line 31 extending in the radial direction; the areas De, Df, Dg, and Dh are specified areas including the four corners of the hologram element 281 and located along the straight line of the first division line 30 so that they are generally symmetrical with respect to the first division line 30; and the areas Dab and Dcd are located along the second division line 31 so that they are generally symmetrical with respect to the second division line 31. In other words, the hologram element 281 is characterized in that it has the first, second and third divided areas; the third divided area is an area including the center of the hologram element 281; the first divided area is an area located along the first division line 30 extending in a direction generally parallel to the track of the optical disc 3 and passing through the approximate center of the hologram element 281; the fourth divided area is an area located along the second division line 31 extending in a direction generally perpendicular to the track of the optical disc 3 and passing through the approximate center of the hologram element 281; and the third divided area includes a push-pull area, where the 0th-order diffracted light and the ±1st-order diffracted light from the track of the optical disc 3 intersect with each other; at least two detection parts for detecting the light beam L1 diffracted at the first divided area are aligned in a direction generally perpendicular to the track of the optical disc 3 and at least two detection parts for detecting the light beam L1 diffracted at the second divided area are aligned in a direction generally parallel to the track of the optical disc 3.

Regarding the diffraction efficiency of the hologram element 281, for example, a ratio of the 0th-order diffracted light, the +1st-order diffracted light, and the −1st-order diffracted light is assumed to be 7:3:0. Accordingly, the detector 282 of the optical pickup device 280 according to this embodiment receives the 0th-order diffracted light, which has permeated through the hologram element 281, and the +1st-order diffracted light diffracted by the hologram element 281.

Figure 24:
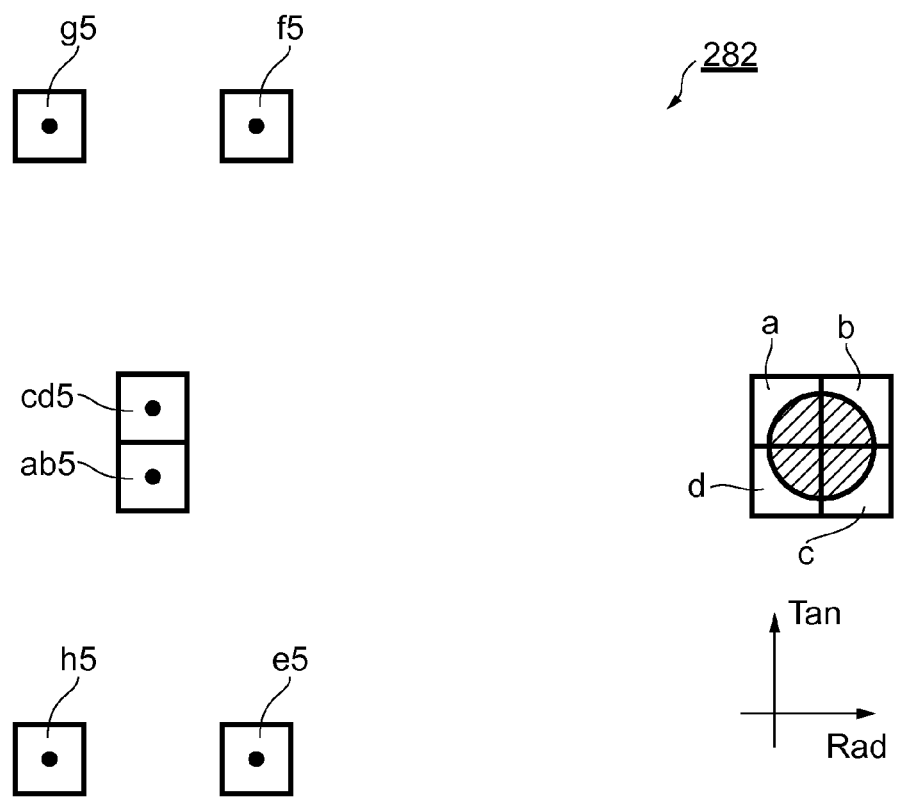
FIG. 24 is a plan view showing an example of an arrangement pattern of detection parts of a detector according to the fifth embodiment.

FIG. 24 shows a configuration example for the detection parts of the detector 282 used in the optical pickup device 280 according to the fifth embodiment. With the detector 282 according to this embodiment, the 0th-order diffracted light which has permeated through the areas Dab, Dcd, De, Df, Dg, Dh, and Di of the hologram element 281 (FIG. 23) enters the detection parts a, b, c, and d (the first detection part group). Then, the focusing error signal and the RF signal can be obtained from signals A, B, C, and D which are output from the detection parts a, b, c, and d (the first detection part group) on the detector 282 according to the quantity of light.

In this embodiment, the focusing error signal FES is generated by the aforementioned astigmatic method according to the following mathematic formula by using the signals A, B, C, and D.
[Math. 13]

$$FES=(A+C)-(B+D) \qquad (13)$$

Also, the RF signal RF is generated according to the following mathematic formula by using the signals A, B, C, and D.
[Math. 14]

$$RF=A+B+C+D \qquad (14)$$

Furthermore, the +1st-order diffracted light diffracted at the areas Dab, Dcd, De, Df, Dg, and Dh of the hologram element 281 enters the detection parts ab5, cd5, e5, f5, g5, and h5 of the detector 282 shown in FIG. 24, respectively. Then, the tracking error signal can be obtained by using signals AB5, CD5, E5, F5, G5, and H5 which are output from the detection parts ab5, cd5, e5, f5, g5, and h5 of the detector 282. Incidentally, the +1st-order diffracted light (not shown) diffracted at the area Di is treated as unnecessary light and enters the detector 282 by avoiding the detection parts in the radial direction.

In this embodiment, the tracking error signal TES is generated by the 1-beam DPP method according to the following mathematical formula by using the signals AB5, CD5, E5, F5, G5, and H5.
[Math. 15]

$$TES=(AB5-CD5)-kt\{(E5+F5)-(G5+H5)\} \qquad (15)$$

The letters kt in Mathematical Formula (15) is a coefficient for correcting an offset component included in the signals of a first term in Mathematical Formula (15) and an offset component included in the signals of a second term in Mathematical Formula (15) when the lens shift of the objective lens 10 is performed. As a result of such an operation, the stable tracking error signal without offset can be generated even if the lens shift of the objective lens 10 is performed.

A method for avoiding the stray light of the multi layer optical disc 3 according to this embodiment will be explained below A method for avoiding the minimum interlayer stray light according to this embodiment will be firstly explained.

Incidentally, in the case of the detection parts of the detector 282 according to this embodiment, only the areas Da and Db of the hologram element 281 are formed into one area Dab and the areas Dc and Dd are formed into one area Dcd. So, the stray light s is generated at the detection parts of the detector 282 according to this embodiments in the same direction as that of the stray light generated at the detection parts of the detector 29 according to the first embodiment as shown in FIG. 5 and FIG. 6 from the light beam L1 entering the detection parts because of defocus. Therefore, with the detector 282, the detection parts e5, h5, f5, and g5 (the 10th detection part group) for detecting the light beam diffracted at the areas De, Dh, Dg and Df (the first divided area) of the hologram element 281 are aligned in the radial direction; and the detection parts ab5 and cd5 (the 11th detection part group) for detecting the light beam diffracted at the areas Dab and Dcd (the fourth divided area) are aligned in the tangential direction, thereby minimizing the influence of the minimum interlayer stray light.

Therefore, with the detector 282 according to this embodiment as shown in FIG. 24, the detection parts e5, h5, f5, and g5 (the 10th detection part group) for detecting the light beam L1 diffracted at the areas De, Dh, Dg and Df (the first divided area) of the hologram element 281 are aligned in the radial direction; and the detection parts ab5 and cd5 (the 11th detection part group) for detecting the light beam L1 diffracted at the areas Dab and Dcd (the fourth divided area) are aligned in the tangential direction and placed between the detection parts e5, h5, f5, and g5.

Then, regarding the detector 282, the stray light is avoided in the tangential direction at the areas De, Df, Dg, and Dh (the first divided area) of the hologram element 281, whose positions are separated from the center 32 in the tangential direction; and the stray light is avoided in the radial direction at the areas Dab and Dcd (the fourth divided area) of the hologram element 281, whose positions are separated from the center 32 in the radial direction. As a result, the detector 282 can avoid the minimum interlayer stray light efficiently.

Figure 25:
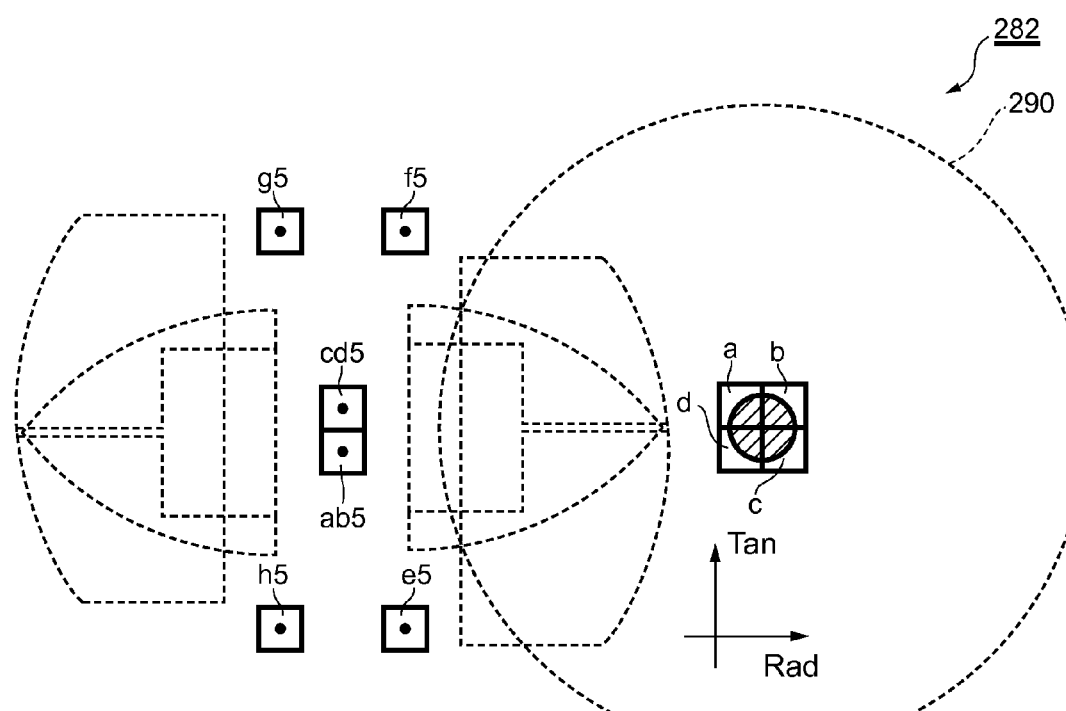
FIG. 25 is a schematic plan view showing the state of a maximum interlayer stray light caused by a light beam which has entered the detector.
Figure 26:
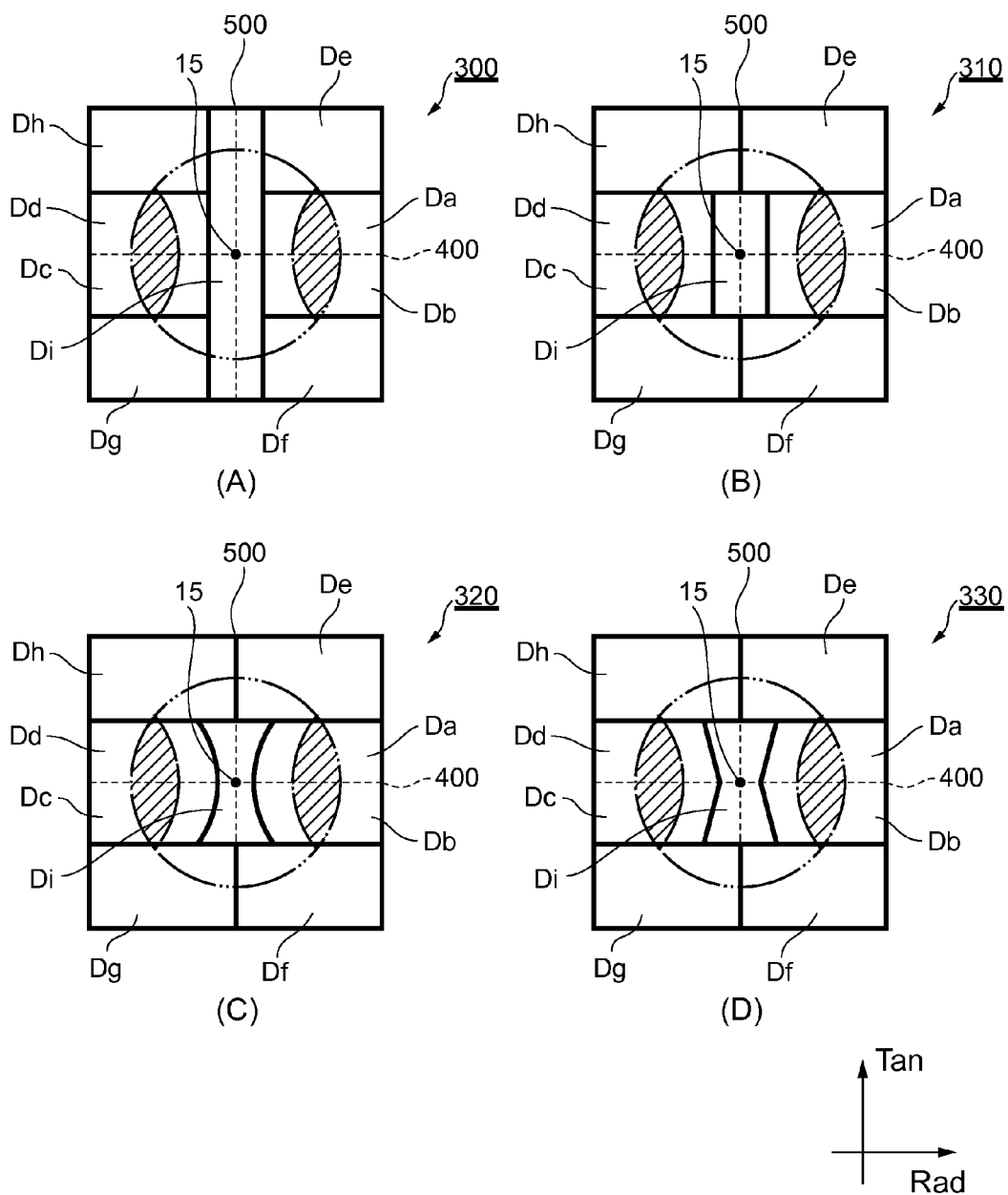
FIG. 26(A) shows a variation where a third area is extended along a tangential direction.
FIG. 26(B) shows a variation where the third area has the same tangential-direction width as that of second areas.
FIG. 26(C) shows a variation where the third area is of an arcuate shape.
FIG. 26(D) shows a variation where the third area is of a V-shape.

Next, a method for avoiding the maximum interlayer stray light according to this embodiment will be explained. FIG. 25 is a schematic plan view of the light beam L1 which has been diffracted at each area Dab to Dh of the hologram element 281 and enters the detection parts ab to h5 of the detector 282 as seen from the direction along the optical axial direction. Each of black dots and shaded areas shown in FIG. 25 represents a light spot on the relevant detection part which has received the light beam L1 when the objective lens 10 forms a focal point on a desired information recording layer of the optical disc 3. Dashed lines shown in FIG. 25 represent the maximum interlayer stray light.

When explaining the maximum interlayer stray light, it has to be explained by referring to: stray light (maximum interlayer stray light) which occurs from the most back-side information recording layer when the focal point of the objective lens 10 is formed on the most front-side information recording layer of the multi layer optical disc 3; and stray light (maximum interlayer stray light) which occurs from the most front-side information recording layer when the focal point of the objective lens 10 is formed on the most back-side information recording layer. However, for ease of explanation, the case of the stray light from the most front-side recording layer when the focal point is formed on the most back-side recording layer will be explained below with reference to FIG. 25.

With the detector 282 according to this embodiment, the detection part groups, which are composed of the detection parts e5, f5, g5, and h5 (the 10th detection part group) and the detection parts ab5 and cd5 (the 11th detection part group), for detecting the tracking error signal are aligned in the radial direction relative to the first detection part group in order to avoid the maximum interlayer stray light 290 caused by the 0th-order diffracted light entering the detection parts a, b, c, and d (the first detection part group). As a result, the detector 282 can avoid the maximum interlayer stray light 290 caused by the 0th-order diffracted light.

Furthermore, the stray light diffracted at the areas Dab and Dcd (the fourth detection part group) of the hologram element 281 moves in the radial direction according to the distance between the desired information recording layer and the other information recording layer(s), so that the stray light will not enter the detection parts e5, f5, g5, and h5 (the 10th detection part group) which are located in a generally tangential direction relative to the detection parts ab5 and cd5. However, the stray light diffracted at the areas Dab and Dcd (the fourth detection part group) of the hologram element 281 expands in the tangential direction on the detector 282 according to the interlayer distance, so that the detection parts f5 and g5 and the detection parts e5 and h5, which are aligned in the radial direction, and the detection parts ab5 and cd5, which are aligned in the tangential direction, are located at positions separated by a specified amount in the tangential direction. As a result, each detection part of the detector 282 can completely avoid the maximum interlayer stray light.

(5-2) Advantageous Effects of this Embodiment

The optical pickup device 280 according to this embodiment can obtain the same advantageous effects as those of the optical pickup device 5 according to the first embodiment as described above.

(5-3) Variation of Fifth Embodiment

Incidentally, the aforementioned fifth embodiment has described the case where the configuration of the hologram element 281 is as shown in FIG. 23; however, the present invention is not limited to this example and, for example, the area Di (the third divided area) may be configured in any manner as long as the respective areas De, Df, Dg, and Dh are symmetrical with respect to the first division line 30 and the respective areas Dab and Dcd are symmetrical with respect to the second division line 31 as shown in FIG. 26(A), FIG. 26(B), FIG. 26(C), and FIG. 26(D).

Furthermore, the aforementioned fifth embodiment has described the case where the arrangement pattern of the detection parts of the detector 282 is configured as shown in FIG. 24; however, the present invention is not limited to this example and, for example, any arrangement pattern of the detection parts for detecting the tracking error signal may be employed as long as the detection parts are located at positions where the maximum interlayer stray light caused by the 0th-order diffracted light which enters the detection parts a, b, c, and d (the first detection part group) can be avoided as shown in FIG. 27.

(6) Sixth Embodiment (6-1) Configuration of Optical Pickup Device According to this Embodiment Referring to FIG. 1, the reference numeral 350 represents an optical pickup device according to this embodiment. This optical pickup device 350 is configured in the same manner as the optical pickup device 5 according to the first embodiment, except that the configuration of detection parts of a detector 351 is different.

In fact, the fifth embodiment has described the case where the detection parts a1 and b1 and the detection parts c1 and d1 which form a detection part group for detecting the tracking error signal are aligned respectively in the tangential direction and the detection parts e1, f1, g1, and h1 (the second detection part group) are located between the detection parts a1 and b1 and the detection parts c1 and d1. Regarding the detector 351 according to this embodiment, an explanation will be given about a case where detection parts e6, f6, g6, and h6 (12th detection part group), which forms a detection part group for detecting the tracking error signal, are aligned in the radial direction; and, furthermore, detection parts ab6 and cd6 (13th detection part group) are aligned along the same extension line in the tangential direction. As a result, the minimum interlayer stray light and the maximum interlayer stray light can be avoided efficiently and the area of the detection parts on the detector 351 can be reduced with respect to the optical pickup device 350 according to this embodiment in the same manner as the optical pickup device 280 according to the fifth embodiment.

FIG. 28 shows a configuration example for the detection parts of the detector 351 used in the optical pickup device 350 according to the sixth embodiment. With the detector 351 according to this embodiment, the 0th-order diffracted light which has permeated through the areas Dab, Dcd, De, Df, Dg, Dh, and Di of the hologram element 281 (FIG. 23) according to the fifth embodiment enters the detection parts a, b, c, and d (the first detection part group). Then, the focusing error signal and the RF signal can be obtained from the signals A, B, C, and D which are output from the detection parts a, b, c, and d (the first detection part group) on the detector 351 according to the quantity of light.

In this embodiment, the focusing error signal FES is generated by the astigmatic method according to the following mathematic formula by using the signals A, B, C, and D.

[Math. 16]

$$FES=(A+C)-(B+D) \quad (16)$$

Also, the RF signal RF is generated according to the following mathematic formula by using the signals A, B, C, and D.

[Math. 17]

$$RF=A+B+C+D \quad (17)$$

Furthermore, the +1st-order diffracted light diffracted at the areas Dab, Dcd, De, Df, Dg, and Dh of the hologram element 281 enters the detection parts ab6, cd6, e6, f6, g6 and h6 of the detector 351 shown in FIG. 28, respectively. Then, the tracking error signal can be obtained by using signals AB6, CD6, E6, F6, G6, and H6 which are output from the detection parts ab6, cd6, e6, f6, g6 and h6 of the detector 351 according to the quantity of light. Incidentally, the +1st-order diffracted light (not shown) diffracted at the area Di is treated as unnecessary light and enters the detector 351 by avoiding the detection parts in the tangential direction.

In this embodiment, the tracking error signal TES is generated by the 1-beam DPP method according to the following mathematical formula by using the signals AB6, CD6, E6, F6, G6, and H6.

[Math. 18]

$$TES=(AB6-CD6)-kt\{(E6+F6)-(G6+H6)\} \quad (18)$$

The letters kt in Mathematical Formula (18) is a coefficient for correcting an offset component included in the signals of a first term in Mathematical Formula (18) and an offset component included in the signals of a second term in Mathematical Formula (18) when the lens shift of the objective lens 10 is performed. As a result of such an operation, the stable tracking error signal without offset can be generated even if the lens shift of the objective lens 10 is performed.

A method for avoiding the stray light of the multi layer optical disc 3 according to this embodiment will be explained below A method for avoiding the minimum interlayer stray light according to this embodiment will be firstly explained.

Incidentally, the same stray light as the stray light generated at the detection parts shown in FIG. 5 and FIG. 6 from the light beam L1 entering the detection parts because of defocus is also generated at the detection parts of the detector 351 according to this embodiment. Therefore, with the detector 351, the detection parts e6, h6, f6 and g6 (the 12th detection part group) for detecting the light beam diffracted at the areas De, Dh, Dg and Df (the first divided area) of the hologram element 281 are aligned in the radial direction; and the detection parts ab6 and cd6 (the 13th detection part group) for detecting the light beam diffracted at the areas Dab and Dcd (the fourth divided area) are aligned in the tangential direction, thereby minimizing the influence of the minimum interlayer stray light.

Therefore, regarding the detector 351 according to this embodiment as shown in FIG. 28, the detection parts e6, h6, f6 and g6 (the 12th detection part group) for detecting the light beam L1 diffracted at the areas De, Dh, Dg and Df (the first divided area) of the hologram element 281 are aligned in the radial direction; and the detection parts f6 and g6 and the detection parts e6 and h6, which are aligned in the radial direction, and the detection parts ab6 and cd6, which are aligned in the tangential direction, are separated by a specified amount in the tangential direction and located at positions avoiding the stray light.

Then, with the detector 351, the stray light is avoided in the tangential direction at the areas De, Df, Dg, and Dh (the first divided area) of the hologram element 281, whose positions are separated from the center 32 in the tangential direction; and the stray light is avoided in the radial direction at the areas Dab and Dcd (the fourth divided area) of the hologram element 281, whose positions are separated from the center 32 in the radial direction. As a result, the detector 351 can avoid the minimum interlayer stray light efficiently.

Figure 29:
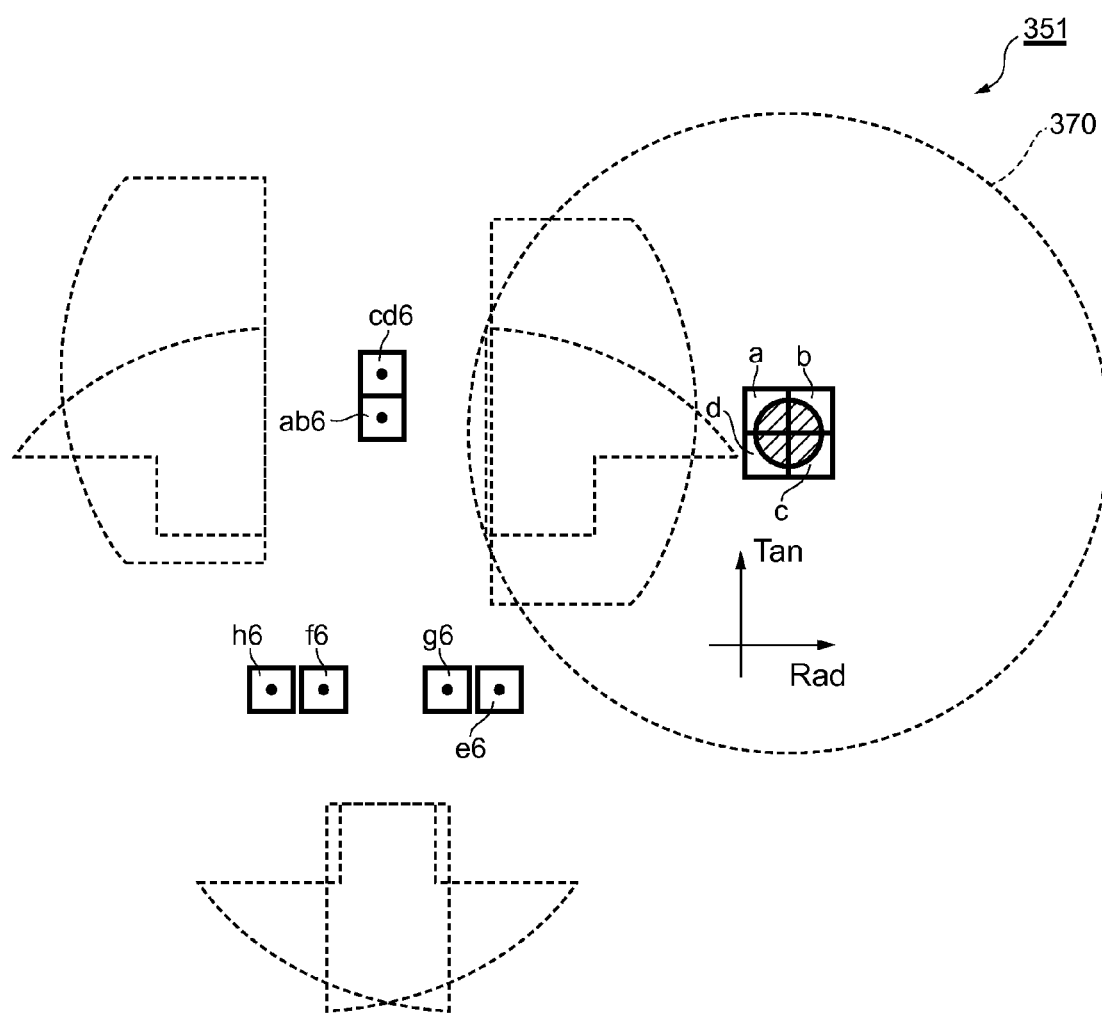
FIG. 29 is a schematic plan view showing the state of a maximum interlayer stray light caused by a light beam which has entered the detector.

Next, a method for avoiding the maximum interlayer stray light according to this embodiment will be explained. FIG. 29 is a schematic plan view of the light beam L1 which has been diffracted at each area Da to Dh of the hologram element 281 and enters the detection parts ab to h6 of the detector 351 as seen from the direction along the optical axial direction. Each of black dots and shaded areas shown in FIG. 29 represents a light spot on the relevant detection part which has received the light beam L1 when the objective lens 10 forms a focal point on a desired information recording layer of the optical disc 3. Dashed lines shown in FIG. 29 represent the maximum interlayer stray light.

When explaining the maximum interlayer stray light, it has to be explained by referring to: stray light (maximum interlayer stray light) which occurs from the most back-side information recording layer when the focal point of the objective lens 10 is formed on the most front-side information recording layer of the multi layer optical disc 3; and stray light (maximum interlayer stray light) which occurs from the most front-side information recording layer when the focal point of the objective lens 10 is formed on the most back-side information recording layer. However, for ease of explanation, the case of the stray light from the most front-side recording layer when the focal point is formed on the most back-side recording layer will be explained below with reference to FIG. 29.

With the detector 351 according to this embodiment, the detection part groups, which are composed of the detection parts e6, f6, g6, and h6 (the 12th detection part group) and the detection parts ab6 and cd6 (the 13th detection part group), for detecting the tracking error signal are aligned in the radial direction relative to the first detection part group in order to avoid the maximum interlayer stray light 370 caused by the 0th-order diffracted light entering the detection parts a, b, c, and d (the first detection part group). As a result, the detector 351 can avoid the maximum interlayer stray light 370 caused by the 0th-order diffracted light.

Furthermore, the stray light diffracted at the areas Dab and Dcd (the fourth detection part group) of the hologram element 281 moves in the radial direction according to the distance between the desired information recording layer and the other information recording layer(s), so that the stray light will not enter the detection parts e6, f6, g6, and h6 (the 12th detection part group) which are located in a generally tangential direction relative to the detection parts ab6 and cd6. However, the stray light diffracted at the areas Dab and Dcd (the fourth detection part group) of the hologram element 281 expands in the tangential direction on the detector 282 according to the interlayer distance, so that the detection parts f6 and g6 and the detection parts e6 and h6, which are aligned in the radial direction, and the detection parts ab6 and cd6, which are aligned in the tangential direction, are located at positions separated by a specified amount in the tangential direction. As a result, each detection part of the detector 282 can completely avoid the maximum interlayer stray light.

(6-2) Advantageous Effects of this Embodiment

The optical pickup device 350 according to this embodiment can obtain the same advantageous effects as those of the optical pickup device 5 according to the first embodiment as described above.

(6-3) Variation of Sixth Embodiment

Incidentally, the aforementioned sixth embodiment has described the case where the arrangement pattern of the detection parts of the detector 351 is configured as shown in FIG. 28; however, the present invention is not limited to this example and, for example, any arrangement pattern of the detection parts for detecting the tracking error signal may be employed as long as the detection parts are located at positions where the maximum interlayer stray light caused by the 0th-order diffracted light which enters the detection parts a, b, c, and d (the first detection part group) can be avoided as shown in FIG. 30(A) and FIG. 30(B).

Figure 31:
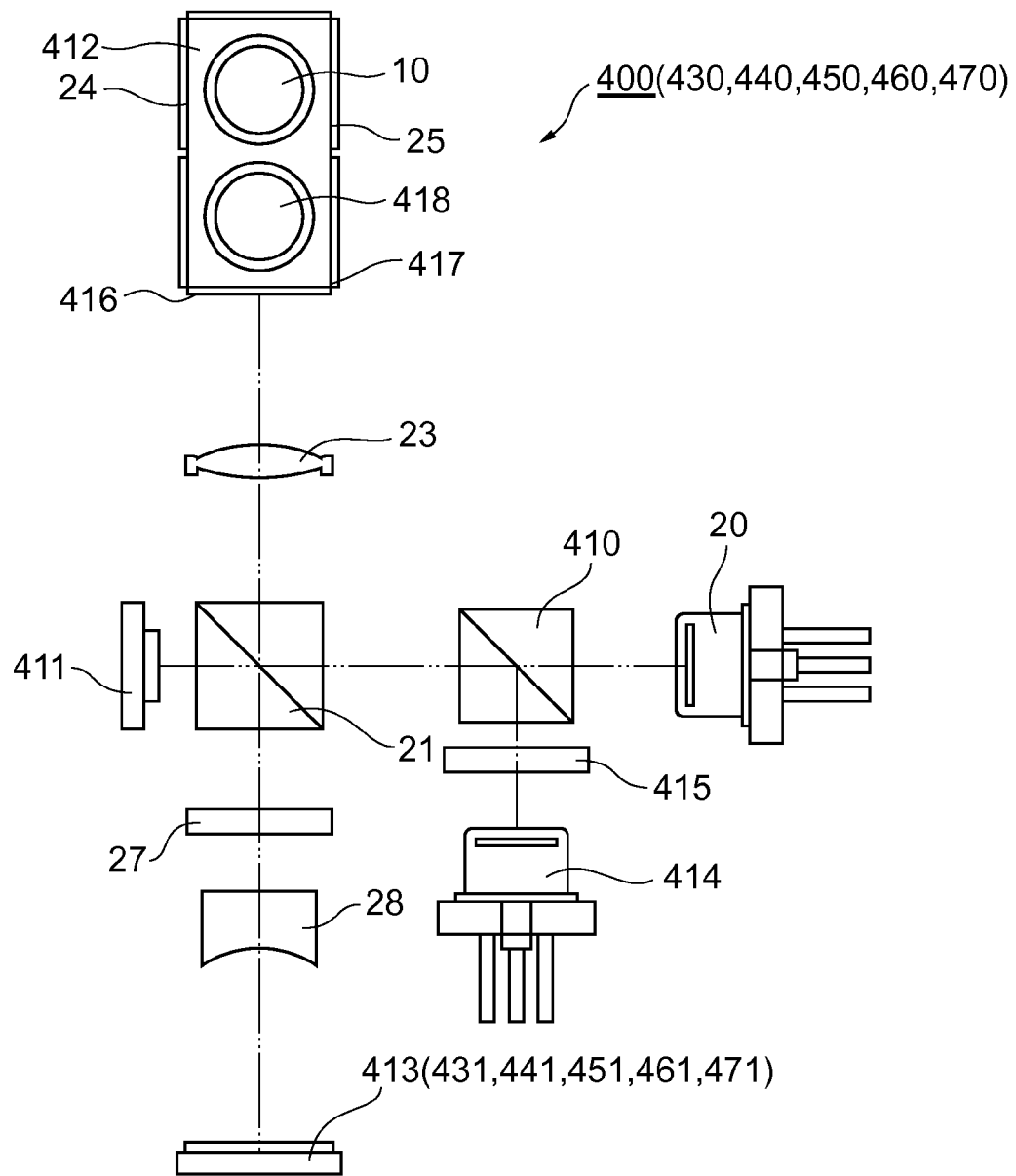
FIG. 31 is a plan view showing a configuration example for an optical pickup device according to a seventh embodiment.

(7) Seventh Embodiment (7-1) Configuration of Optical Pickup Device According to this Embodiment FIG. 31 in which the same reference numerals are assigned to elements corresponding to those in FIG. 2, shows an optical pickup device 400 according to a seventh embodiment. This optical pickup device 400 is configured in the same manner as the optical pickup device 5 according to the first embodiment, except that the configuration of the optical system and the configuration of detection parts of a detector 413 in the optical pickup device 400 is different because this optical pickup device 400 is designed to be compatible with not only BDs (Blu-Ray Discs), but also DVDs (Digital Versatile Discs) or CDs (Compact Discs).

In fact, the first embodiment has described the case where the optical pickup device 5 reproduces and records information in a BD. On the other hand, the optical pickup device 400 according to this embodiment reproduces and records information in a DVD or a CD in addition to the BD, so that components for optically reproducing and recording data in the DVD or the CD are added to the optical system of the optical pickup device 5 according to the first embodiment. Accordingly, the detector 413 is configured so that components for receiving the light beam L1 reflected from the DVD or the CD are also added to the configuration of the detector 29 according to the first embodiment.

FIG. 31 shows the optical system of the optical pickup device 400 mounted in the optical disc apparatus 1 shown in FIG. 1. The optical pickup device 400 includes an optical system 20 for optically reading/writing data from/to a CD or DVD in addition to the optical system for optically reading/writing data from/to a BD according to the first embodiment as shown in FIG. 31.

The optical system for optically reading/writing data from/to a BD is equipped with a laser diode 20, a beam splitter 410, a beam splitter 21, a front monitor 411, a collimating lens 23, a reflection mirror 24, a quarter wave plate 25, an actuator 412, an objective lens 10, a hologram element 27, a detecting lens 28, and a detector 413.

The laser diode 20 is composed of a laser diode that emits a light beam L1 of diverging rays of an approximately 405 [nm] band in conformity with BD standards and, for example, the laser diode 20 is blink-driven by the aforementioned laser lighting circuit 6 (FIG. 1) according to target data to be recorded at the time of recording and reproduction and the lighting of the laser diode 20 is turned on and driven by constant power at the time of reproduction operation.

Furthermore, each of the beam splitter 410 and the beam splitter 21 is an optical component that transmits the light beam L1 and divides it into two or more light beams. The light beam L1 emitted from the laser diode 20 at the time of activation of the laser diode 20 permeates through the beam splitter 410 and enters the beam splitter 21. Then, the light beam L1 is divided into a light beam L1, which permeates through the beam splitter 21 and enters the front monitor 411, and a light beam L1 which reflects off the beam splitter 21 and enters the collimating lens 23.

The front monitor 411 is an optical component for detecting the light quantity of the light beam L1 and is used when controlling the light quantity of the light beam L1 to a desired value in order to enhance the precision of the recording and reproduction operation of the optical disc 3. Specifically speaking, the front monitor 411 detects a change of the light quantity of the light beam L1 from the laser diode 20 and feeds back the detection result to the control circuit 13 (FIG. 1). As a result, the light quantity of the light beam L1 delivered to the optical disc 3 can be controlled under control of the control circuit 13.

The collimating lens 23 is an optical component that changes a state of divergence and convergence of the light beam L1 by driving the collimating lens 23 in the optical axial direction by means of a mechanism for driving the collimating lens 23 in the optical axial direction; and is used to compensate a spherical aberration due to a thickness error of a cover layer of the optical disc 3. Then, the light beam L1 which permeates through the collimating lens 23 reflects off the reflection mirror 24 and enters the quarter wave plate 25.

The quarter wave plate 25 is an optical component that changes linearly polarized light to circularly polarized light. Specifically speaking, the light beam L1 is converted by the quarter wave plate 25 into the circularly polarized light and is then collected by the objective lens 10, which is mounted on the actuator 412, onto the optical disc 3. Then, the light beam L1 is diffracted by the track of the optical disc 3 into three light beams (0th-order disc-diffracted light, +1st-order disc-diffracted light, and −1st-order disc-diffracted light).

Incidentally, the objective lens 10 is an optical component for collecting the optical beam of the light beam L1 and the position of the objective lens 10 can be changed to a direction moving closer to the optical disc 3 or to a direction moving away from the optical disc 3 and the objective lens 10 can be tilted in a radial direction of the optical disc 3 by using the actuator for driving the objective lens 10.

On the other hand, the light beam L1 reflected from the optical disc 3 is converted by the objective lens 10 into a parallel ray, which then sequentially passes through the quarter wave plate 25, the reflection mirror 24, the collimating lens 23, and the beam splitter 21 and enters the hologram element 27.

The hologram element 27 includes divided areas for diffracting the light beam L1, which has entered the hologram element 27, in different directions. The detecting lens 28 gives astigmatism to the light beam L1 diffracted at the divided areas in this hologram element 27 and the light beam L1 then enters the detector 413.

Furthermore, the detector 413 has a detection part configuration that allows the light beam L1 to converge; and this detector 413 serves to photoelectrically convert the light beam L1 which has entered the detection parts. The detector 413 sends the obtained signal to the information signal reproducing circuit 7 and the servo signal reproducing circuit 8; and the information signal reproducing circuit 7 generates an RF signal which is a reproduction signal; and the servo signal reproducing circuit 8 generals, for example, a focusing error signal and a tracking error signal which are servo signals.

Furthermore, the optical system for optically reading/writing data from/to a CD or DVD includes a laser diode 414, a grating 415, the beam splitter 410, the beam splitter 21, the front monitor 411, the collimating lens 23, a reflection mirror 416, a quarter wave plate 417, the actuator 412, an objective lens 418, the hologram element 27, the detecting lens 28, and the detector 413.

The laser diode 414 is composed of a laser diode that emits a light beam L2 of diverging rays of an approximately 785 [nm] band in conformity with CD standards and a light beam L3 of diverging rays of an approximately 660 [nm] band in conformity with DVD standards. The laser beams L2 and L3 emitted from the laser diode 414 are blink-driven by the aforementioned laser lighting circuit 6 (FIG. 1) according to target data to be recorded at the time of recording and reproduction and the lighting of the laser diode 414 is turned on and driven by constant power at the time of reproduction operation.

Furthermore, the grating 415 is an optical component for interchanging between a CD and a DVD that diffracts the light beams L2 and L3 into three light beams L2 and L3 (the 0th-order diffracted light, the +1st-order diffracted light, and the −1st-order diffracted light). For example, for the conventional DPP method, it is necessary to shift the +1st-order diffracted light and the −1st-order diffracted light by a 1/2 track pitch each in the radial direction with respect to the 0th-order diffracted light on the optical disc 3. However, for example, in the case of DVDs, there are DVDs with different track pitches such as a DVD±R/RW (track pitch: 0.74 [μm]), a DVD-RAM1 (track pitch: 1.48 [μm]), and a DVD-RAM2 (track pitch: 1.23 [μm]) and the problem is that it is difficult to control the location of a light spot corresponding to each type. However, the grating 415 is used to create a phase difference in a radial direction of the grating between the +1st-order diffracted light and the −1st-order diffracted light among the three light beams L2 and L3, so that the DPP method can be used even on the same track of the optical disc 3 with different track pitches. For example, it is assumed that a grating described in Japanese Patent Application Laid-Open (Kokai) Publication No. 2007-317331 is used. However, the grating used in this embodiment is not limited to this grating.

The laser beams L2 and L3 emitted from the laser diode 414 are turned into at least three light beams, that is, the 0th-order diffracted light, the +1st-order diffracted light, and the −1st-order diffracted light, by means of the grating 415 and the three light beams then reflect off the beam splitter 410 and enter the beam splitter 21. Subsequently, the light beams are divided into the light beams L2 and L3, which permeate through the beam splitter 21 and enter the front monitor 411, and the light beams L2 and L3 which reflect off the beam splitter 21 and enter the collimating lens 23.

Then, the light beam L2 which has entered the collimating lens 23 is converted by the collimating lens 23 into a parallel ray, is reflected by the reflection mirror 416, passes through the quarter wave plate 417, and is caused by the objective lens 10 mounted on the actuator 412 to converge on the optical disc 3. Then, the 0th-order diffracted light, the +1st-order diffracted light, and the −1st-order diffracted light, which have been divided by the grating 415, are caused by the objective lens 418 to respectively independently converge on the information recording surface of the optical disc 3 and form three collected light spots.

Incidentally, the reflection mirror 416 and the quarter wave plate 417 have the same configuration as that of the reflection mirror 24 and the quarter wave plate 25 in the optical system for optically reading/writing data from/to a BD, so that a detailed explanation about them has been omitted.

On the other hand, the light beam L2 reflected from the optical disc 3 is converted by the objective lens 418 into a parallel ray, which is then sequentially passes through the quarter wave plate 417, the reflection mirror 416, the collimating lens 23, and the beam splitter 21, and enters the hologram element 27.

The hologram element 27 includes divided areas for diffracting the light beam L2, which has entered the hologram element 27, in different directions. The detecting lens 28 gives astigmatism to the light beams L2 and L3 diffracted by this hologram element 27 and the light beams L2 and L3 then enter the detector 413.

Furthermore, the detector 413 has a detection part configuration that allows the light beam L2 to converge; and this detector 413 serves to photoelectrically convert the light beams L2 and L3 which have entered the detection parts. The detector 413 sends the obtained signal to the information signal reproducing circuit 7 and the servo signal reproducing circuit 8; and the information signal reproducing circuit 7 generates an RF signal which is a reproduction signal; and the servo signal reproducing circuit 8 generals, for example, a focusing error signal and a tracking error signal which are servo signals.

Figure 30:
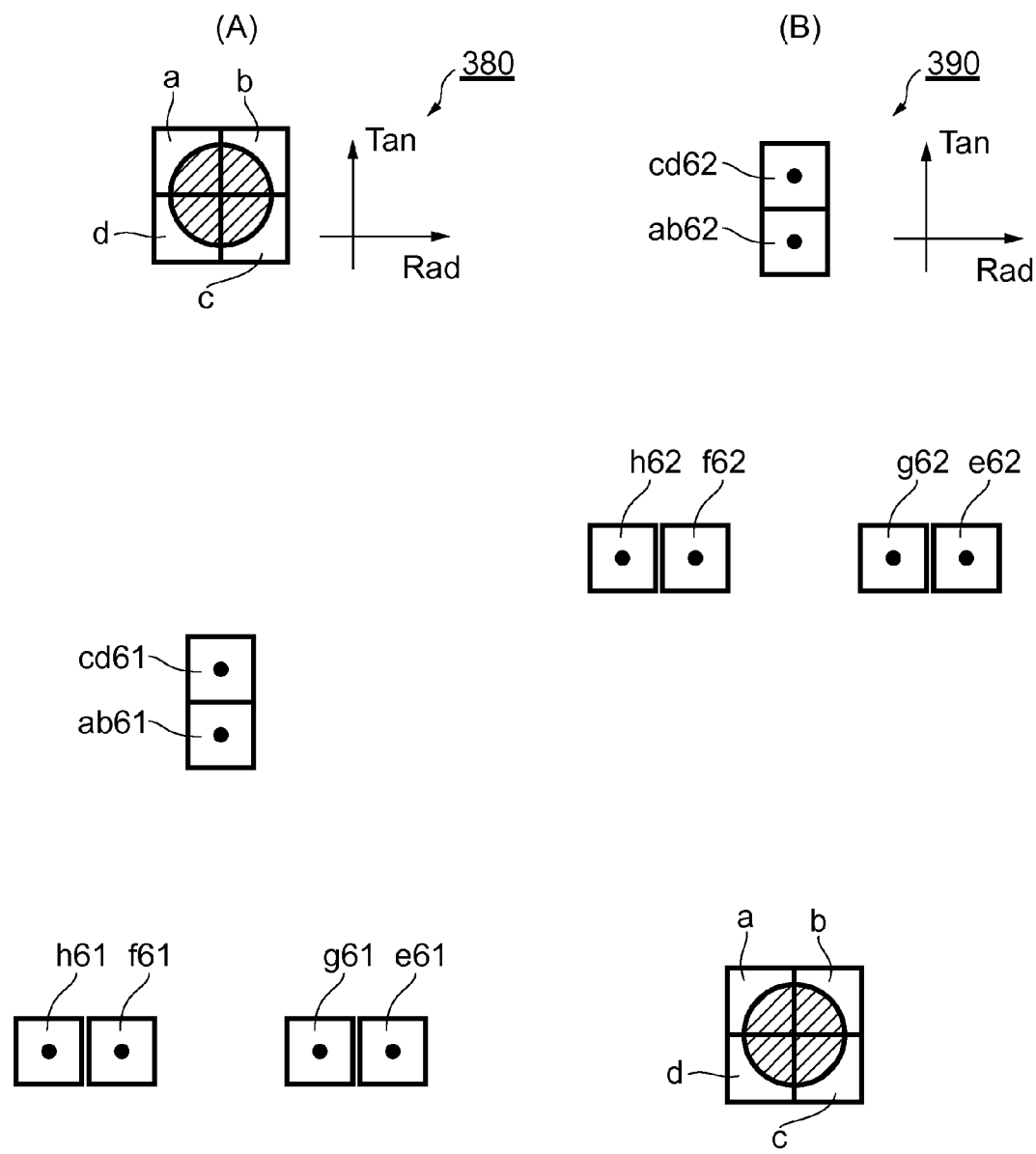
FIG. 30(A) shows a variation of an arrangement pattern of the detection parts of the detector according to the sixth embodiment.
FIG. 30(B) shows a variation of an arrangement pattern of the detection parts of the detector according to the sixth embodiment.

FIG. 32 shows an arrangement pattern of the detection parts of the detector 413 in FIG. 30. A shaded area and black dots in FIG. 32 represent signal light. The detector 413 according to this embodiment includes detection parts for receiving the light beams L2 and L3 from the information recording surface of a CD or DVD and detecting signals, as shown in FIG. 32, in addition to the configuration of the arrangement pattern of the detection parts of the detector 29 according to the first embodiment as shown in FIG. 4 for receiving the light beam L1 from the information recording surface of a BD and detecting signals.

Therefore, the detection parts of the detector 413 according to this embodiment for avoiding the stray light and detecting the stable tracking error signal have the same arrangement pattern as that of the detection parts of the detector 29 for detecting the tracking error signal according to the first embodiment, so that a method for avoiding the stray light of the maximum interlayer stray light and the minimum interlayer stray light according to this embodiment is the same as the method for avoiding the stray light according to the first embodiment. Therefore, the details of the method for avoiding the stray light of the maximum interlayer stray light and the minimum interlayer stray light according to this embodiment have been omitted.

A method for detecting signals of a BD will be firstly explained below.

The 0th-order diffracted light caused by the light beam L1, which has permeated through the areas Da, Db, Dc, Dd, De, Df, Dg, Dh, and Di of the hologram element 27, enters detection parts 10*a*, 10*b*, 10*c*, and 10*d* (14th detection part group). Then, the focusing error signal and the RF signal can be obtained from signals 10A, 10B, 10C, and 10D which are output from the detection parts 10*a*, 10*b*, 10*c*, and 10*d* (the 14th detection part group) on this detector 29 according to the quantity of light.

In this embodiment, the focusing error signal FES is generated by the astigmatic method according to the following mathematic formula by using signals 10A, 10B, 10C, and 10D.

[Math. 19]

$$FES=(10A+10C)-(10B+10D) \quad (19)$$

Also, the RF signal RF is generated according to the following mathematic formula by using the signals 10A, 10B, 10C, and 10D.

[Math. 20]

$$RF=10A+10B+10C+10D \quad (20)$$

Furthermore, the +1st-order diffracted light diffracted at the areas Da, Db, Dc, Dd, De, Df, Dg, and Dh of the hologram element 27 enters the detection parts a1, b1, c1, d1, e1, f1, g1, and h1 of the detector 413 shown in FIG. 32, respectively. Then, the tracking error signal can be obtained by using signals A1, B1, C1, D1, E1, F1, G1, and H1 which are output from the detection parts a1, b1, c1, d1, e1, f1, g1, and h1 of the detector 413 according to the quantity of light. Incidentally, the +1st-order diffracted light (not shown) diffracted at the area Di is treated as unnecessary light and enters the detector 413 by avoiding the detection parts in the radial direction.

In this embodiment, the tracking error signal TES is generated by the 1-beam DPP method according to the following mathematical formula by using the signals A1, B1, C1, D1, E1, F1, G1, and H1.

[Math. 21]

$$TES=\{(A1+B1)-(C1+D1)\}-ktb\{(E1+F1)-(G1+H1)\} \quad (21)$$

The letters ktb in Mathematical Formula (21) is a coefficient for correcting an offset component included in the signals of a first term in Mathematical Formula (21) and an offset component included in the signals of a second term in Mathematical Formula (21) when the lens shift of the objective lens 10 is performed. As a result of such an operation, the stable tracking error signal without offset can be generated even if the lens shift of the objective lens 10 is performed.

Subsequently, a method for detecting signals of a DVD will be explained.

The light beam L2 which has permeated through the areas Da, Db, Dc, Dd, De, Df, Dg, Dh, and Di of the hologram element 413 enters the detection parts 10*a*, 10*b*, 10*c*, and 10*d* (the 14th detection part group), the detection parts 10*e*, 10*f*, 10g, and 10h (15th detection part group), and detection parts 10i, 10j, 10k, and 10l (16th detection part group). Then, the focusing error signal and the RF signal can be obtained from signals 10A, 10B, 10C, 10D, 10E, 10F, 10G, 10H, 10I, 10J, 10K, and 10L which are output from the detection parts 10a, 10b, 10c, and 10d (the 14th detection part group), the detection parts 10e, 10f, 10g, and 10h (the 15th detection part group), and the detection parts 10i, 10j, 10k, and 10l (the 16th detection part group) of the detector 413 according to the quantity of light.

In this embodiment, the focusing error signal FES is generated by the astigmatic method according to the following mathematic formula by using the signals 10A, 10B, 10C, 10D, 10E, 10F, 10G, 10H, 10I, 10J, 10K, and 10L.

[Math. 22]

$$FES=\{(10A+10C)-(10B+10D)\}-kfd\{(10E+10G+10I+10K)-(10F+10H+10J+10L)\} \quad (22)$$

The letters kfd in Mathematical Formula 22 is a coefficient for preventing the generation of a groove-crossing signal in the focusing error signal.

Also, the RF signal RF is generated according to the following mathematic formula by using the signals 10A, 10B, 10C, and 10D.

[Math. 23]

$$RF=10A+10B+10C+10D \quad (23)$$

Furthermore, the tracking error signal can be obtained from the signals 10A, 10B, 10C, 10D, 10E, 10F, 10G, 10H, 10I, 10J, 10K, and 10L which are output from the detection parts 10a, 10b, 10c, and 10d (the 14th detection part group), the detection parts 10e, 10f, 10g, and 10h (the 15th detection part group), and the detection parts 10i, 10j, 10k, and 10l (the 16th detection part group) of the detector 413 according to the quantity of light.

In this embodiment, for example, a 3-beam Differential-Push-Pull method (hereinafter referred to as the 3-beam DPP method) is used to detect the tracking error signal of a CD or DVD.

The 3-beam DPP method is a method for performing the DPP method with three beams and the 3-beam DPP method is a known technique, so that any further explanation about it has been omitted.

In this embodiment, the tracking error signal TES is generated by the 3-beam DPP method according to the following mathematical formula by using the signals 10A, 10B, 10C, 10D, 10E, 10F, 10G, 10H, 10I, 10J, 10K, and 10L.

[Math. 24]

$$TES=\{(10A+10D)-(10B+10C)\}-ktd\{(10E+10F+10I+10J)-(10G+10H+10K+10L)\} \quad (24)$$

The letters ktd in Mathematical Formula (24) is a coefficient for correcting an offset component included in the signals of a first term in Mathematical Formula (24) and an offset component included in the signals of a second term in Mathematical Formula (24) when the lens shift of the objective lens 10 is performed.

Subsequently, a method for detecting signals of a CD will be explained.

The light beam L3 which has permeated through the areas Da, Db, Dc, Dd, De, Df, Dg, Dh, and Di of the hologram element 413 enters detection parts 20a, 20b, 20c, and 20d (14th detection part group), detection parts 20e, 20f, 20g, and 20h (17th detection part group), and the detection parts 20i, 20j, 20k, and 20l (18th detection part group). Then, the focusing error signal and the RF signal can be obtained from signals 20A, 20B, 20C, 20D, 20E, 20F, 20G, 20H, 20I, 20J, 20K, and 20L which are output from the detection parts 20a, 20b, 20c, and 20d (the 14th detection part group), the detection parts 20e, 20f, 20g, and 20h (the 17th detection part group), and the detection parts 20i, 20j, 20k, and 20l (the 18th detection part group) of the detector 413 according to the quantity of light.

In this embodiment, the focusing error signal FES is generated by the astigmatic method according to the following mathematic formula by using the signals 20A, 20B, 20C, 20D, 20E, 20F, 20G, 20H, 20I, 20J, 20K, and 20L.

[Math. 25]

$$FES=\{(20A+20C)-(20B+20D)\} \quad (25)$$

Also, the RF signal RF is generated according to the following mathematic formula by using the signals 20A, 20B, 20C and 20D.

[Math. 26]

$$RF=20A+20B+20C+20D \quad (26)$$

Furthermore, the tracking error signal can be obtained from the signals 20A, 20B, 20C, 20D, 20E, 20F, 20G, 20H, 20I, 20J, 20K, and 20L which are output from the detection parts 20a, 20b, 20c, and 20d (the 14th detection part group), the detection parts 20e, 20f, 20g, and 20h (the 17th detection part group), and the detection parts 20i, 20j, 20k, and 20l (the 18th detection part group) of the detector 413 according to the quantity of light.

In this embodiment, the tracking error signal TES is generated by the 3-beam DPP method according to the following mathematical formula by using the signals 20A, 20B, 20C, 20D, 20E, 20F, 20G, 20H, 20I, 20J, 20K, and 20L.

[Math. 27]

$$TES=\{(20A+20D)-(20B+20C)\}-ktd\{(20E+20F+20I+20J)-(20G+20H+20K+20L)\} \quad (27)$$

The letters ktd in Mathematical Formula (27) is a coefficient for correcting an offset component included in the signals of a first term in Mathematical Formula (27) and an offset component included in the signals of a second term in Mathematical Formula (27) when the lens shift of the objective lens 10 is performed.

(7-2) Advantageous Effects of this Embodiment

The optical pickup device 400 according to this embodiment can obtain the same advantageous effects as those of the optical pickup device 5 according to the first embodiment as described above.

(8) Eighth Embodiment (8-1) Configuration of Optical Pickup Device According to this Embodiment Referring to FIG. 31, the reference numeral 430 represents an optical pickup device according to this embodiment. This optical pickup device 430 is configured in the same manner as the optical pickup device 400 according to the seventh embodiment, except that the configuration of detection parts of a detector 431 is different.

Figure 33:
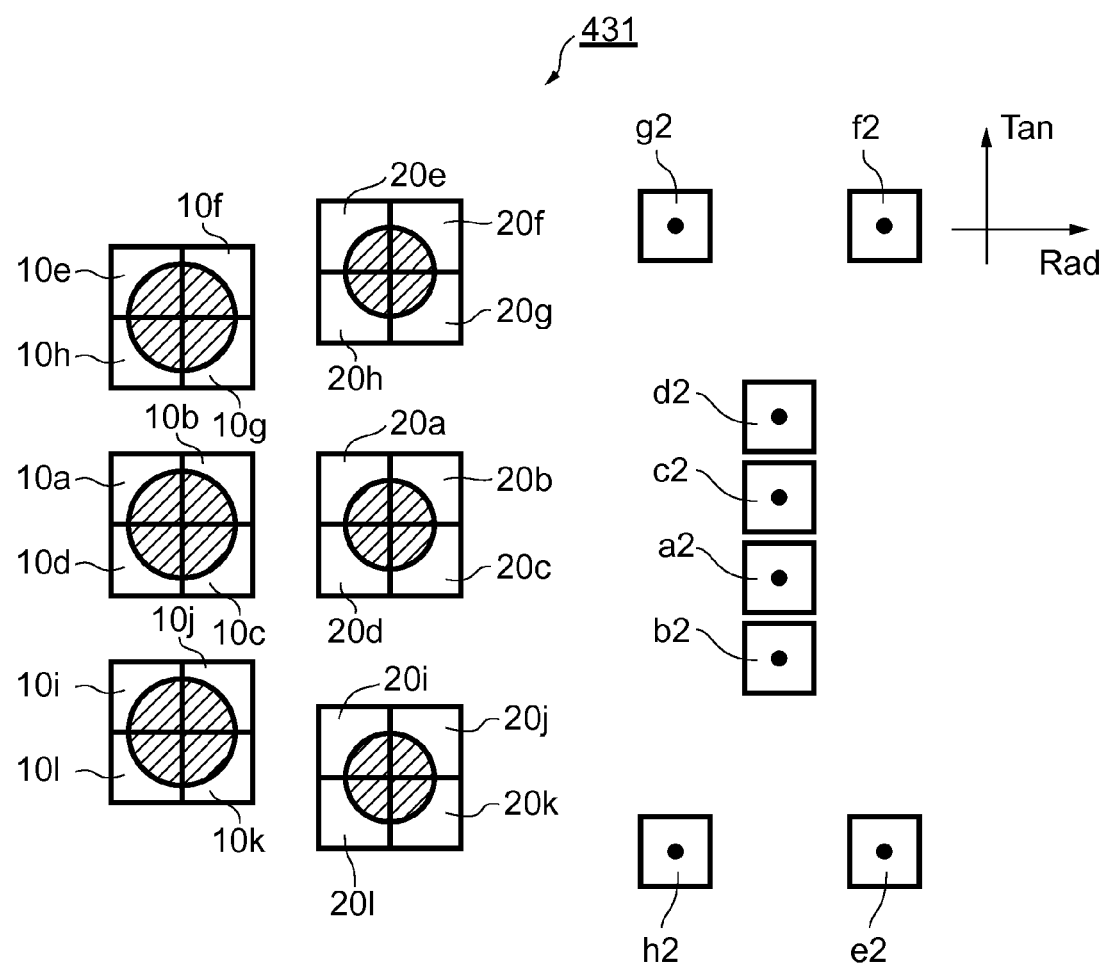
FIG. 33 is a plan view showing an example of an arrangement pattern of detection parts of a detector according to an eighth embodiment.

In fact, an arrangement pattern of detection parts of the detector 431 according to this embodiment includes detection parts for receiving the light beams L2 and L3 from the information recording surface of a CD or DVD and detecting signals, as shown in FIG. 33, in addition to the configuration of the arrangement pattern of the detection parts of the detector 131 according to the second embodiment as shown in FIG. 11 for receiving the light beam L1 from the information recording surface of a BD and detecting signals.

Incidentally, detection parts 10a, 10b, 10c, and 10d, detection parts e2, f2, g2, and h2 (fourth detection part group), and detection parts a2, b2, c2, and d2 (fifth detection part group) of the detector 431 according to this embodiment correspond to the detection parts a, b, c, and d (the first detection part group), the detection parts e2, f2, g2, and h2 (the fourth detection part group), and the detection parts a2, b2, c2, and d2 (the fifth detection part group) of the detector 131 according to the second embodiment.

Therefore, the detection parts of the detector 431 according to this embodiment for avoiding the stray light and detecting the stable tracking error signal have the same arrangement pattern as that of the detection parts of the detector 131 for detecting the tracking error signal according to the second embodiment, so that a method for avoiding the stray light of the maximum interlayer stray light and the minimum interlayer stray light according to this embodiment is the same as the method for avoiding the stray light according to the second embodiment. Therefore, the details of the method for avoiding the stray light of the maximum interlayer stray light and the minimum interlayer stray light according to this embodiment have been omitted.

(8-2) Advantageous Effects of this Embodiment

The optical pickup device 430 according to this embodiment can obtain the same advantageous effects as those of the optical pickup device 400 according to the seventh embodiment as described above.

(9) Ninth Embodiment (9-1) Configuration of Optical Pickup Device According to this Embodiment FIG. 34, in which the same reference numerals are assigned to elements corresponding to those of the optical pickup device 400 according to the seventh embodiment, shows an optical pickup device 440 according to this embodiment. This optical pickup device 440 is configured in the same manner as the optical pickup device 400 according to the seventh embodiment, except that the configuration of detection parts of a detector 441 is different.

In fact, an arrangement pattern of detection parts of the detector 441 according to this embodiment includes detection parts for receiving the light beams L2 and L3 from the information recording surface of a CD or DVD and detecting signals, as shown in FIG. 34, in addition to the configuration of the arrangement pattern of the detection parts of the detector 171 according to the third embodiment as shown in FIG. 15 for receiving the light beam L1 from the information recording surface of a BD and detecting signals.

Incidentally, detection parts 10a, 10b, 10c, and 10d, detection parts e3, f3, g3, and h3 (sixth detection part group), and detection parts a3, b3, c3, and d3 (seventh detection part group) of the detector 441 according to this embodiment correspond to the detection parts a, b, c, and d (the first detection part group), the detection parts e3, f3, g3, and h3 (the sixth detection part group), and the detection parts a3, b3, c3, and d3 (the seventh detection part group) of the detector 171 according to the third embodiment.

Therefore, the detection parts of the detector 441 according to this embodiment for avoiding the stray light and detecting the stable tracking error signal have the same arrangement pattern as that of the detection parts of the detector 171 for detecting the tracking error signal according to the third embodiment, so that a method for avoiding the stray light of the maximum interlayer stray light and the minimum interlayer stray light according to this embodiment is the same as the method for avoiding the stray light according to the third embodiment. Therefore, the details of the method for avoiding the stray light of the maximum interlayer stray light and the minimum interlayer stray light according to this embodiment have been omitted.

(9-2) Advantageous Effects of this Embodiment

The optical pickup device 440 according to this embodiment can obtain the same advantageous effects as those of the optical pickup device 400 according to the seventh embodiment as described above.

(10) 10th Embodiment (10-1) Configuration of Optical Pickup Device According to this Embodiment FIG. 31, in which the same reference numerals are assigned to elements corresponding to those of the optical pickup device 400 according to the seventh embodiment, shows an optical pickup device 450 according to this embodiment. This optical pickup device 450 is configured in the same manner as the optical pickup device 400 according to the seventh embodiment, except that the configuration of detection parts of a detector 451 is different.

Figure 35:
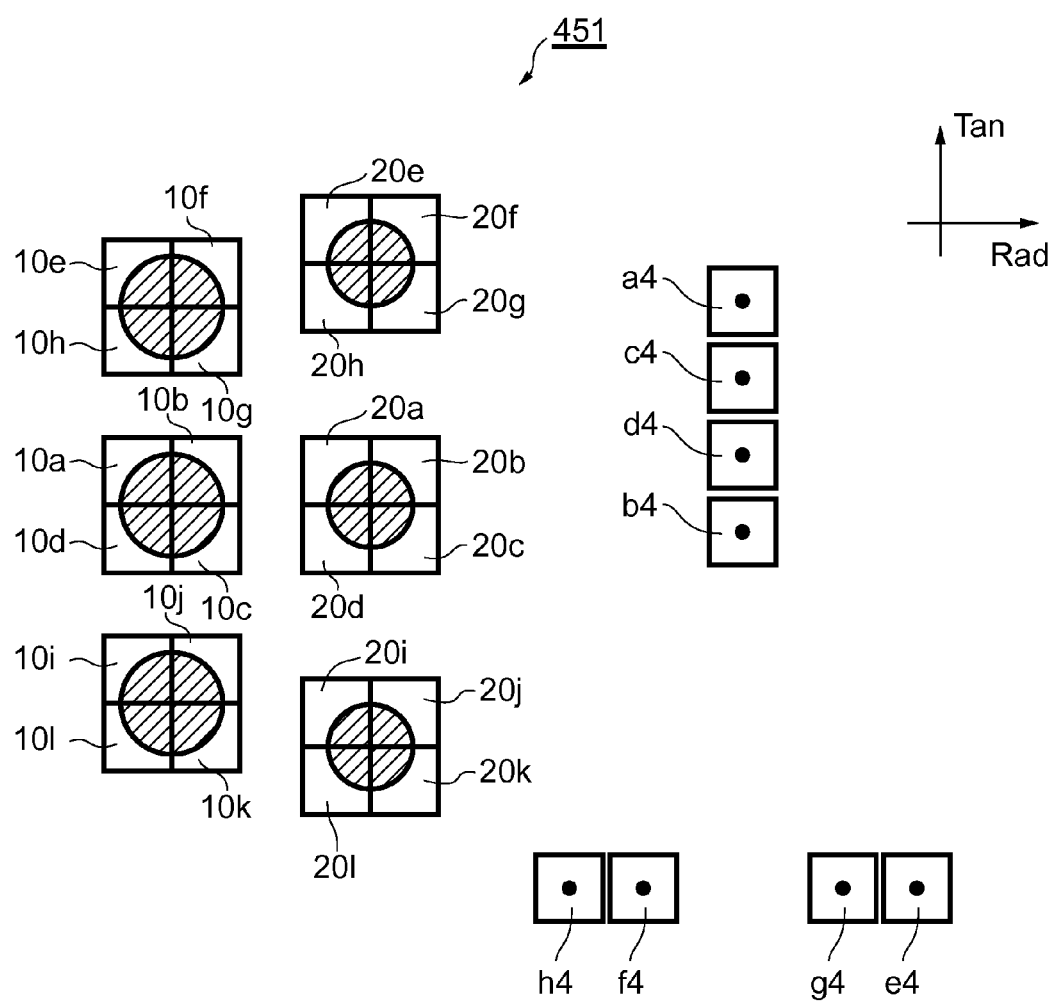
FIG. 35 is a plan view showing an example of an arrangement pattern of detection parts of a detector according to a 10th embodiment.

In fact, an arrangement pattern of detection parts of the detector 451 according to this embodiment includes detection parts for receiving the light beams L2 and L3 from the information recording surface of a CD or DVD and detecting signals, as shown in FIG. 35, in addition to the configuration of the arrangement pattern of the detection parts of the detector 231 according to the fourth embodiment as shown in FIG. 19 for receiving the light beam L1 from the information recording surface of a BD and detecting signals.

Incidentally, detection parts 10a, 10b, 10c, and 10d, detection parts e4, f4, g4, and h4 (eighth detection part group), and detection parts a4, b4, c4, and d4 (ninth detection part group) of the detector 451 according to this embodiment correspond to the detection parts a, b, c, and d (the first detection part group), the detection parts e4, f4, g4, and h4 (the eighth detection part group), and the detection parts a4, b4, c4, and d4 (the ninth detection part group) of the detector 231 according to the fourth embodiment.

Therefore, the detection parts of the detector 451 according to this embodiment for avoiding the stray light and detecting the stable tracking error signal have the same arrangement pattern as that of the detection parts of the detector 231 for detecting the tracking error signal according to the fourth embodiment, so that a method for avoiding the stray light of the maximum interlayer stray light and the minimum interlayer stray light according to this embodiment is the same as the method for avoiding the stray light according to the fourth embodiment. Therefore, the details of the method for avoiding the stray light of the maximum interlayer stray light and the minimum interlayer stray light according to this embodiment have been omitted.

(10-2) Advantageous Effects of this Embodiment

The optical pickup device 450 according to this embodiment can obtain the same advantageous effects as those of the optical pickup device 400 according to the seventh embodiment as described above.

(11) 11th Embodiment (11-1) Configuration of Optical Pickup Device According to this Embodiment Referring to FIG. 31, the reference numeral 460 represents an optical pickup device according to this embodiment. This optical pickup device 460 is configured in the same manner as the optical pickup device 400 according to the seventh embodiment, except that the configuration of detection parts of a detector 461 is different.

Figure 36:
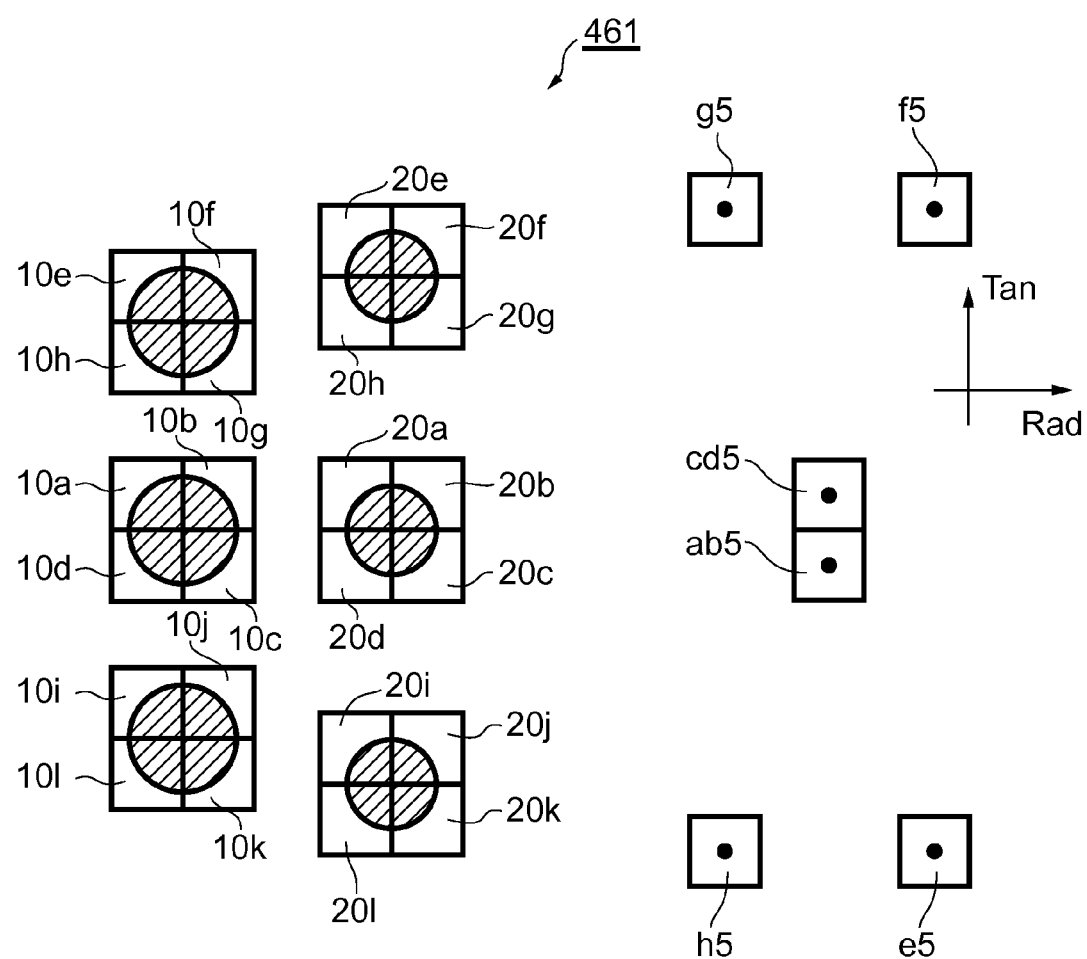
FIG. 36 is a plan view showing an example of an arrangement pattern of detection parts of a detector according to an 11th embodiment.

In fact, an arrangement pattern of detection parts of the detector 461 according to this embodiment includes detection parts for receiving the light beams L2 and L3 from the information recording surface of a CD or DVD and detecting signals, as shown in FIG. 36, in addition to the configuration of the arrangement pattern of the detection parts of the detector 282 according to the fifth embodiment as shown in FIG. 24 for receiving the light beam L1 from the information recording surface of a BD and detecting signals.

Incidentally, detection parts 10a, 10b, 10c, and 10d, detection parts e5, f5, g5, and h5 (10th detection part group), and detection parts a5, b5, c5 and d5 (11th detection part group) of the detector 461 according to this embodiment correspond to the detection parts a, b, c, and d (the first detection part group), the detection parts e5, f5, g5, and h5 (the 10th detection part group), and the detection parts a5, b5, c5 and d5 (the 11th detection part group) of the detector 282 according to the fifth embodiment.

Therefore, the detection parts of the detector 461 according to this embodiment for avoiding the stray light and detecting the stable tracking error signal have the same arrangement pattern as that of the detection parts of the detector 282 for detecting the tracking error signal according to the fifth embodiment, so that a method for avoiding the stray light of the maximum interlayer stray light and the minimum interlayer stray light according to this embodiment is the same as the method for avoiding the stray light according to the fifth embodiment. Therefore, the details of the method for avoiding the stray light of the maximum interlayer stray light and the minimum interlayer stray light according to this embodiment have been omitted.

(11-2) Advantageous Effects of this Embodiment

The optical pickup device 460 according to this embodiment can obtain the same advantageous effects as those of the optical pickup device 400 according to the seventh embodiment as described above.

(12) 12th Embodiment (12-1) Configuration of Optical Pickup Device According to this Embodiment Referring to FIG. 31, the reference numeral 470 represents an optical pickup device according to this embodiment. This optical pickup device 470 is configured in the same manner as the optical pickup device 400 according to the seventh embodiment, except that the configuration of detection parts of a detector 471 is different.

Figure 37:
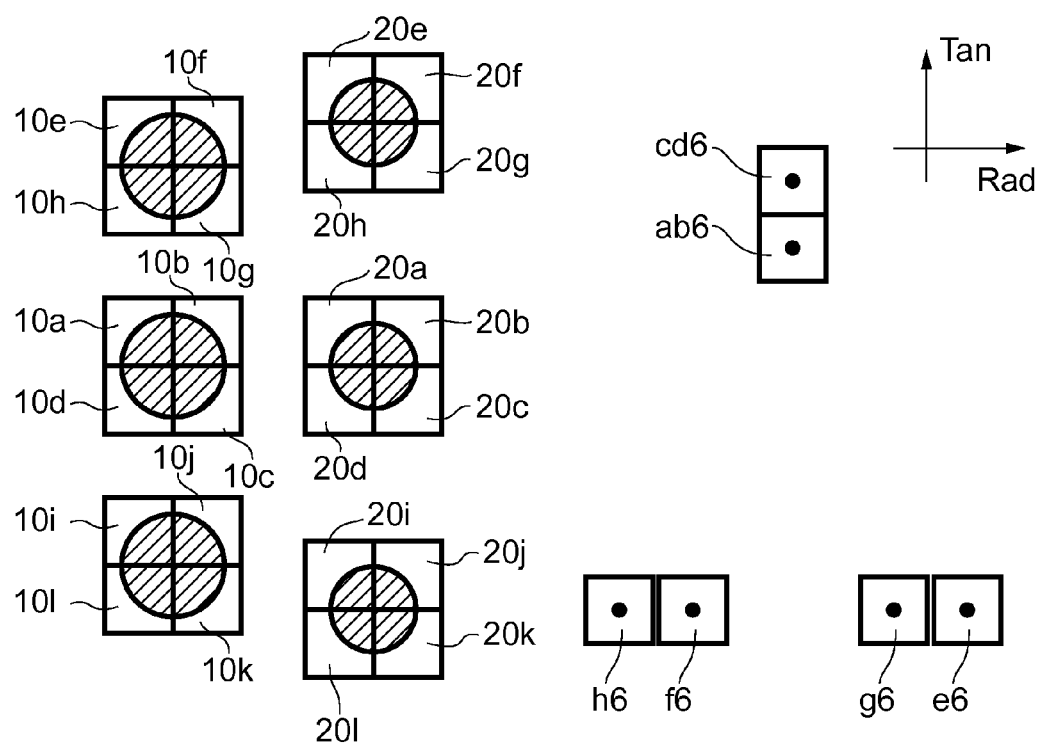
FIG. 37 is a plan view showing an example of an arrangement pattern of detection parts of a detector according to a 12th embodiment.

In fact, an arrangement pattern of detection parts of the detector 471 according to this embodiment includes detection parts for receiving the light beams L2 and L3 from the information recording surface of a CD or DVD and detecting signals, as shown in FIG. 37, in addition to the configuration of the arrangement pattern of the detection parts of the detector 351 according to the sixth embodiment as shown in FIG. 28 for receiving the light beam L1 from the information recording surface of a BD and detecting signals.

Incidentally, detection parts 10a, 10b, 10c, and 10d, detection parts e6, f6, g6, and h6 (12th detection part group), and detection part a6, b6, c6 and d6 (13th detection part group) of the detector 471 according to this embodiment correspond to the detection parts a, b, c, and d (the first detection part group), the detection parts e6, f6, g6, and h6 (the 12th detection part group), and the detection parts a6, b6, c6 and d6 (the 13th detection part group) of the detector 351 according to the sixth embodiment.

Therefore, the detection parts of the detector 471 according to this embodiment for avoiding the stray light and detecting the stable tracking error signal have the same arrangement pattern as that of the detection parts of the detector 351 for detecting the tracking error signal according to the sixth embodiment, so that a method for avoiding the stray light of the maximum interlayer stray light and the minimum interlayer stray light according to this embodiment is the same as the method for avoiding the stray light according to the sixth embodiment. Therefore, the details of the method for avoiding the stray light of the maximum interlayer stray light and the minimum interlayer stray light according to this embodiment have been omitted.

(12-2) Advantageous Effects of this Embodiment

The optical pickup device 470 according to this embodiment can obtain the same advantageous effects as those of the optical pickup device 400 according to the seventh embodiment as described above.

Figure 38:
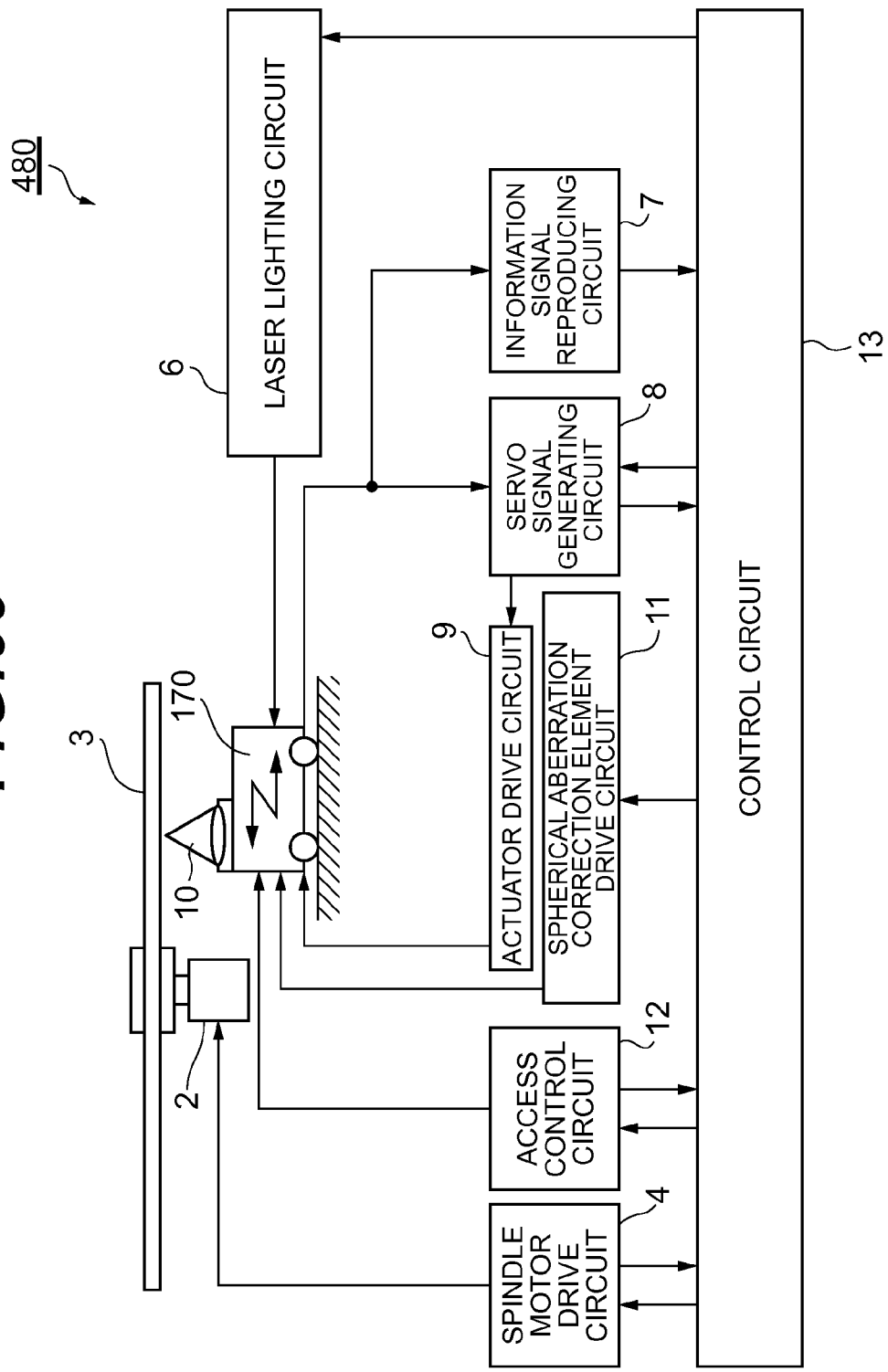
FIG. 38 is a block diagram showing a configuration example for an optical disc apparatus according to a 13th embodiment.

(13) 13th Embodiment (13-1) Configuration of Optical Disc Apparatus According to this Embodiment FIG. 38 in which the same reference numerals are assigned to elements corresponding to those in FIG. 1, shows an optical disc apparatus 480 according to a 13th embodiment. This optical disc apparatus 480 is configured in the same manner as the optical disk apparatus 1 according to the first to 12th embodiments, except that the optical disc apparatus 1 according to the first to 12th embodiments has the function recording and reproducing information in the optical disc 3, while this optical disc apparatus 480 only optically reproduces information in the optical disc 3.

In fact, the first to 12th embodiments have described the case where the optical disc apparatus 1 has the information signal recording circuit 14 in order to record and reproduce information in the optical disc 3. On the other hand, the optical disc apparatus 480 according to this embodiment is configured to only optically reproduce information in the optical disc 3, so that the optical disc apparatus 480 does not have the information recording circuit 14.

Therefore, the optical disc apparatus 480 according to this embodiment has the same configuration as that of the optical disc apparatus 1 according to the first to 12th embodiments, except that the optical disc apparatus 480 does not have the information recording circuit 14. So, any detailed explanation about the optical disc apparatus 480 has been omitted.

(13-2) Advantageous Effects of this Embodiment

The optical disc apparatus 480 according to this embodiment can obtain the same advantageous effects as those of the optical disc apparatus 1 according to the first to 12th embodiments as described above.

(14) Other Embodiments

Incidentally, the aforementioned first to 13th embodiments have described the case where the hologram element 27, 281 is located so that the light beam L1 reflected from the information recording layer of the optical disc 3 permeates through the beam splitter 21 and then passes through the hologram element 27, 281; however, the present invention is not limited to this example and the hologram element 27, 281 may be a grating such as a polarizing hologram element and located at position before the light beam permeates through the beam splitter.

Furthermore, the aforementioned first to 13th embodiments have described the case where the +1st-order diffracted light which is diffracted by the hologram element 27, 281 is detected by the detector 29, 131, 171, 231, 282, 351, 413, 441, 451, 461, 471; however, the present invention is not limited to this example and the diffracted light to be detected may be −1st-order diffracted light or light of other orders such as ±2nd-order diffracted light or ±3rd-order diffracted light.

Furthermore, the aforementioned first to 13th embodiments have described the case where the detection parts for the tracking error signal are located outside the maximum interlayer stray light caused by the 0th-order diffracted light which permeated through the hologram element 27, 281. However, the present invention is not limited to this example. If the influence of the stray light is small, the maximum interlayer stray light does not always have to be avoided.

Furthermore, a mirror may be used instead of the beam splitter 21. In this case, a coma aberration and astigmatism caused by the mirror may be corrected by the hologram element.

The present invention can be applied to a wide variety of optical pickup devices which are compatible with optical discs having a plurality of information recording layers.

What is claimed is:

1. An optical pickup device comprising:
   a laser diode configured to emit a laser beam;
   an objective lens configured to collect the light beam emitted from the laser diode and configured to irradiate a multilayer optical disc with the collected light beam;
   a diffraction element configured to diverge the light beam reflected from the multilayer optical disc into diverging light beams, the diffraction element having: a first divided area, a second divided area, and a third divided area, that are mutually exclusive,
      wherein the first divided area is located along a straight line passing through an approximate center of the diffraction element and extending in a direction generally parallel to a track of the multilayer optical disc,
      wherein the second divided area is located along a straight line passing through the approximate center of the diffraction element and extending in a direction generally perpendicular to the track of the multilayer optical disc, and
      wherein the third divided area includes a center of the diffraction element; and
   a detector having a plurality of detection portions configured to receive the diverging light beams caused by the diffraction element, the detection portions allocated to a first group and a second group,
      wherein the first group, of at least four detection portions, is configured to detect a 0th-order diffracted light from the first divided area, the second divided area, and the third divided area, and
      wherein the second group, of at least two detection portions, is configured to detect the light beam diffracted at the first divided area into first diffraction order (±1st-order) light, or higher diffraction order light, and is aligned in a direction generally perpendicular to the track of the multilayer optical disc.

2. The optical pickup device according to claim 1, further comprising:
   a third group of detection portions, configured to detect the light beam diffracted at the second divided area into first diffraction order (±1st-order) light, or higher diffraction order light;
   wherein the third group of detection portions is aligned in one or more directions generally perpendicular relative to the second group of detection portions;
   wherein the third group of detection portions includes an equal number of detection portions on each side of a direction aligned with the second group of detection portions; and
   wherein the third group of detection portions does not have any detection portion directly on the direction aligned with the second group of detection portions.

3. The optical pickup device according to claim 1, wherein the first divided area is divided, into four portions, by the straight line passing through the approximate center of the diffraction element and extending in the direction generally parallel to the track of the multilayer optical disc, the second divided area, and the third divided area.

4. The optical pickup device according to claim 1, wherein the second divided area is divided, into four portions, by the straight line passing through the approximate center of the diffraction element and extending in the direction generally perpendicular to the track of the multilayer optical disc, the first divided area, and the third divided area.

5. The optical pickup device according to claim 1, wherein when recording or reproducing information is a multi layer disc, the detection portions configured to detect a tracking error signal are located outside stray light of the 0th-order diffracted light from the diffraction element.

6. The optical pickup device according to claim 1, wherein a focusing error signal of an astigmatic method is generated from a signal detecting the 0th-order diffracted light from the first divided area, the second divided area, and the third divided area.

7. The optical pickup device according to claim 1, wherein a reproduction signal is generated from a signal detecting the 0th-order diffracted light from the first divided area, the second divided area, and the third divided area.

8. The optical pickup device according to claim 1, wherein the diffraction element is a hologram element having a function that adds at least astigmatism to the diffracted light.

9. An optical disc apparatus equipped with the optical pickup device stated in claim 1, further comprising:
   a laser lighting circuit configured to drive the laser diode in the optical pickup device, a servo signal generating circuit configured to generate a focusing error signal and a tracking error signal by using a signal detected by the detector in the optical pickup device, and an information signal reproducing circuit configured to reproduce an information signal recorded in the multilayer optical disc.

10. An optical pickup device comprising:
    a laser diode configured to emit a laser beam;
    an objective lens configured to collect the light beam emitted from the laser diode and configured to irradiate a multilayer optical disc with the collected light beam;
    a diffraction element configured to diverge the light beam reflected from the multilayer optical disc into diverging light beams, the diffraction element having: a first divided area, a second divided area, and a third divided area, that are mutually exclusive,
       wherein the first divided area is located along a straight line passing through an approximate center of the diffraction element and extending in a direction generally parallel to a track of the multilayer optical disc,
       wherein the second divided area is located along a straight line passing through the approximate center of the diffraction element and extending in a direction generally perpendicular to the track of the multilayer optical disc, and
       wherein the third divided area includes a center of the diffraction element; and
    a detector having a plurality of detection portions configured to receive the diverging light beams caused by the diffraction element, the detection portions allocated to a first group and a second group,
       wherein the first group, of at least four detection portions, is configured to detect a 0th-order diffracted light from the first divided area, the second divided area, and the third divided area, and
       wherein the second group, of at least two detection portions, is configured to detect the light beam diffracted at the second divided area into first diffraction order (±1st-order) light, or higher diffraction order light, and is aligned in a direction generally parallel to the track of the multilayer optical disc.

11. The optical pickup device of claim 10, further comprising:

a third group of detection portions, configured to detect the light beam diffracted at the first divided area into first diffraction order (±1st-order) light, or higher diffraction order light;
wherein the third group of detection portions is aligned in one or more directions generally perpendicular relative to the second group of detection portions;
wherein the third group of detection portions includes an equal number of detection portions on each side of a direction aligned with the second group of detection portions; and
wherein the third group of detection portions does not have any detection portion directly on the direction aligned with the second group of detection portions.

12. An optical pickup device comprising:
a laser diode configured to emit a laser beam;
an objective lens configured to collect the light beam emitted from the laser diode and configured to irradiate a multilayer optical disc with the collected light beam;
a diffraction element configured to diverge the light beam reflected from the multilayer optical disc into diverging light beams, the diffraction element having: a first divided area, a second divided area, and a third divided area, that are mutually exclusive, wherein in regards to disc-diffracted light which is diffracted by a track of the multilayer optical disc:
0th-order disc-diffracted light enters the first divided area, and
0th-order disc-diffracted light and ±1st-order disc-diffracted light enter the second divided area; and
a detector having a plurality of detection portions configured to receive the diverging light beams caused by the diffraction element, the detection portions allocated to a first group and a second group,
wherein the first group, of at least four detection portions, is configured to detect a 0th-order diffracted light from the first divided area, the second divided area, and the third divided area, and
wherein the second group, of at least two detection portions, is configured to detect the light beam diffracted at the first divided area into first diffraction order (±1st-order) light, or higher diffraction order light, and is aligned in a direction generally perpendicular to the track of the multilayer optical disc.

13. The optical pickup device of claim 12, further comprising:
a third group of detection portions, configured to detect the light beam diffracted at the second divided area into first diffraction order (±1st-order) light, or higher diffraction order light;
wherein the third group of detection portions is aligned in one or more directions generally perpendicular relative to the second group of detection portions;
wherein the third group of detection portions includes an equal number of detection portions on each side of a direction aligned with the second group of detection portions; and
wherein the third group of detection portions does not have any detection portion directly on the direction aligned with the second group of detection portions.

14. An optical pickup device comprising:
a laser diode configured to emit a laser beam;
an objective lens configured to collect the light beam emitted from the laser diode and configured to irradiate a multilayer optical disc with the collected light beam;
a diffraction element configured to diverge the light beam reflected from the multilayer optical disc into diverging light beams, the diffraction element having: a first divided area, a second divided area, and a third divided area, that are mutually exclusive, and
wherein in regards to disc-diffracted light which is diffracted by a track of the multilayer optical disc:
0th-order disc-diffracted light enters the first divided area, and
0th-order disc-diffracted light and ±1st-order disc-diffracted light enter the second divided area; and
a detector having a plurality of detection portions configured to receive the diverging light beams caused by the diffraction element, the detection portions allocated to a first group and a second group,
wherein the first group, of at least four detection portions, is configured to detect a 0th-order diffracted light from the first divided area, the second divided area, and the third divided area, and
wherein the second group, of at least two detection portions, is configured to detect the light beam diffracted at the second divided area into first diffraction order (±1st-order) light, or higher diffraction order light, and is aligned in a direction generally parallel to the track of the multilayer optical disc.

15. The optical pickup device of claim 14, further comprising:
a third group of detection portions, configured to detect the light beam diffracted at the first divided area into first diffraction order (±1st-order) light, or higher diffraction order light;
wherein the third group of detection portions is aligned in one or more directions generally perpendicular relative to the second group of detection portions;
wherein the third group of detection portions includes an equal number of detection portions on each side of a direction aligned with the second group of detection portions; and
wherein the third group of detection portions does not have any detection portion directly on the direction aligned with the second group of detection portions.

16. An optical pickup device comprising:
a laser diode configured to emit a laser beam;
an objective lens configured to collect the light beam emitted from the laser diode and configured to irradiate a multilayer optical disc with the collected light beam;
a diffraction element configured to diverge the light beam reflected from the multilayer optical disc into diverging light beams, the diffraction element having: a first divided area, a second divided area, and a third divided area, that are mutually exclusive:
wherein the first divided area is a specified area including four corners of the diffraction element,
wherein the second divided area borders the first divided area and the third divided area, and
wherein the third divided area is a specified area including an approximate center of the diffraction element; and
a detector having a plurality of detection portions configured to receive the diverging light beams caused by the diffraction element, the detection portions allocated to a first group and a second group,
wherein the first group, of at least four detection portions, is configured to detect a 0th-order diffracted light from the first divided area, the second divided area, and the third divided area, and
wherein the second group, of at least two detection portions, is configured to detect the light beam diffracted at the first divided area into first diffraction order (±1st-order) light, or higher diffraction order light, and is aligned in a direction generally perpendicular to the track of the multilayer optical disc.

17. The optical pickup device of claim 16, further comprising:
a third group of detection portions, configured to detect the light beam diffracted at the second divided area into first diffraction order (±1st-order) light, or higher diffraction order light;
wherein the third group of detection portions is aligned in one or more directions generally perpendicular relative to the second group of detection portions;
wherein the third group of detection portions includes an equal number of detection portions on each side of a direction aligned with the second group of detection portions; and
wherein the third group of detection portions does not have any detection portion directly on the direction aligned with the second group of detection portions.

18. An optical pickup device comprising:
a laser diode configured to emit a laser beam;
an objective lens configured to collect the light beam emitted from the laser diode and configured to irradiate a multilayer optical disc with the collected light beam;
a diffraction element configured to diverge the light beam reflected from the multilayer optical disc into diverging light beams, the diffraction element having: a first divided area, a second divided area, and a third divided area, that are mutually exclusive:
wherein the first divided area is a specified area including four corners of the diffraction element,
wherein the second divided area borders the first divided area and the third divided area, and
wherein the third divided area is a specified area including an approximate center of the diffraction element; and
a detector having a plurality of detection portions configured to receive the diverging light beams caused by the diffraction element, the detection portions allocated to a first group and a second group,
wherein the first group, of at least four detection portions, is configured to detect a 0th-order diffracted light from the first divided area, the second divided area, and the third divided area, and
wherein the second group, of at least two detection portions, is configured to detect the light beam diffracted at the second divided area into first diffraction order (±1st-order) light, or higher diffraction order light, and is aligned in a direction generally parallel to the track of the multilayer optical disc.

19. The optical pickup device of claim 18, further comprising:
a third group of detection portions, configured to detect the light beam diffracted at the first divided area into first diffraction order (±1st-order) light, or higher diffraction order light;
wherein the third group of detection portions is aligned in one or more directions generally perpendicular relative to the second group of detection portions;
wherein the third group of detection portions includes an equal number of detection portions on each side of a direction aligned with the second group of detection portions; and
wherein the third group of detection portions does not have any detection portion directly on the direction aligned with the second group of detection portions.

* * * * *